(12) United States Patent
Zhang et al.

(10) Patent No.: US 11,953,756 B2
(45) Date of Patent: Apr. 9, 2024

(54) OPTICAL SYSTEM, IMAGE CAPTURING MODULE AND ELECTRONIC DEVICE

(71) Applicant: Jiangxi OFILM Optical Co., Ltd., Nanchang (CN)

(72) Inventors: Wenyan Zhang, Nanchang (CN); Binbin Liu, Nanchang (CN); Hairong Zou, Nanchang (CN)

(73) Assignee: Jiangxi OFILM Optical Co., Ltd., Jiangxi (CN)

( * ) Notice: Subject to any disclaimer, the term of this patent is extended or adjusted under 35 U.S.C. 154(b) by 172 days.

(21) Appl. No.: 17/601,075

(22) PCT Filed: Aug. 15, 2019

(86) PCT No.: PCT/CN2019/100747
§ 371 (c)(1),
(2) Date: Oct. 3, 2021

(87) PCT Pub. No.: WO2021/026869
PCT Pub. Date: Feb. 18, 2021

(65) Prior Publication Data
US 2022/0155562 A1    May 19, 2022

(51) Int. Cl.
*G02B 9/64* (2006.01)
*G02B 13/00* (2006.01)
*H04N 23/55* (2023.01)

(52) U.S. Cl.
CPC ........... *G02B 9/64* (2013.01); *G02B 13/0045* (2013.01); *H04N 23/55* (2023.01)

(58) Field of Classification Search
None
See application file for complete search history.

(56) References Cited

U.S. PATENT DOCUMENTS

| 4,981,344 A | 1/1991 | Ueda |
| 6,414,800 B1 | 7/2002 | Hamano |

(Continued)

FOREIGN PATENT DOCUMENTS

| CN | 1206842 A | 2/1999 |
| CN | 1297164 A | 5/2001 |

(Continued)

OTHER PUBLICATIONS

International Search Report on International Patent Application PCT/CN2019/122072, filed Nov. 29, 2019, in the name of Jiangxi Jingchao Optical Co. Ltd.

(Continued)

*Primary Examiner* — James M Hannett
(74) *Attorney, Agent, or Firm* — ScienBiziP, P.C.

(57) ABSTRACT

An optical system (100), sequentially comprising from an object side to an image side: a first lens (L1) having positive refractive power, an object-side surface (S1) of the first lens (L1) being a convex surface at the circumference; a second lens (L2), a third lens (13), a fourth lens (L4), a fifth lens (L5), a sixth lens (L6), and a seventh lens (L7) having refractive power; and an eighth lens (L8) having negative refractive power. An image-side surface (S14) of the seventh lens (L7) is a concave surface at the optical axis. In addition, the optical system (100) satisfies 1<TTL/<2.5, wherein TTL is the distance between the object-side surface (S1) of the first lens (L1) and an imaging surface (S19) of the optical system (100) on the optical axis. The optical system (100) further comprises a diaphragm (STO), and L is the effective aperture diameter of the diaphragm (STO).

16 Claims, 30 Drawing Sheets

(56) References Cited

U.S. PATENT DOCUMENTS

| | | | |
|---|---|---|---|
| 6,985,309 | B2 | 1/2006 | Shinohara |
| 9,057,868 | B1 | 6/2015 | Chung et al. |
| 10,571,661 | B2 * | 2/2020 | Huang ............... G02B 13/0045 |
| 2004/0218285 | A1 | 11/2004 | Amanai |
| 2004/0264003 | A1 | 12/2004 | Noda |
| 2005/0046970 | A1 | 3/2005 | Amanai |
| 2008/0106801 | A1 | 5/2008 | Kang et al. |
| 2010/0254029 | A1 | 10/2010 | Shinohara |
| 2012/0075718 | A1 | 3/2012 | Seo |
| 2014/0063620 | A1 | 3/2014 | Jung et al. |
| 2015/0138425 | A1 | 5/2015 | Lee et al. |
| 2016/0124192 | A1 | 5/2016 | Koreeda |
| 2016/0161709 | A1 | 6/2016 | Hsueh et al. |
| 2017/0307858 | A1 | 10/2017 | Chen |
| 2018/0113282 | A1 | 4/2018 | Tsai |
| 2020/0073092 | A1 | 3/2020 | Chen |
| 2021/0103129 | A1 * | 4/2021 | Ji ............................ G02B 9/64 |

FOREIGN PATENT DOCUMENTS

| | | |
|---|---|---|
| CN | 101093274 A | 12/2007 |
| CN | 101983348 A | 3/2011 |
| CN | 102132189 A | 7/2011 |
| CN | 102419470 A | 4/2012 |
| CN | 102466864 A | 5/2012 |
| CN | 202522758 U | 11/2012 |
| CN | 102914851 A | 2/2013 |
| CN | 102985865 A | 3/2013 |
| CN | 102998774 A | 3/2013 |
| CN | 103676088 A | 3/2014 |
| CN | 103852858 A | 6/2014 |
| CN | 103969804 A | 8/2014 |
| CN | 104570277 A | 4/2015 |
| CN | 104570295 A | 4/2015 |
| CN | 104914558 A | 9/2015 |
| CN | 104932086 A | 9/2015 |
| CN | 204631345 U | 9/2015 |
| CN | 105259636 A | 1/2016 |
| CN | 105372793 A | 3/2016 |
| CN | 105607232 A | 5/2016 |
| CN | 105607233 A | 5/2016 |
| CN | 205210492 U | 5/2016 |
| CN | 205210493 U | 5/2016 |
| CN | 105988185 A | 10/2016 |
| CN | 105988186 A | 10/2016 |
| CN | 106033141 A | 10/2016 |
| CN | 106154496 A | 11/2016 |
| CN | 106338815 A | 1/2017 |
| CN | 106526796 A | 3/2017 |
| CN | 206074890 U | 4/2017 |
| CN | 106610518 A | 5/2017 |
| CN | 106646825 A | 5/2017 |
| CN | 106772931 A | 5/2017 |
| CN | 106773008 A | 5/2017 |
| CN | 106802469 A | 6/2017 |
| CN | 106842512 A | 6/2017 |
| CN | 106842514 A | 6/2017 |
| CN | 106896474 A | 6/2017 |
| CN | 106959500 A | 7/2017 |
| CN | 106970464 A | 7/2017 |
| CN | 107024756 A | 8/2017 |
| CN | 107102425 A | 8/2017 |
| CN | 107167897 A | 9/2017 |
| CN | 107167902 A | 9/2017 |
| CN | 206460205 U | 9/2017 |
| CN | 107290843 A | 10/2017 |
| CN | 206946078 U | 1/2018 |
| CN | 107703609 A | 2/2018 |
| CN | 107831588 A | 3/2018 |
| CN | 207164341 U | 3/2018 |
| CN | 107976770 A | 5/2018 |
| CN | 108089278 A | 5/2018 |
| CN | 108089317 A | 5/2018 |
| CN | 207424362 U | 5/2018 |
| CN | 207424363 U | 5/2018 |
| CN | 108107548 A | 6/2018 |
| CN | 108227146 A | 6/2018 |
| CN | 207557562 U | 6/2018 |
| CN | 108459394 A | 8/2018 |
| CN | 108761745 A | 11/2018 |
| CN | 108873250 A | 11/2018 |
| CN | 109283665 A | 1/2019 |
| CN | 109375346 A | 2/2019 |
| CN | 208506348 U | 2/2019 |
| CN | 109407267 A | 3/2019 |
| CN | 109725406 A | 5/2019 |
| CN | 109752823 A | 5/2019 |
| CN | 109814234 A | 5/2019 |
| CN | 109814235 A | 5/2019 |
| CN | 208833988 U | 5/2019 |
| CN | 208872939 U | 5/2019 |
| CN | 208888449 U | 5/2019 |
| CN | 109870786 A | 6/2019 |
| CN | 109870788 A | 6/2019 |
| CN | 109917533 A | 6/2019 |
| CN | 110018556 A | 7/2019 |
| CN | 209070186 U | 7/2019 |
| CN | 110109226 A | 8/2019 |
| CN | 110208927 A | 9/2019 |
| CN | 110261997 A | 9/2019 |
| CN | 110398815 A | 11/2019 |
| CN | 110426822 A | 11/2019 |
| CN | 110531500 A | 12/2019 |
| CN | 110568583 A | 12/2019 |
| CN | 110618522 A | 12/2019 |
| CN | 209765129 U | 12/2019 |
| CN | 110646919 A | 1/2020 |
| CN | 110646921 A | 1/2020 |
| CN | 110794555 A | 2/2020 |
| CN | 110879454 A | 3/2020 |
| CN | 111007649 A | 4/2020 |
| CN | 111025600 A | 4/2020 |
| CN | 111308688 A | 6/2020 |
| CN | 111338057 A | 6/2020 |
| CN | 210720853 U | 6/2020 |
| CN | 111399186 A | 7/2020 |
| CN | 211786331 U | 10/2020 |
| JP | 2008268977 A | 11/2008 |
| JP | 2013235242 A | 11/2013 |
| KR | 1020140135909 A | 11/2014 |
| TW | 201350956 A | 12/2013 |
| TW | I625567 B | 6/2018 |
| TW | I640811 B | 11/2018 |
| TW | I655474 B | 4/2019 |
| WO | 2003046633 A2 | 6/2003 |
| WO | 2014162779 A1 | 10/2014 |
| WO | 2015159721 A1 | 10/2015 |
| WO | 2017180362 A1 | 10/2017 |
| WO | 2020220444 A1 | 1/2020 |
| WO | 2020073978 A1 | 4/2020 |
| WO | 2020192253 A1 | 10/2020 |
| WO | 2020258269 A1 | 12/2020 |
| WO | 2021072745 A1 | 4/2021 |
| WO | 2021087661 A1 | 5/2021 |
| WO | 2021087669 A1 | 5/2021 |
| WO | 2021102943 A1 | 6/2021 |
| WO | 2021103797 A1 | 6/2021 |
| WO | 2021109127 A1 | 6/2021 |
| WO | 2021138754 A1 | 7/2021 |
| WO | 2021179207 A1 | 9/2021 |
| WO | 2021184164 A1 | 9/2021 |
| WO | 2021184165 A1 | 9/2021 |
| WO | 2021184167 A1 | 9/2021 |
| WO | 2021203277 A1 | 10/2021 |
| WO | 2021217504 A1 | 11/2021 |
| WO | 2021217664 A1 | 11/2021 |

OTHER PUBLICATIONS

U.S. Appl. No. 17/606,027,371, filed Oct. 23, 2021, in the name of Jiangxi Jingchao Optical Co. Ltd.

(56) References Cited

OTHER PUBLICATIONS

International Search Report on International Patent Application PCT/CN2019/111957, filed Oct. 18, 2019, in the name of Jiangxi Jingchao Optical Co. Ltd.
U.S. Appl. No. 17/606,040, 371, filed Oct. 24, 2021, in the name of Jiangxi Jingchao Optical Co. Ltd.
International Search Report dated Nov. 4, 2019 on International Patent Application PCT/CN2019/115318 filed Jul. 1, 2020, in the name of Jiangxi Jingchao Optical Co. Ltd.
U.S. Appl. No. 17/606,359, 371, filed Oct. 25, 2021, in the name of Jiangxi Jingchao Optical Co. Ltd.
International Search Report on International Patent Application PCT/CN2020/079517, filed Mar. 16, 2020, in the name of Jiangxi Jingchao Optical Co. Ltd.
U.S. Appl. No. 17/609,381, 371, filed Nov. 6, 2021, in the name of Jiangxi Jingchao Optical Co. Ltd.
International Search Report dated Jul. 16, 2020 on International Patent Application PCT/CN2019/123679 filed Aug. 25, 2020, in the name of Jiangxi Jingchao Optical Co. Ltd.
U.S. Appl. No. 17/610,693, 371, filed Nov. 11, 2021, in the name of Jiangxi Jingchao Optical Co. Ltd.
International Search Report on International Patent Application PCT/CN2020/070404, filed Jan. 6, 2020, in the name of Jiangxi Jingchao Optical Co. Ltd.
U.S. Appl. No. 17/440,691, 371, filed Sep. 17, 2021, in the name of Jiangxi Jingchao Optical Co. Ltd.
International Search Report dated Dec. 16, 2020 on International Patent Application PCT/CN2020/079515 filed Dec. 23, 2020, in the name of Jiangxi Jingchao Optical Co. Ltd.
U.S. Appl. No. 17/611,148,371, filed Nov. 13, 2021, in the name of Jiangxi Jingchao Optical Co. Ltd.
International Search Report on International Patent Application PCT/CN2020/087819, filed Apr. 29, 2020, in the name of Jiangxi Jingchao Optical Co. Ltd.
U.S. Appl. No. 17/611,162, 371, filed Nov. 14, 2021, in the name of Jiangxi Jingchao Optical Co. Ltd,.
International Search Report on International Patent Application PCT/CN2020/103797, filed Jul. 23, 2020, in the name of Ofilm Group Co. Ltd.
U.S. Appl. No. 17/612,556, 371, filed Nov. 18, 2021, in the name of Jiangxi Jingchao Optical Co. Ltd.
International Search Report on International Patent Application PCT/CN2020/079526, filed Mar. 16, 2020, in the name of Jiangxi Jingchao Optical Co. Ltd.
U.S. Appl. No. 17/611,165, 371 filed Nov. 14, 2021, in the name of Jiangxi Jingchao Optical Co. Ltd.
International Search Report dated Nov. 3, 2020 on International Patent Application PCT/CN2020/078814 filed Nov. 26, 2020, in the name of Jiangxi Jingchao Optical Co. Ltd.
U.S. Appl. No. 17/611,569, 371, filed Nov. 16, 2021, in the name of Jiangxi Jingchao Optical Co. Ltd.
International Search Report on International Patent Application PCT/CN2020/083697, filed Apr. 8, 2020, in the name of Jiangxi Jingchao Optical Co. Ltd.
U.S. Appl. No. 17/614,359, 371 filed Nov. 25, 2021, in the name of Jiangxi Jingchao Optical Co. Ltd.
International Search Report on International Patent Application PCT/CN2020/088515, filed Apr. 30, 2020, in the name of Jiangxi Jingchao Optical Co. Ltd.
U.S. Appl. No. 17/614,499, 371 filed Nov. 26, 2021, in the name of OFilm Group Co. Ltd. and Jiangxi Jingchao Optical Co. Ltd.
U.S. Appl. No. 17/536,006, filed date Nov. 27, 2021, in the name of Jiangxi Jingchao Optical Co. Ltd,.
U.S. Appl. No. 17/536,010, filed Nov. 27, 2021, in the name of Jiangxi Jingchao Optical Co. Ltd.
International Search Report dated Jan. 15, 2020 on International Patent Application PCT/CN2019/110525, filed Jan. 3, 2020, in the name of Jiangxi Jingchao Optical Co. Ltd.
U.S. Appl. No. 17/284,467, 371 filed Apr. 11, 2021, in the name of Jiangxi Jingchao Optical Co. Ltd.
International Search Report dated Mar. 27, 2019 on International Patent Application PCT/CN2020/072135, filed Jan. 15, 2020, in the name of Jiangxi Jingchao Optical Co. Ltd.
U.S. Appl. No. 17/440,786, 371 filed Sep. 19, 2021, in the name of Jiangxi Jingchao Optical Co. Ltd.
U.S. Appl. No. 17/605,985, 371 filed Oct. 22, 2021, in the name of OFilm Group Co. Ltd. and Jiangxi Jingchao Optical Co. Ltd.
International Search Report on International Patent Application PCT/CN2019/115349, filed Dec. 4, 2019, in the name of Jiangxi Jingchao Optical Co. Ltd.
U.S. Appl. No. 17/606,005, 371 filed Oct. 22, 2021, in the name of Jiangxi Jingchao Optical Co. Ltd.
International Search Report on International Patent Application PCT/CN2019/093780, filed Jun. 28, 2019, in the name of Jiangxi Jingchao Optical Co. Ltd.
U.S. Appl. No. 17/605,537, 371 filed Oct. 21, 2021, in the name of Jiangxi Jingchao Optical Co. Ltd.
International Search Report dated Apr. 30, 2019 on International Patent Application PCT/CN2019/091801 filed Jun. 19, 2019, in the name of Jiangxi Jingchao Optical Co. Ltd.
U.S. Appl. No. 17/604,739, 371 filed Oct. 18, 2021, in the name of Jiangxi Jingchao Optical Co. Ltd.

* cited by examiner

OPTICAL SYSTEM, IMAGE CAPTURING MODULE AND ELECTRONIC DEVICE

CROSS REFERENCE TO RELATED APPLICATION

The present application is a national stage, filed under 35 U.S.C. § 371, of International Application No. PCT/CN2019/100747, filed on Aug. 15 2019, the content of which is incorporated herein by reference in its entirety.

TECHNICAL FIELD

The present disclosure relates to a field of optical imaging, and in particular to an optical system, an image capturing module, and an electronic device.

BACKGROUND

With the development of society, electronic products such as mobile phones, tablet computers, drones, and computers have become more and more widely used in life. For electronic products with camera functions, the picture quality of images captured by most electronic products in dark environments is low, which cannot meet the requirements of the public for high-quality capturing in low-light environments such as cloudy days and nights. Therefore, the improvement in a camera module of the electronic product has gradually become one of the focuses of the public.

SUMMARY

According to various embodiments of the present disclosure, an optical system, an image capturing module, and an electronic device are provided.

An optical system, successively in order from an object side to an image side, includes:

a first lens having a positive refractive power, an object side surface of the first lens being convex at a circumference thereof;

a second lens having a refractive power;
a third lens having a refractive power;
a fourth lens having a refractive power;
a fifth lens having a refractive power;
a sixth lens having a refractive power;
a seventh lens having a refractive power, an image side surface of the seventh lens being concave at an optical axis; and
an eighth lens having a negative refractive power,
wherein the optical system satisfies the following condition:

$$1<TTL/L<2.5;$$

wherein TTL is a distance from the object side surface of the first lens to an imaging surface of the optical system on the optical axis, and the optical system further includes a stop, L is an effective aperture diameter of the stop.

An image capturing module includes a photosensitive element and the optical system as described above. The photosensitive element is arranged at the image side of the optical system.

An electronic device includes the image capturing module as described above.

Details of one or more embodiments of the present disclosure will be given in the following description and attached drawings. Other features, objects and advantages of the present disclosure will become apparent from the description, drawings, and claims.

BRIEF DESCRIPTION OF THE DRAWINGS

In order to better describe and illustrate the embodiments and/or examples of the contents disclosed herein, reference may be made to one or more drawings. Additional details or examples used to describe the drawings should not be considered as limiting the scope of any of the disclosed contents, the currently described embodiments and/or examples, and the best mode of these contents currently understood.

DETAILED DESCRIPTION OF THE EMBODIMENTS

Figure 1:
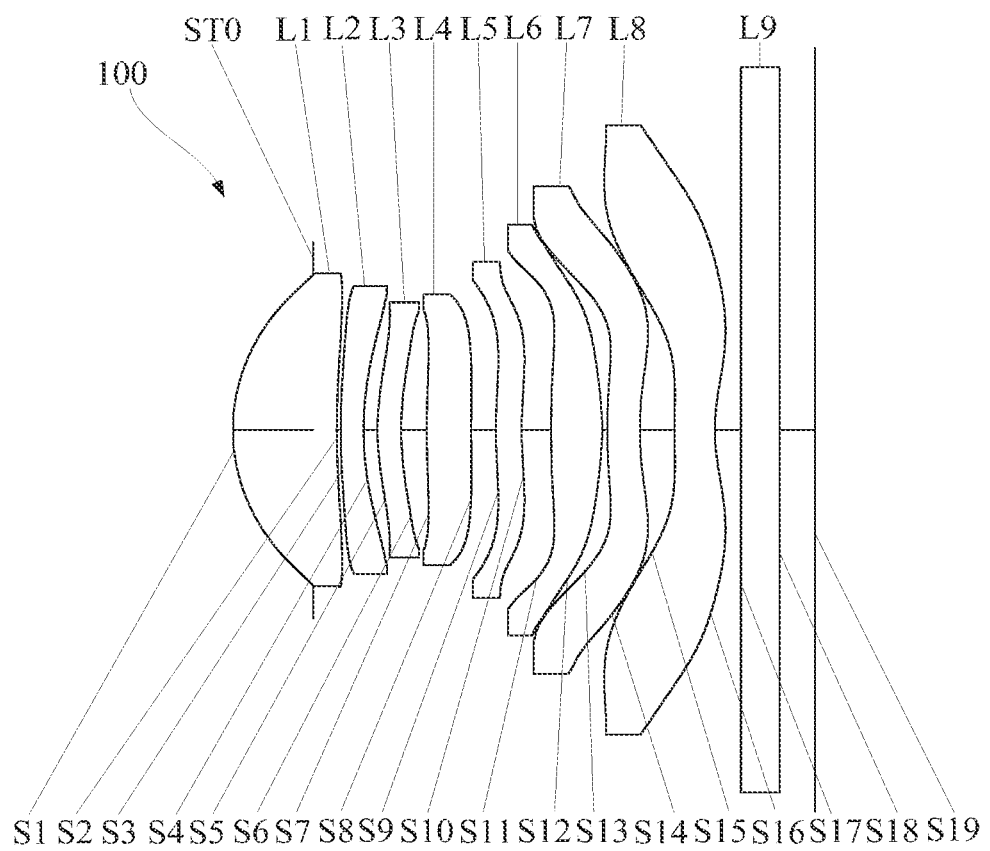
FIG. 1 is a schematic view of an optical system according to a first embodiment of the present disclosure.

In order to facilitate the understanding of the present disclosure, the present disclosure will be described more fully below with reference to the relevant drawings. Preferred embodiments of the present disclosure are shown in the drawings. However, the present disclosure can be implemented in many different forms and is not limited to the embodiments described herein. On the contrary, the purpose of providing these embodiments is to make the disclosure of the present disclosure more thorough and comprehensive.

It should be noted that when an element is referred to as being "fixed to" another element, it can be directly on another element or an intervening element may also be present therebetween. When an element is considered to be "connected to" another element, it can be directly connected to another element or an intervening element may be present at the same time. Terms "inner", "outer", "left", "right" and similar expressions used herein are for illustrative purposes only, and do not mean that they are the only embodiments.

An optical system according to this disclosure can be applied to, but not limited to, electronic devices such as mobile phones, tablet computers, drones, computers, such that users can obtain high-quality captured images in a dark environment.

Referring to FIG. 1, an optical system 100 according to an embodiment of the present disclosure, successively in order from an object side to an image side, includes a first lens L1, a second lens L2, a third lens L3, a fourth lens L4, a fifth lens L5, a sixth lens L6, a seventh lens L7, and an eighth lens L8.

The first lens L1 includes an object side surface S1 and an image side surface S2. The second lens L2 includes an object side surface S3 and an image side surface S4. The third lens L3 includes an object side surface S5 and an image side surface S6. The fourth lens L4 includes an object side surface S7 and an image side surface S8. The fifth lens L5 includes an object side surface S9 and an image side surface S10. The sixth lens L6 includes an object side surface S11 and an image side surface S12. The seventh lens L7 includes an object side surface S13 and an image side surface S14. The eighth lens L8 includes an object side surface S15 and an image side surface S16. In addition, the optical system 100 has an imaging surface S19 located on an image side of the eighth lens L8. The imaging surface S19 may be a photosensitive surface of a photosensitive element.

The object side surface S1 of the first lens L1 is convex at an optical axis. The object side surface S3 of the second lens L2 is convex at the optical axis. The object side surface S13 of the seventh lens L7 is convex at the optical axis, and the image side surface S14 thereof is concave. The object side surface S15 of the eighth lens L8 is convex at the optical axis, and the image side surface S16 thereof is concave at the optical axis.

It should be noted that when describing that a side surface of the lens at the optical axis (a central area of the side surface) is convex, it can be understood that an area of this side surface of the lens close to the optical axis is convex. Therefore, it can also be determined that the side surface is convex at its paraxial area. When describing a side surface of the lens is concave at its circumference, it can be understood that an area of the side surface is concave when approaching the maximum effective radius. For example, when the side surface is convex at the optical axis and is also convex at its circumference, a shape of the side surface in a direction from its center (at the optical axis) to its edge may be completely convex, or may be convex at its center and then be transitioned to concave, and further then become convex when approaching the maximum effective radius. These are only examples to illustrate various shapes and structures (concave-convex relationship) of the side surface at the optical axis and the circumference, and the various shapes and structures (concave-convex relationship) of the side surface are not fully embodied, but other situations can be derived from the above examples.

In some embodiments, the object side surface, or the image side surface of the lens in the optical system 100 may be spherical or aspheric. The surface shape formula of the aspheric surface is:

$$Z = \frac{cr^2}{1+\sqrt{1-(k+1)c^2r^2}} + \sum_i A_i\, r^i$$

where, Z is a distance from a corresponding point on an aspheric surface to a plane tangent to a vertex of the surface, r is a distance from a corresponding point on the aspheric surface to the optical axis, c is a curvature of the vertex of the aspheric surface (at the optical axis), k is a conic constant, and Ai is a factor corresponding to the $i^{th}$ high-order term in the surface shape formula.

In some embodiments, the object side surface, and the image side surface of each of the lenses (the first lens L1, the second lens L2, the third lens L3, the fourth lens L4, the fifth lens L5, the sixth lens L6, the seventh lens L7, and the eighth lens L8) in the optical system 100 are aspherical.

In some embodiments, each lens in the optical system 100 is made of plastic. As such, the lens made of plastic can reduce the weight of the optical system 100 and reduce the manufacture cost. In other embodiments, each lens in the optical system 100 is made of glass. As such, the optical system 100 can withstand higher temperatures and has better optical performance. In other embodiments, the first lens L1 is made of glass, and the other lenses is made of plastic. As such, the first lens L1 closest to the object side can well withstand the environmental temperature on the object side. Since other lenses are made of plastic, the optical system 100 can also maintain a low manufacture cost. It should be noted that, according to actual requirements, each lens in the optical system 100 can be made of plastic or glass.

In some embodiments, a stop STO is provided in the optical system 100. The stop STO may be arranged on the object side of the first lens L1. However, it should be noted that when describing that the stop STO is arranged on the object side of the first lens L1, or describing that the optical system 100 is sequentially provided with the stop STO, the first lens L1, the second lens L2 and the like, successively in order from the object side to the image side, a projection of the stop STO on the optical axis of the first lens L1 may or may not overlap with a projection of the first lens L1 on the optical axis.

In some embodiments, an infrared cut-off filter L9 is further provided on the image side of the eighth lens L8. The infrared cut-off filter L9 includes an object side surface S17 and an image side surface S18. The infrared cut-off filter L9 can filter infrared light, prevent the infrared light from being transmitted through and reaching the photosensitive element, and prevent the infrared interference light from being received by the photosensitive element to affect normal imaging, thereby improving the imaging quality of the optical system 100. In some embodiments, the infrared cut-off filter L9 can be assembled with the photosensitive element, and assembled on the image side of the optical system 100 together with the photosensitive element. Alternatively, the infrared cut-off filter can also be directly arranged in the optical system 100 to be assembled with the lenses as a whole.

In the case that descriptions of definitions of parameters and effect of this disclosure can be made clearer and complete, in some embodiments, in addition to the lens with the refractive power, the optical system 100 may further include any elements such as mirrors, stops, filters, protective glasses, and photosensitive components.

In some embodiments, the optical system 100 satisfies the following condition:

$1<TTL/L<2.5;$ where TTL is a distance from the object side surface S1 of the first lens L1 to the imaging surface S19 of the optical system 100 on the optical axis, and L is an effective aperture diameter of the stop STO. TTL/L can be 1.76, 1.78, 1.80, 1.81, 1.85, 1.90, 1.95, 2.10, 2.20, 2.25, or 2.30.

When the above condition is satisfied, the optical system 100 has characteristics of large aperture diameter and large aperture in performance, and has an ability to obtain high-quality images in dark light environments such as cloudy days, night scenes, and starry sky, and the image quality is high in definition. In addition, the optical system 100 also has a characteristic of miniaturization in structure.

In some embodiments, the optical system 100 satisfies the following conditions:

$f14>0;$ $f58<0;$ where f14 is a combined focal length of the first lens L1, the second lens L2, the third lens L3, and the fourth lens L4; and f58 is a combined focal length of the fifth lens L5, the sixth lens L6, the seventh lens L7, and the eighth lens L8. f14 can be 5.20, 5.22, 5.25, 5.30, 5.35, 5.40, 5.50, 5.60, 5.70, 5.80, 5.85, 5.90 or 5.92. f58 can be −30.00, −28.00, −25.00, −23.00, −20.00, −15.00, −14.50, −14.00, −10.00, −9.50, −9.30, −9.10, −8.50, −8.40, or −8.30. The units of f14 and f58 are both mm. When the above conditions are satisfied, the first lens L1, the second lens L2, the third lens L3, and the fourth lens L4 are combined to form a first lens group having a positive refractive power. The fifth lens L5, the sixth lens L6, and the seventh lens L7, and the eighth lens L8 are combined to form a second lens group having a negative refractive power. The positive and negative refractive powers of the first lens group and the second lens group cooperate with each other to achieve the purpose of correcting the curvature of field, distortion, and aberration.

In some embodiments, the optical system 100 satisfies the following condition:

$-0.7<f14/f58<-0.1.$

The first lens L1, the second lens L2, the third lens L3, and the fourth lens L4 are combined to form a first lens group having a positive refractive power. The fifth lens L5, the sixth lens L6, the seventh lens L7, and the eighth lens L8 are combined to form a second lens group having a negative refractive power. The ratio f14/f58 can be equal to −0.60, −0.57, −0.50, −0.45, −0.37, −0.35, −0.30, −0.25, −0.22, −0.20, or −0.19. The first lens group and the second lens group can cooperate with each other to achieve the purpose of correcting aberrations, curvature of field, and distortion. When f14/f58>−0.1, the negative refractive power of the optical system 100 is insufficient, which makes it difficult to correct the positional aberration. When f14/f58<−0.7, the positive refractive power of the optical system 100 is too large, which makes it difficult to correcting the distortion, resulting in the decrease of the capturing quality.

In some embodiments, the optical system 100 satisfies the following condition:

$0.20<Fno/TTL<0.35;$ where Fno is a f-number of the optical system 100; TTL is a distance from the object side surface S1 of the first lens L1 to the imaging surface S19 of the optical system 100 on the optical axis; and the unit of TTL is mm. The ratio Fno/TTL can be equal to 0.24, 0.250, 0.28, 0.30 or 0.32. When the above condition is satisfied, the optical system 100 has the characteristics of a large aperture and miniaturization.

In some embodiments, the optical system 100 satisfies the following condition:

$Fno<2.0.$

FNO can be equal to 1.40, 1.41, 1.42, 1.45, 1.47, 1.48, 1.57, 1.65, 1.70, 1.75, 1.80, 1.84, 1.86, or 1.87. When the above condition is satisfied, the optical system 100 can not only be miniaturized, but also have the characteristics of large aperture diameter, such that the optical system 100 has sufficient incident light amount, and thus has the ability to obtain high-quality images in dark environments such as night scenes and starry sky.

In some embodiments, the optical system 100 satisfies the following condition:

$TTL/Imgh<1.5;$ where TTL is a distance from the object side surface S1 of the first lens L1 to the imaging surface S19 of the optical system 100 on the optical axis, and Imgh is half of a length of a diagonal of an effective pixel area on the imaging surface S19. The ratio TTL/Imgh can be equal to 1.45, 4.46, 1.47, or 1.48. TTL/Imgh can determine the size of the optical system 100. Therefore, when the above condition is satisfied, the optical system 100 can realize a miniaturized design. In addition, the optical system 100 also has a larger image height to meet the 48 M design requirements.

In some embodiments, the optical system 100 satisfies the following condition:

$1.0<TTL/f''<1.5;$ where TTL is a distance from the object side surface S1 of the first lens L1 to the imaging surface S19 of the optical system 100 on the optical axis, and f is an effective focal length of the optical system 100. The ratio TTL/|f1| can be equal to 1.21, 1.22, 1.23, or 1.24. When the above condition is satisfied, the optical system 100 can effectively balance the aberration generated by the first lens L1. When TTL/|f1|<1.0, an optical length of the optical system 100 is too short, resulting in increased sensitivity of the system and difficulty in aberration correction. When TTL/|f1|>1.5, the optical length of the optical system 100 is too long, resulting in that the chief ray angle of the light entering the imaging surface S19 is too large, such that the light reaching the edge of the imaging surface S19 cannot be imaged on the photosensitive surface, resulting in incomplete imaging information.

In some embodiments, the optical system 100 satisfies the following condition:

$$f/f1 < 1.2;$$

where f is an effective focal length of the optical system 100, and f1 is an effective focal length of the first lens L1. The ratio f/f1 can be equal to 0.70, 0.73, 0.75, 0.78, 0.85, 0.92, 0.93, 0.94, 0.97, 1.00, 1.02, 1.04, or 1.08. Optical information obtained by the optical system 100 needs to be transmitted through the first lens L1. The focal length of the first lens L1 determines the optical information obtained by the optical system 100 in the object space. When the above condition is satisfied, the sensitivity of the optical system 100 can be reduced, the difficulty of processing technology thereof can be reduced, while the difficulty of correcting the aberration generated by the first lens L1 can be reduced.

In some embodiments, the optical system 100 satisfies the following condition:

$$-0.10 < (R9+R10)/(R9*R10) < 0.25;$$

where R9 is a radius of curvature of the object side surface S7 of the fourth lens L4 at the optical axis, R10 is a radius of curvature of the image side surface S8 of the fourth lens L4 at the optical axis. The units of R9 and R10 are mm. The ratio (R9+R10)/(R9*R10) can be equal to −0.07, −0.06, −0.05, 0.10, 0.15, 0.20 or 0.21. When the above condition is satisfied, the radii of curvature of the object side surface S7 and the image side surface S8 of the fourth lens L4 can be reasonably matched, which can effectively improve the astigmatism problem of the optical system 100 and improve the forming yield of the fourth lens L4.

In some embodiments, the optical system 100 satisfies the following condition:

$$0.5 < (R3+R4)/f1 < 3.5;$$

where R3 is a radius of curvature of the object side surface S1 of the first lens L1 at the optical axis, R4 is a radius of curvature of the image side surface S2 of the first lens L1 at the optical axis, and f1 is the effective focal length of the first lens L1. The ratio (R3+R4)/f1 can be equal to 0.88, 0.90, 0.92, 1.00, 1.30, 1.70, 2.00, 2.55, 2.60, 2.70, 2.90, 3.00, 3.10, 3.15, or 3.20. When (R3+R4)/f1>3.5, the difficulty of the optical system 100 to correct aberrations is increased. When (R3+R4)/f1<0.5, it is not beneficial for the optical system 100 to obtain the optical information in the object space, which is difficult to achieve better imaging effect.

In some embodiments, the optical system 100 satisfies the following condition:

$$0.8 < R5/R6 < 3.5;$$

where R5 is a radius of curvature of the object side surface S3 of the second lens L2 at the optical axis, and R6 is a radius of curvature of the image side surface S4 of the second lens L2 at the optical axis. The second lens L2 provides the negative refractive power to balance the distortion generated by the first lens L1 and correct the aberration generated by the first lens L1. The ratio R5/R6 can be equal to 1.00, 1.10, 1.20, 1.50, 1.80, 2.00, 2.10, 2.20, 2.30, 2.43, 2.45, 2.50, 2.60, 2.70, 2.80, 2.85 or 2.88. When R5/R6>3.5, the distortion correction is too large. When R5/R6<0.8, the distortion correction cannot be achieved.

In some embodiments, the optical system 100 satisfies the following condition:

$$8 < |R7+R8|/|R7-R8| < 48;$$

where R7 is a radius of curvature of the object side surface S5 of the third lens L3 at the optical axis, and R8 is a radius of curvature of the image side surface S6 of the third lens L3 at the optical axis. The ratio |R7+R8|/|R7-R8| can be equal to 10.00, 11.00, 15.00, 20.00, 25.00, 35.00, 43.00 or 45.00. When the above condition is satisfied, the radius of curvature of the object side surface S5 and the radius of curvature of the image side surface S6 of the third lens L3 can be reasonably arranged, which can reasonably increase the incident angle to meet the image height requirements of the optical system 100, while reducing the sensitivity of the system, improving assembly stability.

In some embodiments, the optical system 100 satisfies the following condition:

$$-0.6 < f1/f2 < 0.1;$$

where f1 is an effective focal length of the first lens L1, and f2 is an effective focal length of the second lens L2. The ratio f1/f2 can be equal to −0.55, −0.54, −0.50, −0.49, −0.47, −0.46, −0.35, −0.30, −0.10, or 0.01. When the above condition is satisfied, the positional chromatism of the optical system 100 can be effectively corrected.

In some embodiments, the optical system 100 satisfies the following condition:

$$1.8 < (R17*R18)/(R17-R18) < 3;$$

where R17 is a radius of curvature of the object side surface S15 of the eighth lens L8 at the optical axis, and R18 is a radius of curvature of the image side surface S16 of the eighth lens L8 at the optical axis. The units of R17 and R18 are both mm. The ratio (R17*R18)/(R17-R18) can be equal to 2.00, 2.10, 2.20, 2.56, 2.58, 2.60, 2.65, 2.70, 2.75, 2.80, 2.85 or 2.87. When the above condition is satisfied, the radius of curvature of the object side surface S15 and the radius of curvature of the image side surface S16 of the eighth lens L8 can be reasonably arranged, which can effectively correct the spherical aberration of the optical system 100, improve distortion and astigmatism, reduce the sensitivity of the system, and improve assembly stability.

In some embodiments, the optical system 100 satisfies the following condition:

$$0.5 < \Sigma CT/f < 0.8;$$

where $\Sigma CT$ is the sum of the center thicknesses of all lenses in the optical system 100, and f is an effective focal length of the optical system 100. The ratio $\Sigma CT/f$ can be equal to 0.70, 0.71, 0.72, 0.73, 0.74, or 0.75. When the above condition is satisfied, the optical system 100 has a more compact structure and an effective focal length adapted to the structure, thereby satisfying the miniaturized design.

In some embodiments, the optical system 100 satisfies the following condition:

$0.40 < \Sigma CT/TTL < 0.62$;

where ΣCT is the sum of the center thicknesses of all lenses in the optical system 100, and TTL is a distance from the object side surface S1 of the first lens L1 to the imaging surface S19 of the optical system 100 on the optical axis. The ratio ΣCT/TTL can be equal to 0.57, 0.58, 0.59, 0.60 or 0.61. When the above condition is satisfied, the optical system 100 has a good assembly stability, which is beneficial to the miniaturized design.

In some embodiments, the optical system 100 satisfies the following condition:

$0.20 < ET1/CT1 < 0.60$;

where ET1 is the edge thickness of the first lens L1 (the thickness of the first lens L1 at the maximum effective radius), and CT1 is the center thickness of the first lens L1. The ratio ET1/CT1 can be equal to 0.26, 0.27, 0.28, 0.30, 0.35, 0.39, 0.42, 0.46, 0.49, 0.53, 0.55, or 0.56. The optical information obtained by the optical system 100 needs to be transmitted through the first lens L1. In this case, corresponding aberrations, distortions, and curvature of field are also generated with the first lens L1. Therefore, the ratio of the edge thickness to the center thickness of the first lens L1 should not be too large. If the ratio is too large, the subsequent aberration correction is difficult, and large distortion and curvature of field are generated, which cannot meet the optical performance requirements. When the above condition is satisfied, a good optical system 100 can be obtained to balance the aberration, distortion, and curvature of field of the system, to meet the requirements of high-quality capturing.

In some embodiments, the optical system 100 satisfies the following condition:

$0.80 < ET8/CT8 < 3.00$;

where ET8 is the edge thickness of the eighth lens L8 (the thickness of the eighth lens L8 at the maximum effective radius), and CT8 is the center thickness of the eighth lens L8. The ratio ET8/CT8 can be equal to 0.88, 0.90, 0.92, 0.95, 1.00, 1.05, 1.10, 1.13, 1.15, 1.80, 2.10, 2.20, 2.25, or 2.27. The eighth lens L8 is the key element for final correction of the aberration performance of the optical system 100. The difficulty of processing the eighth lens L8 is relatively high, and the ratio of the edge thickness to the center thickness of the eighth lens L8 should not be too large. When the above condition is satisfied, the eighth lens L8 can have a good optical performance and forming yield.

Hereinafter, specific embodiments applicable to the above-mentioned optical system 100 will be further described with reference to the accompanying drawings. However, it should be noted that the figures in the drawings are for reference only, and may not completely represent the actual figures of the corresponding embodiment.

First Embodiment

Figure 2:
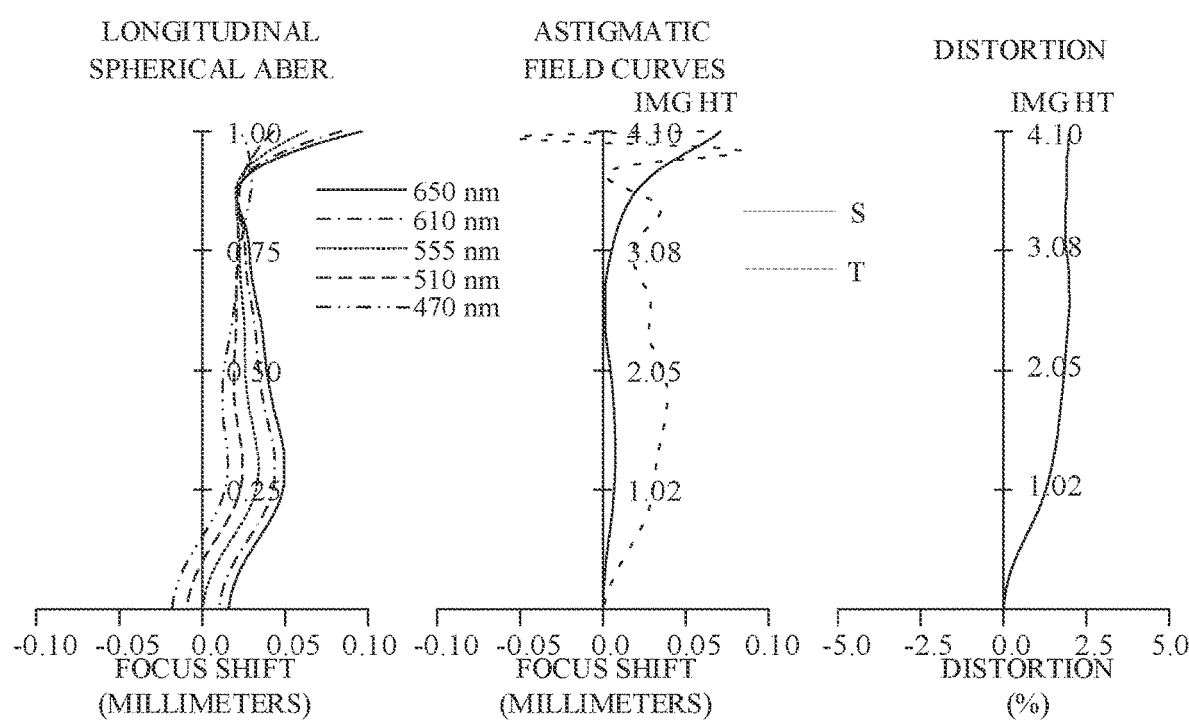
FIG. 2 is a graph showing longitudinal spherical aberration (mm), astigmatism (mm), and distortion (%) of the optical system according to the first embodiment.

Referring to FIG. 1, in the first embodiment, the optical system 100 includes a stop STO, a first lens L1 having a positive refractive power, a second lens L2 having a negative refractive power, a third lens L3 having a positive refractive power, a fourth lens L4 having a positive refractive power, a fifth lens L5 having a negative refractive power, a sixth lens L6 having a positive refractive power, a seventh lens L7 having a negative refractive power, and an eighth lens L8 having a negative refractive power, successively in order from an object side to an image side. FIG. 2 is a graph showing longitudinal spherical aberration (mm), astigmatism (mm), and distortion (%) of the optical system 100 according to the first embodiment. The astigmatism diagram and the distortion diagram are data diagrams at a reference wavelength. The reference wavelength in each embodiment is 555 nm.

An object side surface S1 of the first lens L1 is convex at the paraxial position, and an image side surface S2 of the first lens L1 is concave at the paraxial position. The object side surface S1 of the first lens L1 is convex at its circumference, and the image side surface S2 of the first lens L1 is convex at its circumference.

An object side surface S3 of the second lens L2 is convex at the paraxial position, and an image side surface S4 of the second lens L2 is concave at the paraxial position. The object side surface S3 of the second lens L2 is convex at its circumference, and the image side surface S4 of the second lens L2 is concave at its circumference.

An object side surface S5 of the third lens L3 is convex at the paraxial position, and an image side surface S6 of the third lens L3 is concave at the paraxial position. The object side surface S5 of the third lens L3 is concave at its circumference, and the image side surface S6 of the third lens L3 is concave at its circumference.

An object side surface S7 of the fourth lens L4 is convex at the paraxial position, and an image side surface S8 of the fourth lens L4 is concave at the paraxial position. The object side surface S7 of the fourth lens L4 is concave at its circumference, and the image side surface S8 of the fourth lens L4 is convex at its circumference.

An object side surface S9 of the fifth lens L5 is convex at the paraxial position, and an image side surface S10 of the fifth lens L5 is concave at the paraxial position. The object side surface S9 of the fifth lens L5 is concave at its circumference, and the image side surface S10 of the fifth lens L5 is convex at its circumference.

An object side surface S11 of the sixth lens L6 is convex at the paraxial position, and an image side surface S12 of the sixth lens L6 is convex at the paraxial position. The object side surface S11 of the sixth lens L6 is concave at its circumference, and the image side surface S12 of the sixth lens L6 is convex at its circumference.

An object side surface S13 of the seventh lens L7 is convex at the paraxial position, and an image side surface S14 of the seventh lens L7 is concave at the paraxial position. The object side surface S13 of the seventh lens L7 is concave at its circumference, and the image side surface S14 of the seventh lens L7 is convex at its circumference.

An object side surface S15 of the eighth lens L8 is convex at the paraxial position, and an image side surface S16 of the eighth lens L8 is concave at the paraxial position. The object side surface S15 of the eighth lens L8 is convex at its circumference, and the image side surface S16 of the eighth lens L8 is convex at its circumference.

The object side surfaces and image side surfaces of the first lens L1, the second lens L2, the third lens L3, the fourth lens L4, the fifth lens L5, the sixth lens L6, the seventh lens L7, and the eighth lens L8 are all aspherical. The design of the aspheric surface can effectively solve the problem of distortion of the field of view, and can also enable the lens to achieve excellent optical effects in the case of being smaller and thinner, thereby enabling the optical system 100 to have a smaller volume.

The first lens L1, the second lens L2, the third lens L3, the fourth lens L4, the fifth lens L5, the sixth lens L6, the seventh lens L7, and the eighth lens L8 are all made of plastic.

In some embodiments, an infrared cut-off filter L9 is further provided on the image side of the eighth lens L8 to filter out infrared light, so as to prevent the photosensitive element from receiving the infrared light to affect normal imaging.

In the first embodiment, the optical system 100 satisfies a condition: TTL/L=1.74; where TTL is a distance from the object side surface S1 of the first lens L1 to the imaging surface S19 of the optical system 100 on the optical axis, and L is an effective aperture diameter of the STO. When the above condition is satisfied, the optical system 100 has the characteristics of large aperture diameter and large aperture in performance, and has the ability to obtain high-quality images in dark environments such as cloudy days, night scenes, and starry sky, and the image quality is high in definition. In addition, the optical system 100 also has a characteristic of miniaturization in structure.

The optical system 100 satisfies conditions: f14=5.51; f58=−21.71; where f14 is a combined focal length of the first lens L1, the second lens L2, the third lens L3, and the fourth lens L4, and f58 is a combined focal length of the fifth lens L5, the six lens L6, the seventh lens L7, and the eighth lens L8. The units of f14 and f58 are both mm. When the above conditions are satisfied, the first lens L1, the second lens L2, the third lens L3, and the fourth lens L4 are combined to form a first lens group having a positive refractive power. The fifth lens L5, the sixth lens L6, the seventh lens L7, and the eighth lens L8 are combined to form a second lens group having a negative refractive power. The positive and negative refractive powers of the first lens group and the second lens group cooperate with each other to achieve the purpose of correcting curvature of field, distortion, and aberration.

The optical system 100 satisfies a condition: f14/f58=−0.25. The first lens L1, the second lens L2, the third lens L3, and the fourth lens L4 are combined to form a first lens group having a positive refractive power. The fifth lens L5, the sixth lens L6, the seventh lens L7, and the eighth lens L8 are combined to form a second lens group having a negative refractive power. The first lens group and the second lens group can cooperate with each other to achieve the purpose of correcting aberrations, curvature of field and distortion.

The optical system 100 satisfies a condition: Fno/TTL=0.237; where Fno is the f-number of the optical system 100, and TTL is a distance from the object side surface S1 of the first lens L1 to the imaging surface S19 of the optical system 100 on the optical axis. The unit of TTL is mm. When the above condition is satisfied, the optical system 100 has the characteristics of a large aperture and miniaturization.

The optical system 100 satisfies a condition: Fno=1.397. When the above condition is satisfied, the optical system 100 can not only be miniaturized, but also has the characteristics of large aperture diameter, such that the optical system 100 has sufficient incident light amount, and thus has the ability to obtain high-quality images in dark environments such as night scenes and starry sky.

The optical system 100 satisfies a condition: TTL/Imgh=1.475; where TTL is a distance from the object side surface S1 of the first lens L1 to the imaging surface S19 of the optical system 100 on the optical axis, and Imgh is half of a length of a diagonal of an effective pixel area on the imaging surface S19. TTL/Imgh can determine the size of the optical system 100. Therefore, when the above condition is satisfied, the optical system 100 can realize a miniaturized design. In addition, the optical system 100 also has a larger image height to meet the 48 M design requirements.

The optical system 100 satisfies a condition: TTL/f=1.245; where TTL is a distance from the object side surface S1 of the first lens L1 to the imaging surface S19 of the optical system 100 on the optical axis, and f is an effective focal length of the optical system 100. When the TTL/|f| is too small, the optical length of the optical system 100 is too short, resulting in increased sensitivity of the system and difficulty in aberration correction. When the TTL/|f| is too large, the optical length of the optical system 100 is too long, resulting in that the chief ray angle of the light entering the imaging surface S19 is too large, such that the light reaching the edge of the imaging surface S19 cannot be imaged on the photosensitive surface, resulting in incomplete imaging information.

The optical system 100 satisfies a condition: f/f1=1.05; where f is an effective focal length of the optical system 100, and f1 is an effective focal length of the first lens L1. The optical information obtained by the optical system 100 needs to be transmitted through the first lens L1. The focal length of the first lens L1 determines the optical information obtained by the optical system 100 in the object space. When the above condition is satisfied, the sensitivity of the optical system 100 can be reduced, the difficulty of processing technology thereof can be reduced, while the difficulty of correcting the aberration generated by the first lens L1 can be reduced.

The optical system 100 satisfies a condition: (R9+R10)/(R9*R10)=0.13; where R9 is a radius of curvature of the object side surface S7 of the fourth lens L4 at the optical axis, R10 is a radius of curvature of the image side surface S8 of the fourth lens L4 at the optical axis. The units of R9 and R10 are mm. When the above condition is satisfied, the radii of curvature of the object side surface S7 and the image side surface S8 of the fourth lens L4 can be reasonably arranged, which can effectively improve the astigmatism problem of the optical system 100 and improve the forming yield of the fourth lens L4.

The optical system 100 satisfies a condition: (R3+R4)/f1=2.73; where R3 is a radius of curvature of the object side surface S1 of the first lens L1 at the optical axis, R4 is a radius of curvature of the image side surface S2 of the first lens L1 at the optical axis, and f1 is the effective focal length of the first lens L1. When the value of (R3+R4)/f1 is too large, the difficulty of the optical system 100 to correct aberrations is increased. When (R3+R4)/f1 is too small, it is not beneficial for the optical system 100 to obtain the optical information in the object space, which is difficult to achieve better imaging effect.

The optical system 100 satisfies a condition: R5/R6=2.86; where R5 is a radius of curvature of the object side surface S3 of the second lens L2 at the optical axis, and R6 is a radius of curvature of the image side surface S4 of the second lens L2 at the optical axis. The second lens L2 provides the negative refractive power to balance the distortion generated by the first lens L1 and correct the aberration generated by the first lens L1.

The optical system 100 satisfies a condition: |R7+R8|/|R7−R8|=13.81; where R7 is a radius of curvature of the object side surface S5 of the third lens L3 at the optical axis, and R8 is a radius of curvature of the image side surface S6 of the third lens L3 at the optical axis. When the above condition is satisfied, the radius of curvature of the object side surface S5 and the radius of curvature of the image side surface S6 of the third lens L3 can be reasonably arranged, which can reasonably increase the incident angle to meet the image height requirements of the optical system 100, while reducing the sensitivity of the system, improving assembly stability.

The optical system 100 satisfies a condition: f1/f2=−0.56; where f1 is an effective focal length of the first lens L1, and f2 is an effective focal length of the second lens L2. When the above condition is satisfied, the positional chromatism of the optical system 100 can be effectively corrected.

The optical system 100 satisfies a condition: (R17*R18)/(R17−R18)=2.55; where R17 is a radius of curvature of the object side surface S15 of the eighth lens L8 at the optical axis, and R18 is a radius of curvature of the image side surface S16 of the eighth lens L8 at the optical axis. The units of R17 and R18 are both mm. When the above condition is satisfied, the radius of curvature of the object side surface S15 and the radius of curvature of the image side surface S16 of the eighth lens L8 can be reasonably matched, which can effectively correct the spherical aberration of the optical system 100, improve distortion and astigmatism, reduce the sensitivity of the system, and improve assembly stability.

The optical system 100 satisfies a condition: ΣCT/f=0.74; where ΣCT is the sum of the center thicknesses of all lenses in the optical system 100, and f is an effective focal length of the optical system 100. When the above condition is satisfied, the optical system 100 has a more compact structure and an effective focal length adapted to the structure, thereby satisfying a miniaturized design.

The optical system 100 satisfies a condition: ΣCT/TTL=0.59; where ΣCT is the sum of the center thicknesses of all lenses in the optical system 100, and TTL is a distance from the object side surface S1 of the first lens L1 to the imaging surface S19 of the optical system 100 on the optical axis. When the above condition is satisfied, the optical system 100 has good assembly stability, which is beneficial to the miniaturized design.

The optical system 100 satisfies a condition: ET1/CT1=0.265; where ET1 is the edge thickness of the first lens L1 (the thickness of the first lens L1 at the maximum effective radius), and CT1 is the center thickness of the first lens L1. The optical information obtained by the optical system 100 needs to be transmitted through the first lens L1. In this case, corresponding aberrations, distortions, and curvature of field are also generated with the first lens L1. Therefore, the ratio of the edge thickness to the center thickness of the first lens L1 should not be too large. If the ratio is too large, the subsequent aberration correction is difficult, and large distortion and curvature of field are generated, which cannot meet the optical performance requirements. When the above condition is satisfied, a good optical system 100 can be obtained to balance the aberration, distortion, and curvature of field of the system, to meet the requirements of high-quality capturing.

The optical system 100 satisfies a condition: ET8/CT8=0.86; where ET8 is the edge thickness of the eighth lens L8 (the thickness of the eighth lens L8 at the maximum effective radius), and CT8 is the center thickness of the eighth lens L8. The eighth lens L8 is the key element for final correction of the aberration performance of the optical system 100. The difficulty of processing the eighth lens L8 is relatively high, and the ratio of the edge thickness to the center thickness of the eighth lens L8 should not be too large. When the above condition is satisfied, the eighth lens L8 can have good optical performance and forming yield.

In addition, various parameters of the optical system 100 are given in Table 1 and Table 2. The elements of the optical system 100 from the object surface (object side) to the imaging surface S19 (the image surface in Table 1) are arranged in the order of the elements in Table 1 from top to bottom. The surface numbers 3 and 4 in Table 1 indicate the object side surface S1 and the image side surface S2 of the first lens L1, respectively. That is, in the same lens, the surface with the smaller number is the object side surface, and the surface with the larger number is the image side surface. The Y radius is the curvature radius of the object side surface or image side surface indicated by the corresponding surface number at the paraxial position. The first value in the "thickness" parameter column of the first lens L1 is the thickness of the lens on the optical axis. The second value is the distance from the image side surface of the lens to the object side surface of the latter lens on the optical axis. The value corresponding to the surface number 20 in the "thickness" parameter of the infrared cut-off filter L9 is the distance from the image side surface S18 of the infrared cut-off filter L9 to the imaging surface S19. K in Table 2 is the conic constant, and Ai is the coefficient corresponding to the $i^{th}$ high-order term in the surface shape formula. Generally, the image surface in Table 1 is a photosensitive surface of the photosensitive element.

In addition, a refractive index and a focal length of each lens have values at the reference wavelength. The calculation of the conditions is based on the lens parameters (such as the data in Table 1) and the surface shape parameters (such as the data in Table 2).

In the first embodiment, the effective focal length of the optical system 100 is indicated by f, and f=4.74 mm. The f-number is indicated by FNO, and FNO=1.397. The maximum angle of field of view (diagonal angle of view) is indicated by FOV, and FOV=80.39 degrees (deg.). The distance from the object side surface S1 of the first lens L1 to the imaging surface S19 on the optical axis is indicated by TTL, and TTL=5.9 mm. The half of the diagonal length of the effective pixel area on the imaging surface is indicated by Imgh, and Imgh=4.0 mm.

TABLE 1

First Embodiment
f = 4.74 mm, FNO = 1.397, FOV = 80.39 degrees, TTL = 5.9 mm

| Surface Number | Surface Name | Surface Shape | Y radius (mm) | Thickness (mm) | Material | Refractive index | Abbe number | Focal Length (mm) |
|---|---|---|---|---|---|---|---|---|
| 0 | Object Surface | Spherical | Infinite | Infinite | | | | |
| 1 | Spherical Surface | Spherical | Infinite | 0.000 | | | | |
| 2 | Stop | Spherical | Infinite | −0.817 | | | | |
| 3 | First Lens | Aspherical | 2.059 | 1.053 | Plastic | 1.55 | 56.14 | 4.52 |
| 4 | | Aspherical | 10.251 | 0.042 | | | | |
| 5 | Second Lens | Aspherical | 10.002 | 0.230 | Plastic | 1.68 | 19.25 | −8.03 |

TABLE 1-continued

First Embodiment
f = 4.74 mm, FNO = 1.397, FOV = 80.39 degrees, TTL = 5.9 mm

| Surface Number | Surface Name | Surface Shape | Y radius (mm) | Thickness (mm) | Material | Refractive index | Abbe number | Focal Length (mm) |
|---|---|---|---|---|---|---|---|---|
| 6 |  | Aspherical | 3.492 | 0.142 |  |  |  |  |
| 7 | Third Lens | Aspherical | 2.957 | 0.240 | Plastic | 1.68 | 19.25 | 26.71 |
| 8 |  | Aspherical | 3.419 | 0.258 |  |  |  |  |
| 9 | Fourth Lens | Aspherical | 10.443 | 0.450 | Plastic | 1.55 | 56.14 | 29.79 |
| 10 |  | Aspherical | 28.747 | 0.251 |  |  |  |  |
| 11 | Fifth Lens | Aspherical | 5.267 | 0.262 | Plastic | 1.57 | 37.35 | −111.98 |
| 12 |  | Aspherical | 4.778 | 0.299 |  |  |  |  |
| 13 | Sixth Lens | Aspherical | 14.466 | 0.516 | Plastic | 1.57 | 37.35 | 4.66 |
| 14 |  | Aspherical | −3.213 | 0.054 |  |  |  |  |
| 15 | Seventh Lens | Aspherical | 10.711 | 0.330 | Plastic | 1.64 | 23.80 | −11.91 |
| 16 |  | Aspherical | 4.401 | 0.352 |  |  |  |  |
| 17 | Eighth Lens | Aspherical | 11.410 | 0.408 | Plastic | 1.55 | 56.14 | −4.74 |
| 18 |  | Aspherical | 2.082 | 0.264 |  |  |  |  |
| 19 | Infrared Cut-off Filter | Spherical | Infinite | 0.395 | Glass |  |  | 0.00 |
| 20 |  | Spherical | Infinite | 0.353 |  |  |  |  |
| 21 | Image Surface | Spherical | Infinite | 0.000 |  |  |  |  |

Note:
the reference wavelength is 555 nm

TABLE 2

First Embodiment
Aspheric Coefficient

| Surface Number | 3 | 4 | 5 | 6 | 7 | 8 | 9 | 10 |
|---|---|---|---|---|---|---|---|---|
| K | −0.5153 | −5.2760 | −0.6202 | −3.3241 | 0.0000 | −2.8378 | −10.7419 | −17.8158 |
| A4 | 0.0036 | 0.0147 | 0.0099 | −0.0206 | −0.0891 | −0.0515 | −0.0326 | −0.0389 |
| A6 | 0.0104 | −0.0229 | 0.0081 | 0.0807 | 0.0963 | 0.0425 | 0.0285 | 0.0083 |
| A8 | −0.0135 | −0.0537 | −0.1311 | −0.1987 | −0.1801 | −0.0548 | −0.0523 | 0.0314 |
| A10 | 0.0104 | 0.1212 | 0.2291 | 0.2822 | 0.2357 | 0.0668 | 0.0232 | −0.1024 |
| A12 | −0.0027 | −0.1058 | −0.1932 | −0.2611 | −0.2516 | −0.0992 | 0.0372 | 0.1262 |
| A14 | −0.0014 | 0.0510 | 0.0942 | 0.1646 | 0.2055 | 0.1202 | −0.0703 | −0.0902 |
| A16 | 0.0013 | −0.0144 | −0.0272 | −0.0692 | −0.1094 | −0.0813 | 0.0519 | 0.0390 |
| A18 | −0.0004 | 0.0022 | 0.0044 | 0.0173 | 0.0325 | 0.0278 | −0.0187 | −0.0095 |
| A20 | 0.0000 | −0.0002 | −0.0003 | −0.0019 | −0.0040 | −0.0037 | 0.0026 | 0.0010 |

| Surface Number | 11 | 12 | 13 | 14 | 15 | 16 | 17 | 18 |
|---|---|---|---|---|---|---|---|---|
| K | −10.0000 | −5.0381 | −7.2226 | −8.3657 | 3.0944 | −8.7988 | 6.3520 | −0.9189 |
| A4 | −0.1187 | −0.1205 | −0.0225 | 0.0949 | 0.1251 | 0.0597 | −0.1656 | −0.1964 |
| A6 | 0.1219 | 0.0995 | 0.1323 | −0.0860 | −0.2782 | −0.1543 | 0.0283 | 0.0811 |
| A8 | −0.2091 | −0.1579 | −0.2677 | 0.0034 | 0.2144 | 0.1080 | 0.0160 | −0.0254 |
| A10 | 0.2902 | 0.1719 | 0.2780 | 0.0384 | −0.1187 | −0.0480 | −0.0095 | 0.0061 |
| A12 | −0.2713 | −0.1187 | −0.1822 | −0.0321 | 0.0466 | 0.0144 | 0.0024 | −0.0011 |
| A14 | 0.1567 | 0.0489 | 0.0755 | 0.0130 | −0.0119 | −0.0029 | −0.0003 | 0.0001 |
| A16 | −0.0538 | −0.0112 | −0.0191 | −0.0029 | 0.0018 | 0.0003 | 0.0000 | 0.0000 |
| A18 | 0.0101 | 0.0013 | 0.0027 | 0.0003 | −0.0002 | 0.0000 | 0.0000 | 0.0000 |
| A20 | −0.0008 | −0.0001 | −0.0002 | 0.0000 | 0.0000 | 0.0000 | 0.0000 | 0.0000 |

Second Embodiment

Figure 3:
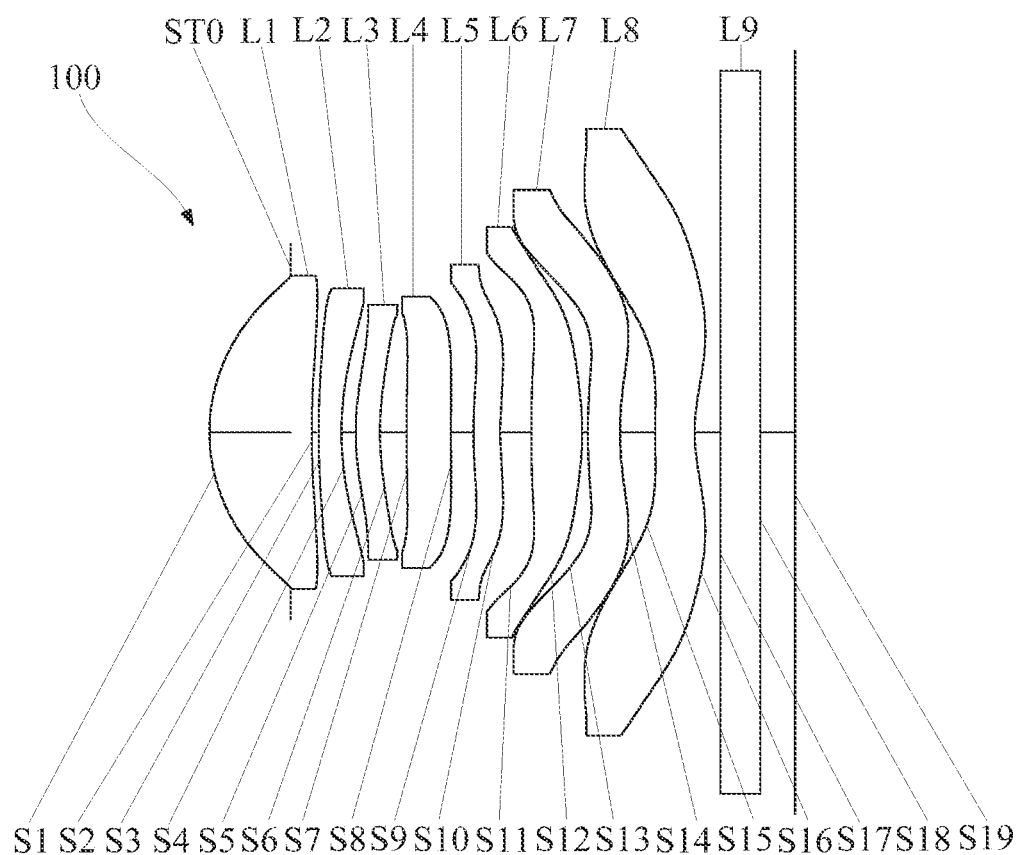
FIG. 3 is a schematic view of an optical system according to a second embodiment of the present disclosure.
Figure 4:
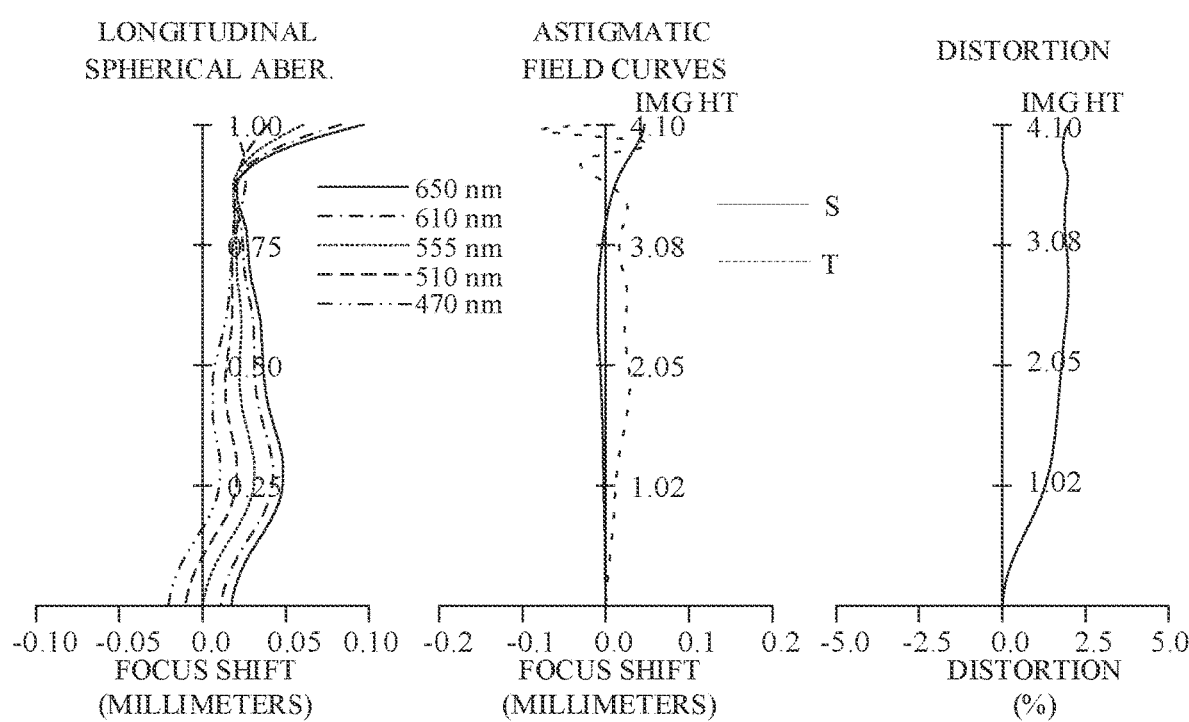
FIG. 4 is a graph showing longitudinal spherical aberration (mm), astigmatism (mm), and distortion (%) of the optical system according to the second embodiment.

Referring to FIG. 3, in the second embodiment, the optical system 100 includes a stop STO, a first lens L1 having a positive refractive power, a second lens L2 having a negative refractive power, a third lens L3 having a positive refractive power, a fourth lens L4 having a positive refractive power, a fifth lens L5 having a positive refractive power, a sixth lens L6 having a positive refractive power, a seventh lens L7 having a negative refractive power, and an eighth lens L8 having a negative refractive power, successively in order from an object side to an image side. FIG. 4 is a graph showing longitudinal spherical aberration (mm), astigmatism (mm), and distortion (%) of the optical system 100 according to the second embodiment. The astigmatism diagram and the distortion diagram are data diagrams at a reference wavelength. The reference wavelength in each embodiment is 555 nm.

An object side surface S1 of the first lens L1 is convex at the paraxial position, and an image side surface S2 of the first lens L1 is concave at the paraxial position. The object side surface S1 of the first lens L1 is convex at its circumference, and the image side surface S2 of the first lens L1 is convex at its circumference.

An object side surface S3 of the second lens L2 is convex at the paraxial position, and an image side surface S4 of the second lens L2 is concave at the paraxial position. The object side surface S3 of the second lens L2 is convex at its circumference, and the image side surface S4 of the second lens L2 is concave at its circumference.

An object side surface S5 of the third lens L3 is convex at the paraxial position, and an image side surface S6 of the third lens L3 is concave at the paraxial position. The object side surface S5 of the third lens L3 is concave at its circumference, and the image side surface S6 of the third lens L3 is concave at its circumference.

An object side surface S7 of the fourth lens L4 is convex at the paraxial position, and an image side surface S8 of the fourth lens L4 is concave at the paraxial position. The object side surface S7 of the fourth lens L4 is concave at its circumference, and the image side surface S8 of the fourth lens L4 is convex at its circumference.

An object side surface S9 of the fifth lens L5 is convex at the paraxial position, and an image side surface S10 of the fifth lens L5 is concave at the paraxial position. The object side surface S9 of the fifth lens L5 is concave at its circumference, and the image side surface S10 of the fifth lens L5 is convex at its circumference.

An object side surface S11 of the sixth lens L6 is convex at the paraxial position, and an image side surface S12 of the sixth lens L6 is convex at the paraxial position. The object side surface S11 of the sixth lens L6 is concave at its circumference, and the image side surface S12 of the sixth lens L6 is convex at its circumference.

An object side surface S13 of the seventh lens L7 is convex at the paraxial position, and an image side surface S14 of the seventh lens L7 is concave at the paraxial position. The object side surface S13 of the seventh lens L7 is concave at its circumference, and the image side surface S14 of the seventh lens L7 is convex at its circumference.

An object side surface S15 of the eighth lens L8 is convex at the paraxial position, and an image side surface S16 of the eighth lens L8 is concave at the paraxial position. The object side surface S15 of the eighth lens L8 is convex at its circumference, and the image side surface S16 of the eighth lens L8 is convex at its circumference.

In the second embodiment, the effective focal length of the optical system 100 is indicated by f, and f=4.75 mm. The f-number is indicated by FNO, and FNO=1.397. The maximum angle of field of view (diagonal angle of view) is indicated by FOV, and FOV=80.33 degrees (deg.). The distance from the object side surface S1 of the first lens L1 to the imaging surface S19 on the optical axis is indicated by TTL, and TTL=5.9 mm.

Various parameters of the optical system 100 are given in Table 3 and Table 4. Definitions of the various parameters can be obtained from the first embodiment, and which will not be repeated herein.

TABLE 3

Second Embodiment
f = 4.75 mm, FNO = 1.397, FOV = 80.33 degrees, TTL = 5.9 mm

| Surface Number | Surface Name | Surface Shape | Y radius (mm) | Thickness (mm) | Material | Refractive index | Abbe number | Focal Length (mm) |
|---|---|---|---|---|---|---|---|---|
| 0 | Object Surface | Spherical | Infinite | Infinite | | | | |
| 1 | Spherical Surface | Spherical | Infinite | 0.000 | | | | |
| 2 | Stop | Spherical | Infinite | −0.820 | | | | |
| 3 | First Lens | Aspherical | 2.058 | 1.057 | Plastic | 1.55 | 56.14 | 4.51 |
| 4 | | Aspherical | 10.233 | 0.043 | | | | |
| 5 | Second Lens | Aspherical | 10.079 | 0.231 | Plastic | 1.68 | 19.25 | −7.98 |
| 6 | | Aspherical | 3.486 | 0.143 | | | | |
| 7 | Third Lens | Aspherical | 2.962 | 0.245 | Plastic | 1.68 | 19.25 | 22.59 |
| 8 | | Aspherical | 3.550 | 0.265 | | | | |
| 9 | Fourth Lens | Aspherical | 13.008 | 0.450 | Plastic | 1.55 | 56.14 | 49.69 |
| 10 | | Aspherical | 24.691 | 0.227 | | | | |
| 11 | Fifth Lens | Aspherical | 4.972 | 0.271 | Plastic | 1.57 | 37.35 | 1584.93 |
| 12 | | Aspherical | 4.900 | 0.310 | | | | |
| 13 | Sixth Lens | Aspherical | 14.895 | 0.515 | Plastic | 1.57 | 37.35 | 4.69 |
| 14 | | Aspherical | −3.220 | 0.057 | | | | |
| 15 | Seventh Lens | Aspherical | 10.710 | 0.325 | Plastic | 1.64 | 23.80 | −11.79 |
| 16 | | Aspherical | 4.375 | 0.352 | | | | |
| 17 | Eighth Lens | Aspherical | 12.067 | 0.400 | Plastic | 1.55 | 56.14 | −4.73 |
| 18 | | Aspherical | 2.102 | 0.262 | | | | |
| 19 | Infrared Cut-off Filter | Spherical | Infinite | 0.396 | Glass | | | |
| 20 | | Spherical | Infinite | 0.353 | | | | |
| 21 | Image Surface | Spherical | Infinite | 0.000 | | | | |

Note:
the reference wavelength is 555 nm

TABLE 4

Second Embodiment
Aspheric Coefficient

| Surface Number | 3 | 4 | 5 | 6 | 7 | 8 | 9 | 10 |
|---|---|---|---|---|---|---|---|---|
| K | −0.5160 | −5.6376 | −0.0950 | −3.3562 | 0.0000 | −2.6687 | −6.9795 | −17.9520 |
| A4 | 0.0045 | 0.0175 | 0.0104 | −0.0201 | −0.0934 | −0.0501 | −0.0266 | −0.0481 |
| A6 | 0.0067 | −0.0366 | 0.0005 | 0.0688 | 0.1251 | 0.0374 | −0.0111 | 0.0345 |
| A8 | −0.0063 | −0.0250 | −0.1103 | −0.1585 | −0.2729 | −0.0377 | 0.0767 | −0.0286 |
| A10 | 0.0017 | 0.0878 | 0.2032 | 0.2154 | 0.4127 | 0.0319 | −0.2294 | −0.0075 |
| A12 | 0.0039 | −0.0822 | −0.1752 | −0.1926 | −0.4593 | −0.0543 | 0.3519 | 0.0304 |
| A14 | −0.0046 | 0.0406 | 0.0868 | 0.1180 | 0.3548 | 0.0815 | −0.3203 | −0.0294 |

TABLE 4-continued

Second Embodiment
Aspheric Coefficient

| A16 | 0.0022 | −0.0116 | −0.0254 | −0.0486 | −0.1732 | −0.0596 | 0.1746 | 0.0155 |
| A18 | −0.0005 | 0.0018 | 0.0041 | 0.0119 | 0.0472 | 0.0208 | −0.0526 | −0.0045 |
| A20 | 0.0000 | −0.0001 | −0.0003 | −0.0013 | −0.0055 | −0.0028 | 0.0067 | 0.0006 |

| Surface Number | 11 | 12 | 13 | 14 | 15 | 16 | 17 | 18 |
| --- | --- | --- | --- | --- | --- | --- | --- | --- |
| K | −9.4341 | −4.4098 | −10.0000 | −8.2497 | 3.4440 | −9.0468 | 6.1662 | −0.9055 |
| A4 | −0.1113 | −0.1122 | −0.0180 | 0.0953 | 0.1260 | 0.0708 | −0.1552 | −0.1910 |
| A6 | 0.0985 | 0.0819 | 0.1183 | −0.0899 | −0.2835 | −0.1712 | 0.0190 | 0.0744 |
| A8 | −0.1616 | −0.1335 | −0.2446 | 0.0123 | 0.2186 | 0.1207 | 0.0198 | −0.0218 |
| A10 | 0.2319 | 0.1487 | 0.2543 | 0.0282 | −0.1209 | −0.0539 | −0.0103 | 0.0051 |
| A12 | −0.2275 | −0.1035 | −0.1668 | −0.0257 | 0.0478 | 0.0163 | 0.0024 | −0.0009 |
| A14 | 0.1368 | 0.0424 | 0.0692 | 0.0106 | −0.0124 | −0.0032 | −0.0003 | 0.0001 |
| A16 | −0.0486 | −0.0094 | −0.0176 | −0.0024 | 0.0019 | 0.0004 | 0.0000 | 0.0000 |
| A18 | 0.0095 | 0.0010 | 0.0025 | 0.0003 | −0.0002 | 0.0000 | 0.0000 | 0.0000 |
| A20 | −0.0008 | 0.0000 | −0.0002 | 0.0000 | 0.0000 | 0.0000 | 0.0000 | 0.0000 |

According to the various parameters provided as above, the following conditions can be derived.

| Second Embodiment | | | |
| --- | --- | --- | --- |
| f (mm) | 4.75 | f/f1 | 1.05 |
| FNO | 1.397 | (R9 + R10)/(R9*R10) | 0.12 |
| FOV (degree) | 80.33 | (R3 + R4)/f1 | 2.72 |
| TTL (mm) | 5.9 | R5/R6 | 2.89 |
| TTL/L | 1.74 | |R7 + R8|/|R7 − R8| | 11.08 |
| f14 | 5.64 | f1/f2 | −0.57 |
| f58 | −26.86 | (R17*R18)/(R17 − R18) | 2.55 |
| f14/f58 | −0.21 | ΣCT/f | 0.74 |
| Fno/TTL | 0.237 | ΣCT/TTL | 0.59 |
| | | ET1/CT1 | 0.264 |
| TTL/Imgh | 1.475 | ET8/CT8 | 0.88 |
| TTL/|f| | 1.243 | Imgh (mm) | 4.0 |

Third Embodiment

Figure 5:
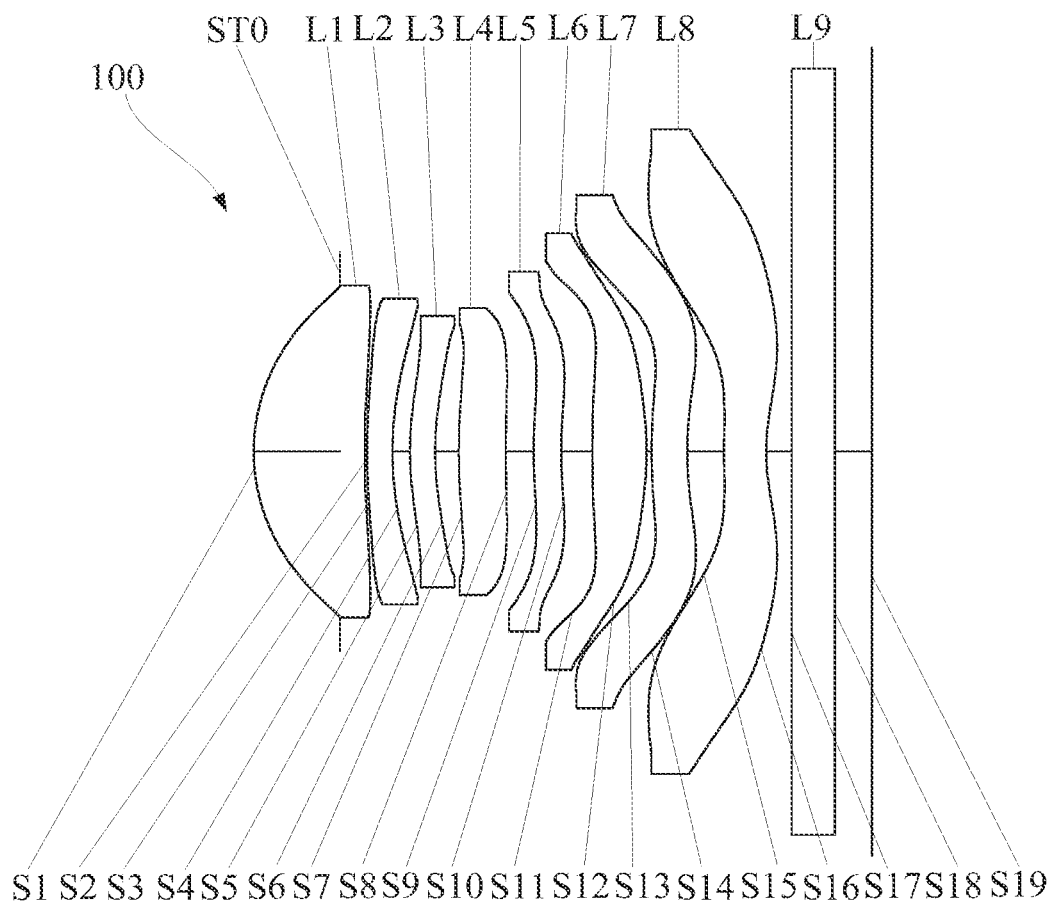
FIG. 5 is a schematic view of an optical system according to a third embodiment of the present disclosure.
Figure 6:
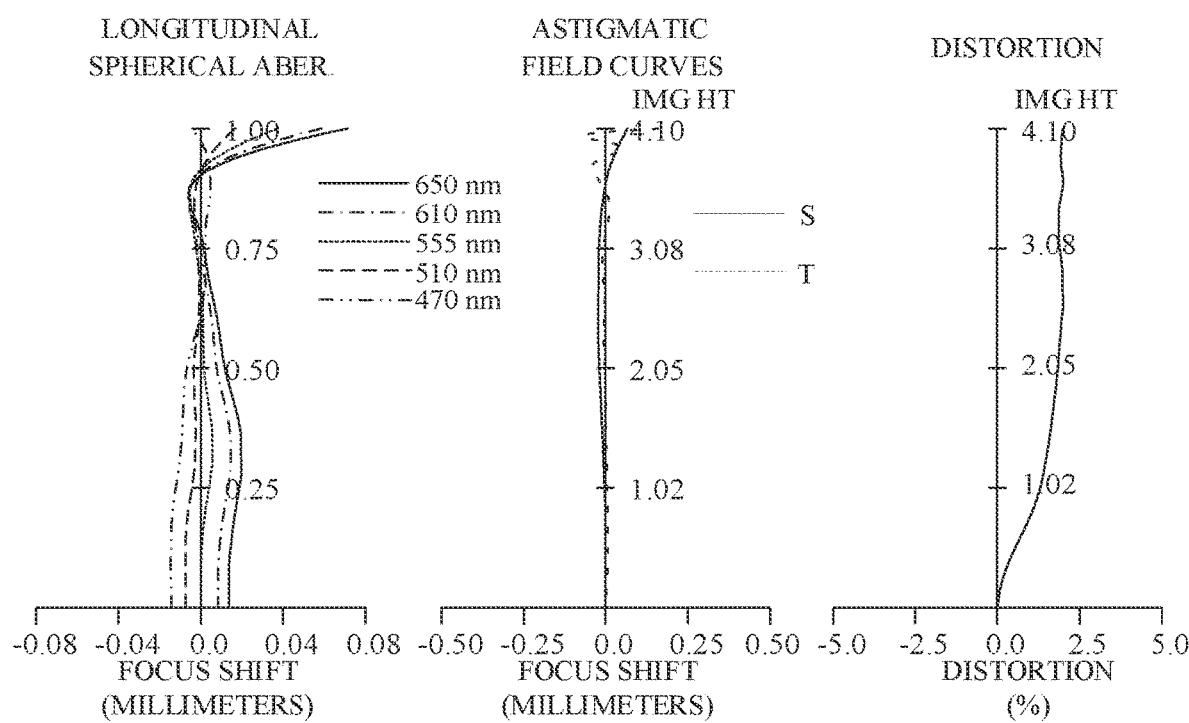
FIG. 6 is a graph showing longitudinal spherical aberration (mm), astigmatism (mm), and distortion (%) of the optical system according to the third embodiment.

Referring to FIG. 5, in the third embodiment, the optical system 100 includes a stop STO, a first lens L1 having a positive refractive power, a second lens L2 having a negative refractive power, a third lens L3 having a negative refractive power, a fourth lens L4 having a positive refractive power, a fifth lens L5 having a negative refractive power, a sixth lens L6 having a positive refractive power, a seventh lens L7 having a negative refractive power, and an eighth lens L8 having a negative refractive power, successively in order from an object side to an image side. FIG. 6 is a graph showing longitudinal spherical aberration (mm), astigmatism (mm), and distortion (%) of the optical system 100 according to the third embodiment. The astigmatism diagram and the distortion diagram are data diagrams at a reference wavelength. The reference wavelength in each embodiment is 555 nm.

An object side surface S1 of the first lens L1 is convex at the paraxial position, and an image side surface S2 of the first lens L1 is concave at the paraxial position. The object side surface S1 of the first lens L1 is convex at its circumference, and the image side surface S2 of the first lens L1 is convex at its circumference.

An object side surface S3 of the second lens L2 is convex at the paraxial position, and an image side surface S4 of the second lens L2 is concave at the paraxial position. The object side surface S3 of the second lens L2 is convex at its circumference, and the image side surface S4 of the second lens L2 is concave at its circumference.

An object side surface S5 of the third lens L3 is convex at the paraxial position, and an image side surface S6 of the third lens L3 is concave at the paraxial position. The object side surface S5 of the third lens L3 is concave at its circumference, and the image side surface S6 of the third lens L3 is concave at its circumference.

An object side surface S7 of the fourth lens L4 is convex at the paraxial position, and an image side surface S8 of the fourth lens L4 is concave at the paraxial position. The object side surface S7 of the fourth lens L4 is concave at its circumference, and the image side surface S8 of the fourth lens L4 is convex at its circumference.

An object side surface S9 of the fifth lens L5 is convex at the paraxial position, and an image side surface S10 of the fifth lens L5 is concave at the paraxial position. The object side surface S9 of the fifth lens L5 is concave at its circumference, and the image side surface S10 of the fifth lens L5 is convex at its circumference.

An object side surface S11 of the sixth lens L6 is convex at the paraxial position, and an image side surface S12 of the sixth lens L6 is convex at the paraxial position. The object side surface S11 of the sixth lens L6 is concave at its circumference, and the image side surface S12 of the sixth lens L6 is convex at its circumference.

An object side surface S13 of the seventh lens L7 is convex at the paraxial position, and an image side surface S14 of the seventh lens L7 is concave at the paraxial position. The object side surface S13 of the seventh lens L7 is concave at its circumference, and the image side surface S14 of the seventh lens L7 is convex at its circumference.

An object side surface S15 of the eighth lens L8 is convex at the paraxial position, and an image side surface S16 of the eighth lens L8 is concave at the paraxial position. The object side surface S15 of the eighth lens L8 is convex at its circumference, and the image side surface S16 of the eighth lens L8 is convex at its circumference.

In the third embodiment, the effective focal length of the optical system 100 is indicated by f, and f=4.76 mm. The f-number is indicated by FNO, and FNO=1.397. The maximum angle of field of view (diagonal angle of view) is indicated by FOV, and FOV=80.40 degrees (deg.). The distance from the object side surface S1 of the first lens L1 to the imaging surface S19 on the optical axis is indicated by TTL, and TTL=5.9 mm.

Various parameters of the optical system 100 are given in Table 5 and Table 6. Definitions of the various parameters can be obtained from the first embodiment, and which will not be repeated herein.

TABLE 5

Third Embodiment
f = 4.76 mm, FNO = 1.397, FOV = 80.40 degrees, TTL = 5.9 mm

| Surface Number | Surface Name | Surface Shape | Y radius (mm) | Thickness (mm) | Material | Refractive index | Abbe number | Focal Length (mm) |
|---|---|---|---|---|---|---|---|---|
| 0 | Object Surface | Spherical | Infinite | Infinite | | | | |
| 1 | Spherical Surface | Spherical | Infinite | 0.000 | | | | |
| 2 | Stop | Spherical | Infinite | −0.820 | | | | |
| 3 | First Lens | Aspherical | 2.067 | 1.058 | Plastic | 1.55 | 56.14 | 4.54 |
| 4 | | Aspherical | 10.179 | 0.025 | | | | |
| 5 | Second Lens | Aspherical | 9.198 | 0.242 | Plastic | 1.68 | 19.25 | −9.85 |
| 6 | | Aspherical | 3.826 | 0.167 | | | | |
| 7 | Third Lens | Aspherical | 3.300 | 0.240 | Plastic | 1.68 | 19.25 | −373.27 |
| 8 | | Aspherical | 3.162 | 0.226 | | | | |
| 9 | Fourth Lens | Aspherical | 6.462 | 0.450 | Plastic | 1.55 | 56.14 | 21.25 |
| 10 | | Aspherical | 14.229 | 0.265 | | | | |
| 11 | Fifth Lens | Aspherical | 5.047 | 0.263 | Plastic | 1.57 | 37.35 | −106.57 |
| 12 | | Aspherical | 4.572 | 0.297 | | | | |
| 13 | Sixth Lens | Aspherical | 13.979 | 0.517 | Plastic | 1.57 | 37.35 | 4.70 |
| 14 | | Aspherical | −3.270 | 0.049 | | | | |
| 15 | Seventh Lens | Aspherical | 10.148 | 0.340 | Plastic | 1.64 | 23.80 | −13.53 |
| 16 | | Aspherical | 4.612 | 0.352 | | | | |
| 17 | Eighth Lens | Aspherical | 12.576 | 0.400 | Plastic | 1.55 | 56.14 | −4.73 |
| 18 | | Aspherical | 2.118 | 0.243 | | | | |
| 19 | Infrared Cut-off Filter | Spherical | Infinite | 0.414 | Glass | | | |
| 20 | | Spherical | Infinite | 0.353 | | | | |
| 21 | Image Surface | Spherical | Infinite | 0.000 | | | | |

Note:
the reference wavelength is 555 nm

TABLE 6

Third Embodiment
Aspheric Coefficient

| Surface Number | 3 | 4 | 5 | 6 | 7 | 8 | 9 | 10 |
|---|---|---|---|---|---|---|---|---|
| K | −0.5132 | −0.5132 | −0.4422 | −2.3137 | 0.0000 | −3.7654 | −8.7489 | 0.8357 |
| A4 | 0.0066 | 0.0066 | 0.0415 | 0.0002 | −0.0878 | −0.0766 | −0.0347 | −0.0387 |
| A6 | −0.0019 | −0.0019 | −0.1016 | 0.0231 | 0.0763 | 0.1252 | 0.0224 | 0.0069 |
| A8 | 0.0101 | 0.0101 | 0.0472 | −0.0830 | −0.1074 | −0.2764 | 0.0123 | 0.0466 |
| A10 | −0.0165 | −0.0165 | 0.0515 | 0.1168 | 0.1035 | 0.4951 | −0.1459 | −0.1351 |
| A12 | 0.0164 | 0.0164 | −0.0736 | −0.0976 | −0.0910 | −0.6321 | 0.2844 | 0.1669 |
| A14 | −0.0099 | −0.0099 | 0.0384 | 0.0551 | 0.0764 | 0.5388 | −0.2919 | −0.1220 |
| A16 | 0.0035 | 0.0035 | −0.0098 | −0.0218 | −0.0451 | −0.2829 | 0.1715 | 0.0537 |
| A18 | −0.0007 | −0.0007 | 0.0011 | 0.0055 | 0.0147 | 0.0821 | −0.0544 | −0.0133 |
| A20 | 0.0001 | 0.0001 | 0.0000 | −0.0006 | −0.0020 | −0.0100 | 0.0072 | 0.0014 |

| Surface Number | 11 | 12 | 13 | 14 | 15 | 16 | 17 | 18 |
|---|---|---|---|---|---|---|---|---|
| K | −9.8116 | −5.2460 | −8.5850 | −7.8195 | 3.3661 | −8.8408 | 6.3032 | −0.9285 |
| A4 | −0.1229 | −0.1281 | −0.0294 | 0.0851 | 0.1322 | 0.0800 | −0.1620 | −0.1932 |
| A6 | 0.1304 | 0.1217 | 0.1393 | −0.0884 | −0.2997 | −0.1859 | 0.0338 | 0.0785 |
| A8 | −0.2334 | −0.2020 | −0.2624 | 0.0221 | 0.2338 | 0.1340 | 0.0081 | −0.0237 |
| A10 | 0.3319 | 0.2228 | 0.2626 | 0.0215 | −0.1248 | −0.0613 | −0.0057 | 0.0055 |
| A12 | −0.3143 | −0.1554 | −0.1686 | −0.0245 | 0.0463 | 0.0187 | 0.0014 | −0.0010 |
| A14 | 0.1855 | 0.0659 | 0.0689 | 0.0110 | −0.0112 | −0.0037 | −0.0002 | 0.0001 |
| A16 | −0.0659 | −0.0160 | −0.0173 | −0.0025 | 0.0017 | 0.0005 | 0.0000 | 0.0000 |
| A18 | 0.0130 | 0.0020 | 0.0024 | 0.0003 | −0.0001 | 0.0000 | 0.0000 | 0.0000 |
| A20 | −0.0011 | −0.0001 | −0.0001 | 0.0000 | 0.0000 | 0.0000 | 0.0000 | 0.0000 |

According to the various parameters provided as above, the following conditions can be derived.

| Third Embodiment | | | |
|---|---|---|---|
| f (mm) | 4.76 | f/f1 | 1.05 |
| FNO | 1.397 | (R9 + R10)/(R9*R10) | 0.23 |
| FOV (degree) | 80.40 | (R3 + R4)/f1 | 2.70 |
| TTL (mm) | 5.9 | R5/R6 | 2.40 |
| TTL/L | 1.73 | \|R7 + R8\|/\|R7 − R8\| | 46.76 |
| f14 | 5.59 | f1/f2 | −0.46 |
| f58 | −26.20 | (R17*R18)/(R17 − R18) | 2.55 |
| f14/f58 | −0.21 | ΣCT/f | 0.74 |
| Fno/TTL | 0.237 | ΣCT/TTL | 0.59 |
| | | ET1/CT1 | 0.264 |
| TTL/Imgh | 1.475 | ET8/CT8 | 0.90 |
| TTL/\|f\| | 1.242 | Imgh (mm) | 4.0 |

Fourth Embodiment

Figure 7:
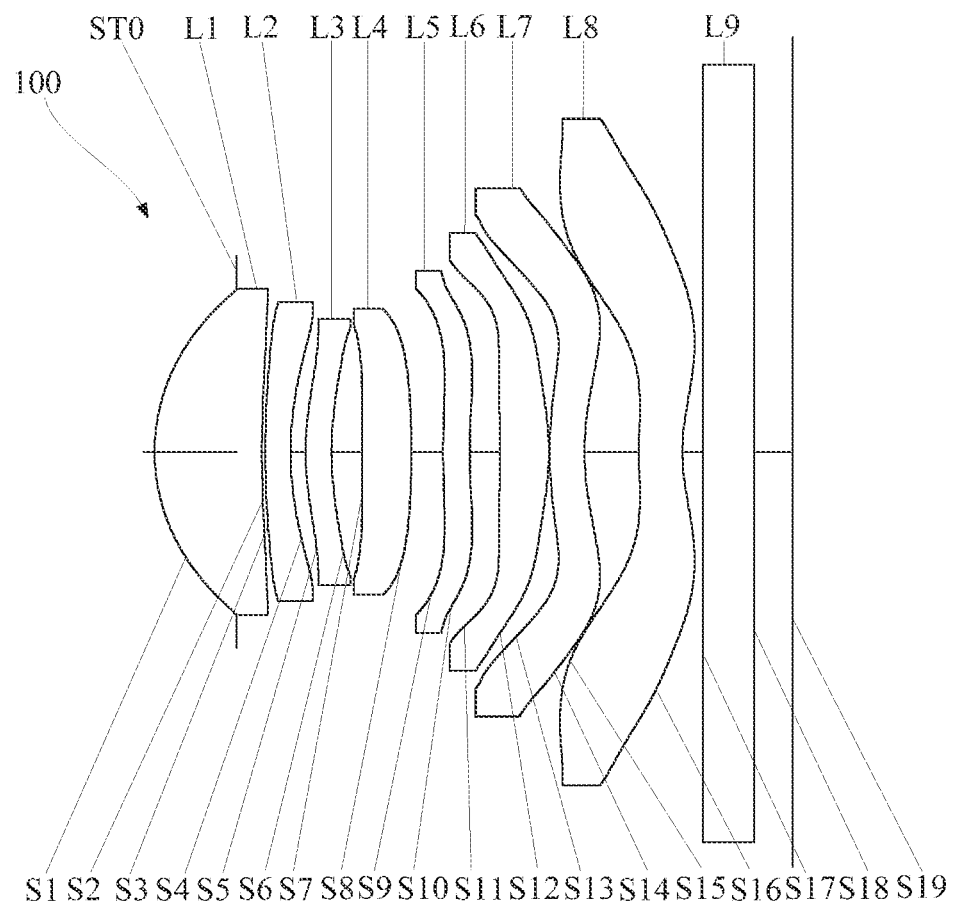
FIG. 7 is a schematic view of an optical system according to a fourth embodiment of the present disclosure.
Figure 8:
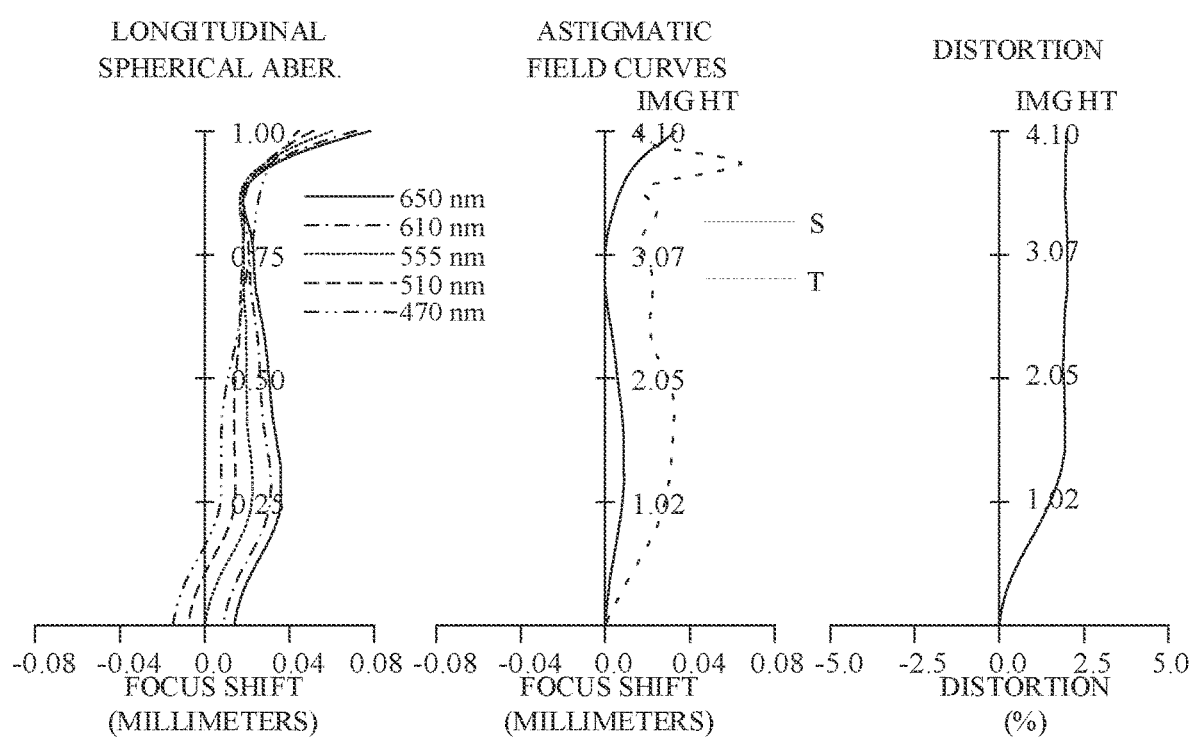
FIG. 8 is a graph showing longitudinal spherical aberration (mm), astigmatism (mm), and distortion (%) of the optical system according to the fourth embodiment.

Referring to FIG. 7, in the fourth embodiment, the optical system 100 includes a stop STO, a first lens L1 having a positive refractive power, a second lens L2 having a negative refractive power, a third lens L3 having a positive refractive power, a fourth lens L4 having a positive refractive power, a fifth lens L5 having a negative refractive power, a sixth lens L6 having a positive refractive power, a seventh lens L7 having a negative refractive power, and an eighth lens L8 having a negative refractive power, successively in order from an object side to an image side. FIG. 8 is a graph showing longitudinal spherical aberration (mm), astigmatism (mm), and distortion (%) of the optical system 100 according to the fourth embodiment. The astigmatism diagram and the distortion diagram are data diagrams at a reference wavelength. The reference wavelength in each embodiment is 555 nm.

An object side surface S1 of the first lens L1 is convex at the paraxial position, and an image side surface S2 of the first lens L1 is concave at the paraxial position. The object side surface S1 of the first lens L1 is convex at its circumference, and the image side surface S2 of the first lens L1 is concave at its circumference.

An object side surface S3 of the second lens L2 is convex at the paraxial position, and an image side surface S4 of the second lens L2 is concave at the paraxial position. The object side surface S3 of the second lens L2 is convex at its circumference, and the image side surface S4 of the second lens L2 is concave at its circumference.

An object side surface S5 of the third lens L3 is convex at the paraxial position, and an image side surface S6 of the third lens L3 is concave at the paraxial position. The object side surface S5 of the third lens L3 is convex at its circumference, and the image side surface S6 of the third lens L3 is concave at its circumference.

An object side surface S7 of the fourth lens L4 is concave at the paraxial position, and an image side surface S8 of the fourth lens L4 is convex at the paraxial position. The object side surface S7 of the fourth lens L4 is concave at its circumference, and the image side surface S8 of the fourth lens L4 is convex at its circumference.

An object side surface S9 of the fifth lens L5 is convex at the paraxial position, and an image side surface S10 of the fifth lens L5 is concave at the paraxial position. The object side surface S9 of the fifth lens L5 is concave at its circumference, and the image side surface S10 of the fifth lens L5 is convex at its circumference.

An object side surface S11 of the sixth lens L6 is concave at the paraxial position, and an image side surface S12 of the sixth lens L6 is convex at the paraxial position. The object side surface S11 of the sixth lens L6 is concave at its circumference, and the image side surface S12 of the sixth lens L6 is convex at its circumference.

An object side surface S13 of the seventh lens L7 is convex at the paraxial position, and an image side surface S14 of the seventh lens L7 is concave at the paraxial position. The object side surface S13 of the seventh lens L7 is concave at its circumference, and the image side surface S14 of the seventh lens L7 is convex at its circumference.

An object side surface S15 of the eighth lens L8 is convex at the paraxial position, and an image side surface S16 of the eighth lens L8 is concave at the paraxial position. The object side surface S15 of the eighth lens L8 is convex at its circumference, and the image side surface S16 of the eighth lens L8 is convex at its circumference.

In the third embodiment, the effective focal length of the optical system 100 is indicated by f, and f=4.79 mm. The f-number is indicated by FNO, and FNO=1.481. The maximum angle of field of view (diagonal angle of view) is indicated by FOV, and FOV=79.84 degrees (deg.). The distance from the object side surface S1 of the first lens L1 to the imaging surface S19 on the optical axis is indicated by TTL, and TTL=5.9 mm.

Various parameters of the optical system 100 are given in Table 7 and Table 8. Definitions of the various parameters can be obtained from the first embodiment, and which will not be repeated herein.

TABLE 7

Fourth Embodiment
f = 4.79 mm, FNO = 1.481, FOV = 79.84 degrees, TTL = 5.9 mm

| Surface Number | Surface Name | Surface Shape | Y radius (mm) | Thickness (mm) | Material | Refractive index | Abbe number | Focal Length (mm) |
|---|---|---|---|---|---|---|---|---|
| 0 | Object Surface | Spherical | Infinite | Infinite | | | | |
| 1 | Spherical Surface | Spherical | Infinite | 0.000 | | | | |
| 2 | Stop | Spherical | Infinite | −0.757 | | | | |
| 3 | First Lens | Aspherical | 2.030 | 0.991 | Plastic | 1.55 | 56.14 | 4.33 |
| 4 | | Aspherical | 11.846 | 0.032 | | | | |
| 5 | Second Lens | Aspherical | 9.759 | 0.234 | Plastic | 1.68 | 19.25 | −7.72 |
| 6 | | Aspherical | 3.373 | 0.140 | | | | |
| 7 | Third Lens | Aspherical | 2.993 | 0.240 | Plastic | 1.68 | 19.25 | 24.74 |
| 8 | | Aspherical | 3.525 | 0.287 | | | | |
| 9 | Fourth Lens | Aspherical | −1000.000 | 0.450 | Plastic | 1.55 | 56.14 | 25.62 |
| 10 | | Aspherical | −13.794 | 0.294 | | | | |

TABLE 7-continued

Fourth Embodiment
f = 4.79 mm, FNO = 1.481, FOV = 79.84 degrees, TTL = 5.9 mm

| Surface Number | Surface Name | Surface Shape | Y radius (mm) | Thickness (mm) | Material | Refractive index | Abbe number | Focal Length (mm) |
|---|---|---|---|---|---|---|---|---|
| 11 | Fifth Lens | Aspherical | 7.405 | 0.248 | Plastic | 1.57 | 37.35 | −68.30 |
| 12 | | Aspherical | 6.146 | 0.274 | | | | |
| 13 | Sixth Lens | Aspherical | −990.000 | 0.458 | Plastic | 1.57 | 37.35 | 4.46 |
| 14 | | Aspherical | −2.540 | 0.010 | | | | |
| 15 | Seventh Lens | Aspherical | 6.216 | 0.318 | Plastic | 1.64 | 23.80 | −7.63 |
| 16 | | Aspherical | 2.680 | 0.506 | | | | |
| 17 | Eighth Lens | Aspherical | 6.933 | 0.400 | Plastic | 1.55 | 56.14 | −5.36 |
| 18 | | Aspherical | 2.016 | 0.186 | | | | |
| 19 | Infrared Cut-off Filter | Aspherical | Infinite | 0.479 | Glass | | | |
| 20 | | Aspherical | Infinite | 0.353 | | | | |
| 21 | Image Surface | Aspherical | Infinite | 0.000 | | | | |

Note:
the reference wavelength is 555 nm

TABLE 8

Fourth Embodiment
Aspheric Coefficient

| Surface Number | 3 | 4 | 5 | 6 | 7 | 8 | 9 | 10 |
|---|---|---|---|---|---|---|---|---|
| K | −0.5169 | 2.2530 | 7.5988 | −3.7415 | 0.0000 | −1.0026 | −18.0000 | −18.0000 |
| A4 | 0.0050 | 0.0081 | 0.0021 | −0.0202 | −0.0804 | −0.0391 | −0.0297 | −0.0400 |
| A6 | 0.0091 | −0.0201 | 0.0117 | 0.0673 | 0.0670 | −0.0021 | 0.0407 | 0.0352 |
| A8 | −0.0140 | −0.0544 | −0.1190 | −0.1464 | −0.1530 | 0.0677 | −0.1332 | −0.0738 |
| A10 | 0.0148 | 0.1445 | 0.2289 | 0.1956 | 0.2477 | −0.2096 | 0.2527 | 0.1054 |
| A12 | −0.0090 | −0.1477 | −0.2158 | −0.1706 | −0.3137 | 0.3348 | −0.3193 | −0.1130 |
| A14 | 0.0029 | 0.0831 | 0.1171 | 0.0958 | 0.2788 | −0.3128 | 0.2608 | 0.0817 |
| A16 | −0.0004 | −0.0272 | −0.0371 | −0.0328 | −0.1519 | 0.1818 | −0.1320 | −0.0372 |
| A18 | 0.0000 | 0.0048 | 0.0063 | 0.0056 | 0.0446 | −0.0609 | 0.0380 | 0.0096 |
| A20 | 0.0000 | −0.0004 | −0.0004 | −0.0002 | −0.0053 | 0.0089 | −0.0049 | −0.0011 |

| Surface Number | 11 | 12 | 13 | 14 | 15 | 16 | 17 | 18 |
|---|---|---|---|---|---|---|---|---|
| K | −9.7462 | −4.7367 | −10.0000 | −15.9507 | −3.2588 | −9.7901 | 0.8437 | −1.1860 |
| A4 | −0.0981 | −0.1158 | −0.0603 | 0.0426 | 0.0808 | −0.0251 | −0.2013 | −0.2005 |
| A6 | 0.0984 | 0.1346 | 0.2032 | 0.0326 | −0.1237 | 0.0252 | 0.0689 | 0.0967 |
| A8 | −0.1411 | −0.1792 | −0.2799 | −0.1115 | 0.0569 | −0.0452 | −0.0163 | −0.0398 |
| A10 | 0.1476 | 0.1479 | 0.2116 | 0.0994 | −0.0178 | 0.0298 | 0.0043 | 0.0118 |
| A12 | −0.1045 | −0.0763 | −0.1030 | −0.0513 | 0.0011 | −0.0113 | −0.0010 | −0.0023 |
| A14 | 0.0457 | 0.0225 | 0.0323 | 0.0165 | 0.0018 | 0.0026 | 0.0001 | 0.0003 |
| A16 | −0.0115 | −0.0031 | −0.0064 | −0.0032 | −0.0007 | −0.0004 | 0.0000 | 0.0000 |
| A18 | 0.0015 | 0.0001 | 0.0008 | 0.0003 | 0.0001 | 0.0000 | 0.0000 | 0.0000 |
| A20 | −0.0001 | 0.0000 | 0.0000 | 0.0000 | 0.0000 | 0.0000 | 0.0000 | 0.0000 |

According to the various parameters provided as above, the following conditions can be derived.

Fourth Embodiment

| | | | |
|---|---|---|---|
| f (mm) | 4.79 | f/f1 | 1.11 |
| FNO | 1.481 | (R9 + R10)/(R9*R10) | −0.07 |
| FOV (degree) | 79.84 | (R3 + R4)/f1 | 3.20 |
| TTL (mm) | 5.9 | R5/R6 | 2.89 |
| TTL/L | 1.82 | |R7 + R8|/|R7 − R8| | 12.25 |
| f14 | 5.27 | f1/f2 | −0.56 |
| f58 | −13.90 | (R17*R18)/(R17 − R18) | 2.84 |
| f14/f58 | −0.38 | ΣCT/f | 0.70 |
| Fno/TTL | 0.251 | ΣCT/TTL | 0.57 |
| | | ET1/CT1 | 0.281 |
| TTL/Imgh | 1.475 | ET8/CT8 | 0.88 |
| TTL/|f| | 1.232 | Imgh (mm) | 4.0 |

Fifth Embodiment

Figure 9:
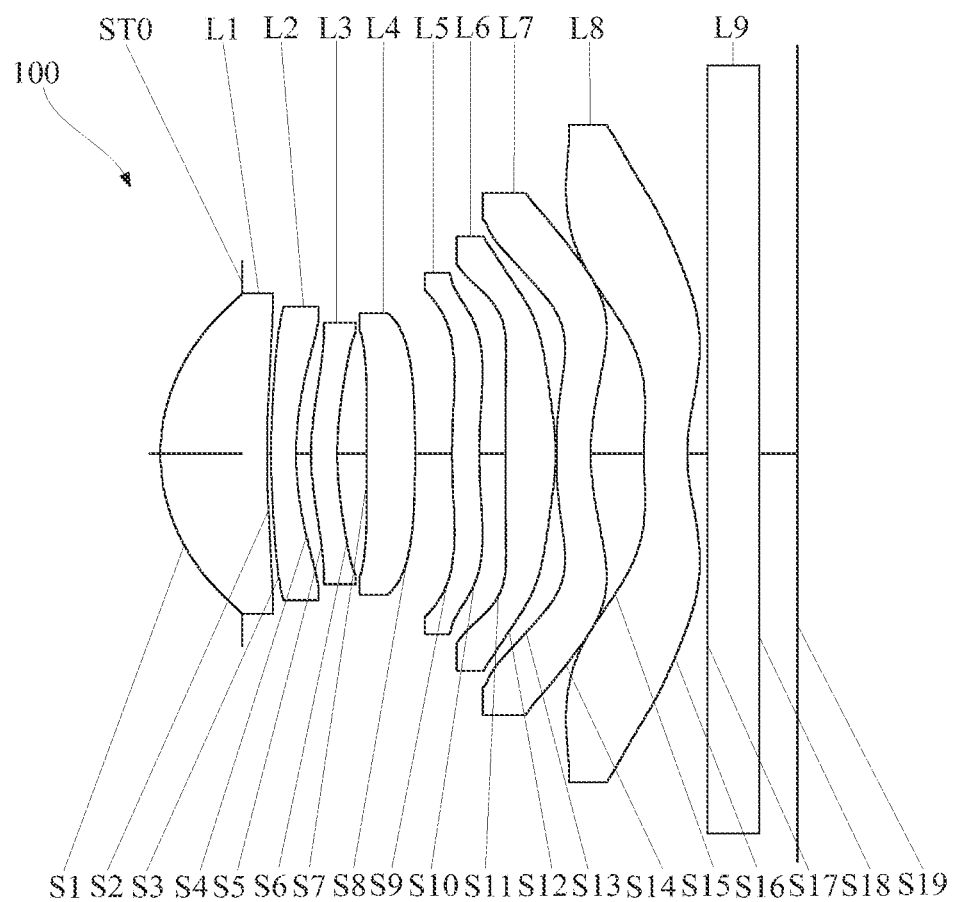
FIG. 9 is a schematic view of an optical system according to a fifth embodiment of the present disclosure.
Figure 10:
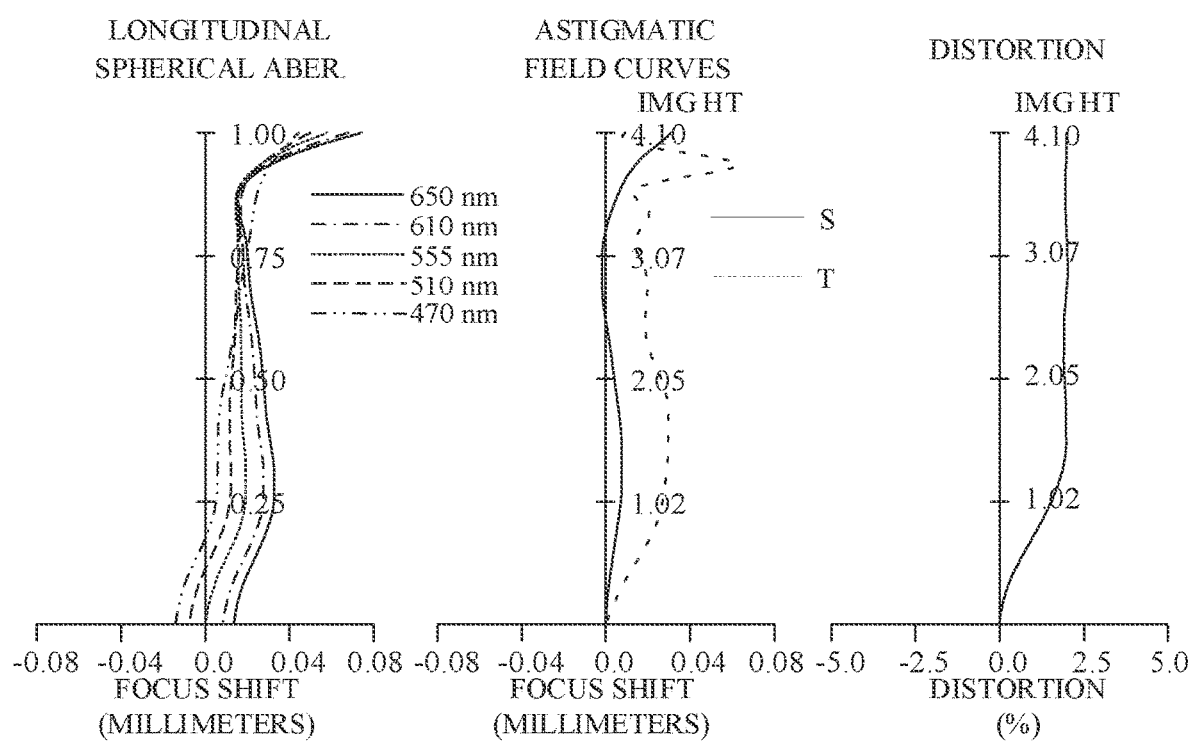
FIG. 10 is a graph showing longitudinal spherical aberration (mm), astigmatism (mm), and distortion (%) of the optical system according to the fifth embodiment.

Referring to FIG. 9, in the fifth embodiment, the optical system 100 includes a stop STO, a first lens L1 having a positive refractive power, a second lens L2 having a negative refractive power, a third lens L3 having a positive refractive power, a fourth lens L4 having a positive refractive power, a fifth lens L5 having a negative refractive power, a sixth lens L6 having a positive refractive power, a seventh lens L7 having a negative refractive power, and an eighth lens L8 having a negative refractive power, successively in order from an object side to an image side. FIG. 10 is a graph showing longitudinal spherical aberration (mm), astigmatism (mm), and distortion (%) of the optical system 100 according to the fifth embodiment. The astigmatism diagram and the distortion diagram are data diagrams at a reference wavelength. The reference wavelength in each embodiment is 555 nm.

An object side surface S1 of the first lens L1 is convex at the paraxial position, and an image side surface S2 of the first lens L1 is concave at the paraxial position. The object side surface S1 of the first lens L1 is convex at its circumference, and the image side surface S2 of the first lens L1 is concave at its circumference.

An object side surface S3 of the second lens L2 is convex at the paraxial position, and an image side surface S4 of the second lens L2 is concave at the paraxial position. The object side surface S3 of the second lens L2 is convex at its circumference, and the image side surface S4 of the second lens L2 is concave at its circumference.

An object side surface S5 of the third lens L3 is convex at the paraxial position, and an image side surface S6 of the third lens L3 is concave at the paraxial position. The object side surface S5 of the third lens L3 is convex at its circumference, and the image side surface S6 of the third lens L3 is concave at its circumference.

An object side surface S7 of the fourth lens L4 is convex at the paraxial position, and an image side surface S8 of the fourth lens L4 is convex at the paraxial position. The object side surface S7 of the fourth lens L4 is concave at its circumference, and the image side surface S8 of the fourth lens L4 is convex at its circumference.

An object side surface S9 of the fifth lens L5 is convex at the paraxial position, and an image side surface S10 of the fifth lens L5 is concave at the paraxial position. The object side surface S9 of the fifth lens L5 is concave at its circumference, and the image side surface S10 of the fifth lens L5 is convex at its circumference.

An object side surface S11 of the sixth lens L6 is convex at the paraxial position, and an image side surface S12 of the sixth lens L6 is convex at the paraxial position. The object side surface S11 of the sixth lens L6 is concave at its circumference, and the image side surface S12 of the sixth lens L6 is convex at its circumference.

An object side surface S13 of the seventh lens L7 is convex at the paraxial position, and an image side surface S14 of the seventh lens L7 is concave at the paraxial position. The object side surface S13 of the seventh lens L7 is concave at its circumference, and the image side surface S14 of the seventh lens L7 is convex at its circumference.

An object side surface S15 of the eighth lens L8 is convex at the paraxial position, and an image side surface S16 of the eighth lens L8 is concave at the paraxial position. The object side surface 15 of the eighth lens L8 is convex at its circumference, and the image side surface S16 of the eighth lens L8 is convex at its circumference.

In the third embodiment, the effective focal length of the optical system 100 is indicated by f, and f=4.78 mm. The f-number is indicated by FNO, and FNO=1.481. The maximum angle of field of view (diagonal angle of view) is indicated by FOV, and FOV=79.95 degrees (deg.). The distance from the object side surface S1 of the first lens L1 to the imaging surface S19 on the optical axis is indicated by TTL, and TTL=5.9 mm.

Various parameters of the optical system 100 are given in Table 9 and Table 10. Definitions of the various parameters can be obtained from the first embodiment, and which will not be repeated herein.

TABLE 9

Fifth Embodiment
f = 4.78 mm, FNO = 1.481, FOV = 79.95 degrees, TTL = 5.9 mm

| Surface Number | Surface Name | Surface Shape | Y radius (mm) | Thickness (mm) | Material | Refractive index | Abbe number | Focal Length (mm) |
|---|---|---|---|---|---|---|---|---|
| 0 | Object Surface | Spherical | Infinite | Infinite | | | | |
| 1 | Spherical Surface | Spherical | Infinite | 0.000 | | | | |
| 2 | Stop | Spherical | Infinite | −0.754 | | | | |
| 3 | First Lens | Aspherical | 2.031 | 0.986 | Plastic | 1.55 | 56.14 | 4.36 |
| 4 | | Aspherical | 11.431 | 0.039 | | | | |
| 5 | Second Lens | Aspherical | 9.781 | 0.231 | Plastic | 1.68 | 19.25 | −7.85 |
| 6 | | Aspherical | 3.412 | 0.140 | | | | |
| 7 | Third Lens | Aspherical | 3.086 | 0.240 | Plastic | 1.68 | 19.25 | 28.02 |
| 8 | | Aspherical | 3.570 | 0.271 | | | | |
| 9 | Fourth Lens | Aspherical | 40.282 | 0.450 | Plastic | 1.55 | 56.14 | 24.08 |
| 10 | | Aspherical | −19.433 | 0.344 | | | | |
| 11 | Fifth Lens | Aspherical | 6.433 | 0.250 | Plastic | 1.57 | 37.35 | −40.59 |
| 12 | | Aspherical | 4.963 | 0.241 | | | | |
| 13 | Sixth Lens | Aspherical | 25.104 | 0.465 | Plastic | 1.57 | 37.35 | 4.34 |
| 14 | | Aspherical | −2.725 | 0.010 | | | | |
| 15 | Seventh Lens | Aspherical | 6.309 | 0.318 | Plastic | 1.64 | 23.80 | −7.83 |
| 16 | | Aspherical | 2.738 | 0.493 | | | | |
| 17 | Eighth Lens | Aspherical | 6.312 | 0.400 | Plastic | 1.55 | 56.14 | −5.46 |
| 18 | | Aspherical | 1.980 | 0.188 | | | | |
| 19 | Infrared Cut-off Filter | Spherical | Infinite | 0.480 | Glass | | | |
| 20 | | Spherical | Infinite | 0.353 | | | | |
| 21 | Image Surface | Spherical | Infinite | 0.000 | | | | |

Note:
the reference wavelength is 555 nm

TABLE 10

Fifth Embodiment
Aspheric Coefficient

| Surface Number | 3 | 4 | 5 | 6 | 7 | 8 | 9 | 10 |
|---|---|---|---|---|---|---|---|---|
| K | −0.5172 | 1.0755 | 6.4528 | −3.5611 | 0.0000 | −0.8891 | 2.0000 | −18.0000 |
| A4 | 0.0054 | 0.0118 | 0.0098 | −0.0114 | −0.0756 | −0.0420 | −0.0324 | −0.0375 |
| A6 | 0.0077 | −0.0464 | −0.0283 | 0.0411 | 0.0612 | 0.0053 | 0.0392 | 0.0262 |
| A8 | −0.0114 | 0.0106 | −0.0329 | −0.1057 | −0.1415 | 0.0512 | −0.1246 | −0.0539 |
| A10 | 0.0120 | 0.0587 | 0.1241 | 0.1644 | 0.2383 | −0.1711 | 0.2339 | 0.0729 |
| A12 | −0.0072 | −0.0795 | −0.1375 | −0.1690 | −0.3127 | 0.2774 | −0.2942 | −0.0785 |
| A14 | 0.0023 | 0.0495 | 0.0807 | 0.1145 | 0.2839 | −0.2597 | 0.2408 | 0.0588 |
| A16 | −0.0003 | −0.0170 | −0.0269 | −0.0496 | −0.1579 | 0.1509 | −0.1228 | −0.0281 |
| A18 | 0.0000 | 0.0031 | 0.0048 | 0.0121 | 0.0476 | −0.0505 | 0.0357 | 0.0076 |
| A20 | 0.0000 | −0.0002 | −0.0003 | −0.0012 | −0.0059 | 0.0074 | −0.0047 | −0.0009 |

| Surface Number | 11 | 12 | 13 | 14 | 15 | 16 | 17 | 18 |
|---|---|---|---|---|---|---|---|---|
| K | −9.8607 | −10.0000 | −10.0000 | −18.0000 | −2.6726 | −9.3571 | 0.1741 | −1.1973 |
| A4 | −0.0988 | −0.1276 | −0.0775 | 0.0404 | 0.0890 | −0.0178 | −0.2066 | −0.2033 |
| A6 | 0.0965 | 0.1551 | 0.2086 | 0.0307 | −0.1310 | 0.0187 | 0.0723 | 0.0975 |
| A8 | −0.1193 | −0.1869 | −0.2598 | −0.1056 | 0.0594 | −0.0433 | −0.0172 | −0.0396 |
| A10 | 0.1042 | 0.1388 | 0.1769 | 0.0939 | −0.0196 | 0.0300 | 0.0043 | 0.0116 |
| A12 | −0.0603 | −0.0634 | −0.0744 | −0.0478 | 0.0028 | −0.0115 | −0.0009 | −0.0022 |
| A14 | 0.0195 | 0.0152 | 0.0185 | 0.0150 | 0.0010 | 0.0027 | 0.0001 | 0.0003 |
| A16 | −0.0024 | −0.0009 | −0.0026 | −0.0028 | −0.0005 | −0.0004 | 0.0000 | 0.0000 |
| A18 | −0.0003 | −0.0003 | 0.0002 | 0.0003 | 0.0001 | 0.0000 | 0.0000 | 0.0000 |
| A20 | 0.0001 | 0.0000 | 0.0000 | 0.0000 | 0.0000 | 0.0000 | 0.0000 | 0.0000 |

According to the various parameters provided as above, the following conditions can be derived.

Fifth Embodiment

| | | | |
|---|---|---|---|
| f (mm) | 4.78 | f/f1 | 1.10 |
| FNO | 1.481 | (R9 + R10)/(R9*R10) | −0.03 |
| FOV (degree) | 79.95 | (R3 + R4)/f1 | 3.09 |
| TTL (mm) | 5.9 | R5/R6 | 2.87 |
| TTL/L | 1.83 | |R7 + R8|/|R7 − R8| | 13.77 |
| f14 | 5.31 | f1/f2 | −0.56 |
| f58 | −14.77 | (R17*R18)/(R17 − R18) | 2.89 |
| f14/f58 | −0.36 | ΣCT/f | 0.70 |
| Fno/TTL | 0.251 | ΣCT/TTL | 0.57 |
| | | ET1/CT1 | 0.283 |
| TTL/Imgh | 1.475 | ET8/CT8 | 0.88 |
| TTL/|f| | 1.234 | Imgh (mm) | 4.0 |

Sixth Embodiment

Figure 11:
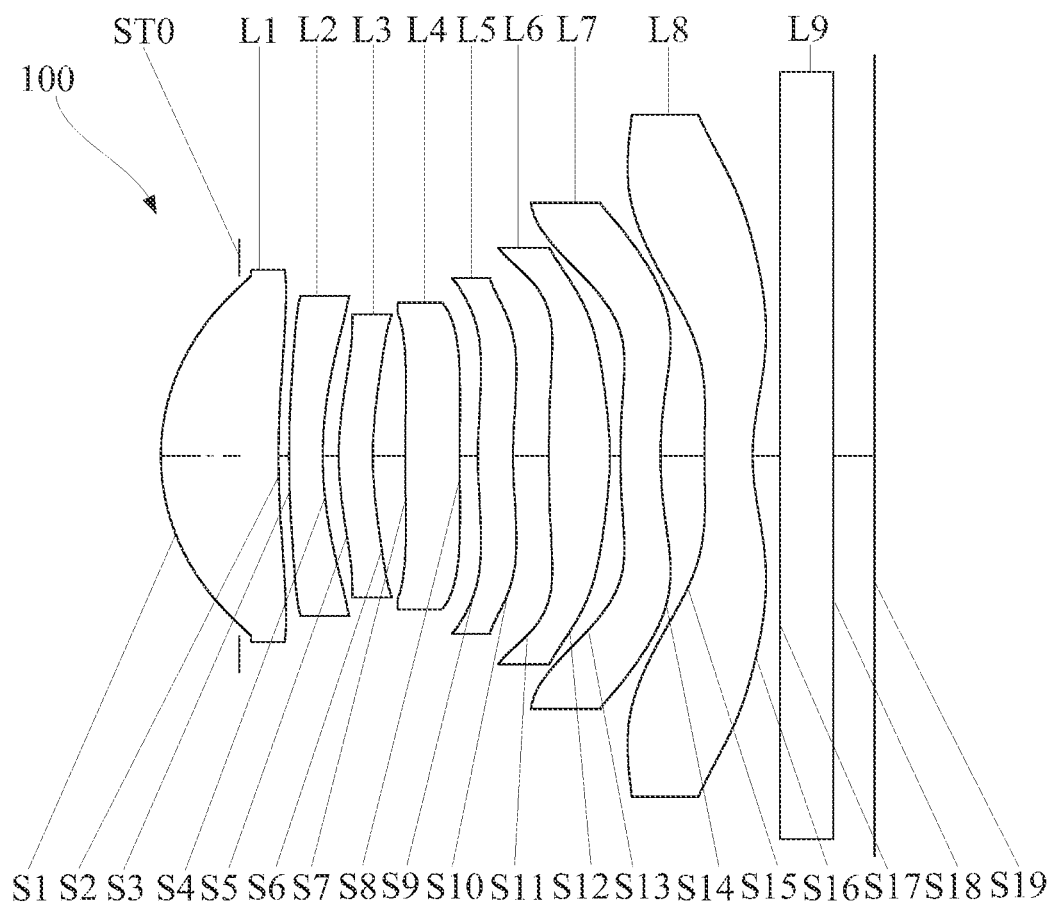
FIG. 11 is a schematic view of an optical system according to a sixth embodiment of the present disclosure.
Figure 12:
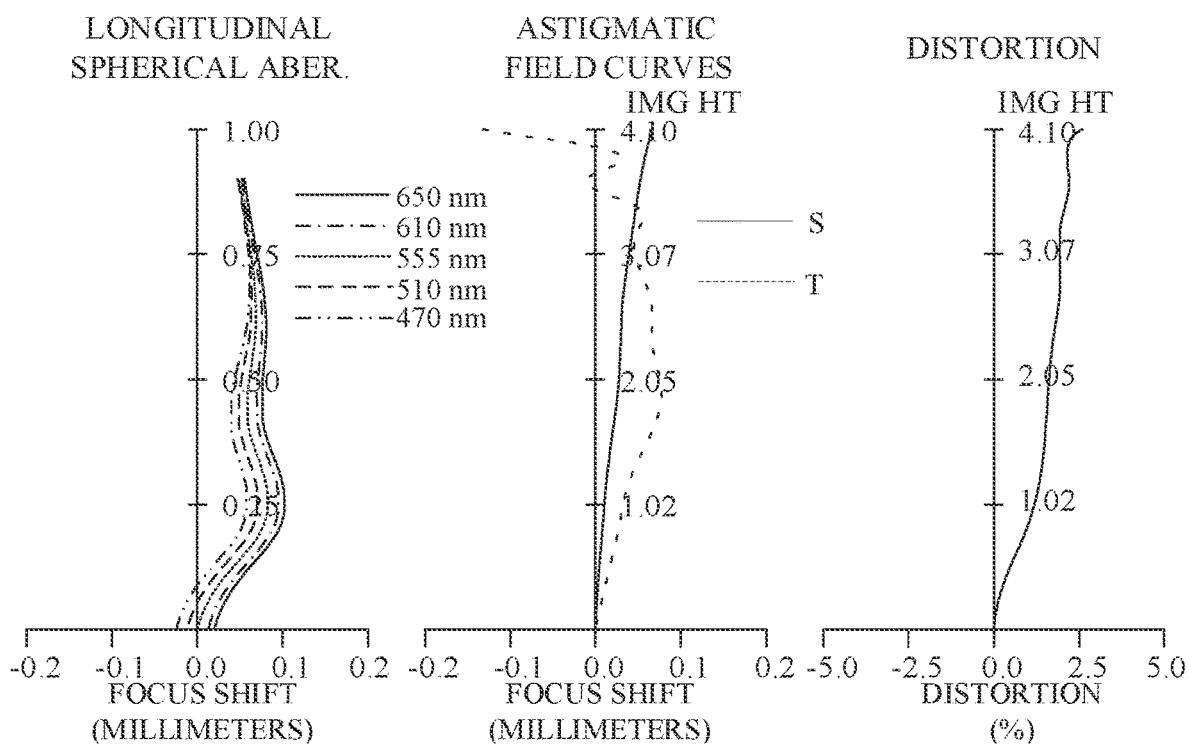
FIG. 12 is a graph showing longitudinal spherical aberration (mm), astigmatism (mm), and distortion (%) of the optical system according to the sixth embodiment.

Referring to FIG. 11, in the sixth embodiment, the optical system 100 includes a stop STO, a first lens L1 having a positive refractive power, a second lens L2 having a negative refractive power, a third lens L3 having a positive refractive power, a fourth lens L4 having a negative refractive power, a fifth lens L5 having a positive refractive power, a sixth lens L6 having a positive refractive power, a seventh lens L7 having a negative refractive power, and an eighth lens L8 having a negative refractive power, successively in order from an object side to an image side. FIG. 12 is a graph showing longitudinal spherical aberration (mm), astigmatism (mm), and distortion (%) of the optical system 100 according to the sixth embodiment. The astigmatism diagram and the distortion diagram are data diagrams at a reference wavelength. The reference wavelength in each embodiment is 555 nm.

An object side surface S1 of the first lens L1 is convex at the paraxial position, and an image side surface S2 of the first lens L1 is concave at the paraxial position. The object side surface S1 of the first lens L1 is convex at its circumference, and the image side surface S2 of the first lens L1 is convex at its circumference.

An object side surface S3 of the second lens L2 is convex at the paraxial position, and an image side surface S4 of the second lens L2 is concave at the paraxial position. The object side surface S3 of the second lens L2 is convex at its circumference, and the image side surface S4 of the second lens L2 is concave at its circumference.

An object side surface S5 of the third lens L3 is convex at the paraxial position, and an image side surface S6 of the third lens L3 is concave at the paraxial position. The object side surface S5 of the third lens L3 is concave at its circumference, and the image side surface S6 of the third lens L3 is concave at its circumference.

An object side surface S7 of the fourth lens L4 is convex at the paraxial position, and an image side surface S8 of the fourth lens L4 is concave at the paraxial position. The object side surface S7 of the fourth lens L4 is concave at its circumference, and the image side surface S8 of the fourth lens L4 is convex at its circumference.

An object side surface S9 of the fifth lens L5 is convex at the paraxial position, and an image side surface S10 of the fifth lens L5 is concave at the paraxial position. The object side surface S9 of the fifth lens L5 is concave at its circumference, and the image side surface S10 of the fifth lens L5 is convex at its circumference.

An object side surface S11 of the sixth lens L6 is convex at the paraxial position, and an image side surface S12 of the sixth lens L6 is convex at the paraxial position. The object side surface S11 of the sixth lens L6 is concave at its circumference, and the image side surface S12 of the sixth lens L6 is convex at its circumference.

An object side surface S13 of the seventh lens L7 is convex at the paraxial position, and an image side surface S14 of the seventh lens L7 is concave at the paraxial position. The object side surface S13 of the seventh lens L7 is concave at its circumference, and the image side surface S14 of the seventh lens L7 is convex at its circumference.

An object side surface S15 of the eighth lens L8 is convex at the paraxial position, and an image side surface S16 of the eighth lens L8 is concave at the paraxial position. The object side surface S15 of the eighth lens L8 is convex at its circumference, and the image side surface S16 of the eighth lens L8 is convex at its circumference.

In the third embodiment, the effective focal length of the optical system 100 is indicated by f, and f=4.88 mm. The f-number is indicated by FNO, and FNO=1.397. The maximum angle of field of view (diagonal angle of view) is indicated by FOV, and FOV=78.21 degrees (deg.). The distance from the object side surface S1 of the first lens L1 to the imaging surface S19 on the optical axis is indicated by TTL, and TTL=6.07 mm.

Various parameters of the optical system 100 are given in Table 11 and Table 12. Definitions of the various parameters can be obtained from the first embodiment, and which will not be repeated herein.

TABLE 11

Sixth Embodiment
f = 4.88 mm, FNO = 1.397, FOV = 78.21 degrees, TTL = 6.07 mm

| Surface Number | Surface Name | Surface Shape | Y radius (mm) | Thickness (mm) | Material | Refractive index | Abbe number | Focal Length (mm) |
|---|---|---|---|---|---|---|---|---|
| 0 | Object Surface | Spherical | Infinite | Infinite | | | | |
| 1 | Spherical Surface | Spherical | Infinite | 0.000 | | | | |
| 2 | Stop | Spherical | Infinite | −0.669 | | | | |
| 3 | First Lens | Aspherical | 2.062 | 1.000 | Plastic | 1.55 | 56.14 | 4.60 |
| 4 | | Aspherical | 9.563 | 0.089 | | | | |
| 5 | Second Lens | Aspherical | 10.160 | 0.287 | Plastic | 1.68 | 19.25 | −8.39 |
| 6 | | Aspherical | 3.603 | 0.137 | | | | |
| 7 | Third Lens | Aspherical | 3.066 | 0.289 | Plastic | 1.68 | 19.25 | 20.97 |
| 8 | | Aspherical | 3.760 | 0.275 | | | | |
| 9 | Fourth Lens | Aspherical | 24.000 | 0.463 | Plastic | 1.55 | 56.14 | −2278.00 |
| 10 | | Aspherical | 23.385 | 0.154 | | | | |
| 11 | Fifth Lens | Aspherical | 4.971 | 0.299 | Plastic | 1.57 | 37.35 | 1163.05 |
| 12 | | Aspherical | 4.899 | 0.304 | | | | |
| 13 | Sixth Lens | Aspherical | 15.128 | 0.517 | Plastic | 1.57 | 37.35 | 4.67 |
| 14 | | Aspherical | −3.196 | 0.092 | | | | |
| 15 | Seventh Lens | Aspherical | 11.144 | 0.340 | Plastic | 1.64 | 23.80 | −11.35 |
| 16 | | Aspherical | 4.346 | 0.374 | | | | |
| 17 | Eighth Lens | Aspherical | 11.020 | 0.408 | Plastic | 1.55 | 56.14 | −4.85 |
| 18 | | Aspherical | 2.107 | 0.235 | | | | |
| 19 | Infrared Cut-off Filter | Spherical | Infinite | 0.21 | Glass | | | |
| 20 | | Spherical | Infinite | 0.553 | | | | |
| 21 | Image Surface | Spherical | Infinite | 0.000 | | | | |

Note:
the reference wavelength is 555 nm

TABLE 12

Sixth Embodiment
Aspheric Coefficient

| Surface Number | 3 | 4 | 5 | 6 | 7 | 8 | 9 | 10 |
|---|---|---|---|---|---|---|---|---|
| K | −0.5191 | −3.8780 | 0.2699 | −3.4541 | 0.0000 | −2.4967 | 29.1258 | −107.8480 |
| A4 | 0.0014 | 0.0175 | 0.0124 | −0.0030 | −0.0970 | −0.0424 | −0.0193 | −0.0597 |
| A6 | 0.0230 | −0.0474 | −0.0229 | −0.0285 | 0.1483 | −0.0258 | −0.0364 | 0.0814 |
| A8 | −0.0424 | 0.0212 | −0.0389 | 0.1105 | −0.3408 | 0.2002 | 0.1444 | −0.1601 |
| A10 | 0.0483 | 0.0139 | 0.0958 | −0.2464 | 0.5206 | −0.4913 | −0.3710 | 0.2247 |
| A12 | −0.0340 | −0.0200 | −0.0808 | 0.3251 | −0.5376 | 0.6815 | 0.5610 | −0.2261 |
| A14 | 0.0150 | 0.0099 | 0.0356 | −0.2588 | 0.3616 | −0.5791 | −0.5134 | 0.1499 |
| A16 | −0.0040 | −0.0026 | −0.0086 | 0.1223 | −0.1492 | 0.3026 | 0.2787 | −0.0619 |
| A18 | 0.0006 | 0.0004 | 0.0010 | −0.0317 | 0.0339 | −0.0892 | −0.0823 | 0.0143 |
| A20 | 0.0000 | 0.0000 | 0.0000 | 0.0035 | −0.0032 | 0.0114 | 0.0101 | −0.0014 |

| Surface Number | 11 | 12 | 13 | 14 | 15 | 16 | 17 | 18 |
|---|---|---|---|---|---|---|---|---|
| K | −10.0282 | −4.9927 | −24.7354 | −8.5941 | 2.5455 | −9.3109 | 5.5137 | −0.8894 |
| A4 | −0.1212 | −0.1154 | −0.0242 | 0.0951 | 0.1247 | 0.0712 | −0.1416 | −0.1806 |
| A6 | 0.1383 | 0.1027 | 0.1368 | −0.0985 | −0.2789 | −0.1712 | 0.0157 | 0.0695 |
| A8 | −0.2557 | −0.1705 | −0.2688 | 0.0350 | 0.2135 | 0.1195 | 0.0176 | −0.0204 |
| A10 | 0.3556 | 0.1781 | 0.2718 | 0.0042 | −0.1172 | −0.0527 | −0.0088 | 0.0047 |
| A12 | −0.3259 | −0.1144 | −0.1758 | −0.0120 | 0.0463 | 0.0157 | 0.0020 | −0.0008 |
| A14 | 0.1870 | 0.0437 | 0.0727 | 0.0061 | −0.0120 | −0.0031 | −0.0003 | 0.0001 |
| A16 | −0.0650 | −0.0092 | −0.0186 | −0.0015 | 0.0019 | 0.0004 | 0.0000 | 0.0000 |
| A18 | 0.0126 | 0.0009 | 0.0027 | 0.0002 | −0.0002 | 0.0000 | 0.0000 | 0.0000 |
| A20 | −0.0011 | 0.0000 | −0.0002 | 0.0000 | 0.0000 | 0.0000 | 0.0000 | 0.0000 |

According to the various parameters provided as above, the following conditions can be derived.

| Sixth Embodiment | | | |
|---|---|---|---|
| f (mm) | 4.88 | f/f1 | 1.06 |
| FNO | 1.397 | (R9 + R10)/(R9*R10) | 0.08 |
| FOV (degree) | 78.21 | (R3 + R4)/f1 | 2.53 |
| TTL (mm) | 6.07 | R5/R6 | 2.82 |
| TTL/L | 1.80 | |R7 + R8|/|R7 − R8| | 9.83 |
| f14 | 5.94 | f1/f2 | −0.55 |
| f58 | −31.87 | (R17*R18)/(R17 − R18) | 2.60 |
| f14/f58 | −0.19 | ΣCT/f | 0.75 |
| Fno/TTL | 0.23 | ΣCT/TTL | 0.61 |
|  |  | ET1/CT1 | 0.281 |
| TTL/Imgh | 1.48 | ET8/CT8 | 1.17 |
| TTL/|f| | 1.24 | Imgh (mm) | 4.1 |

Seventh Embodiment

Figure 13:
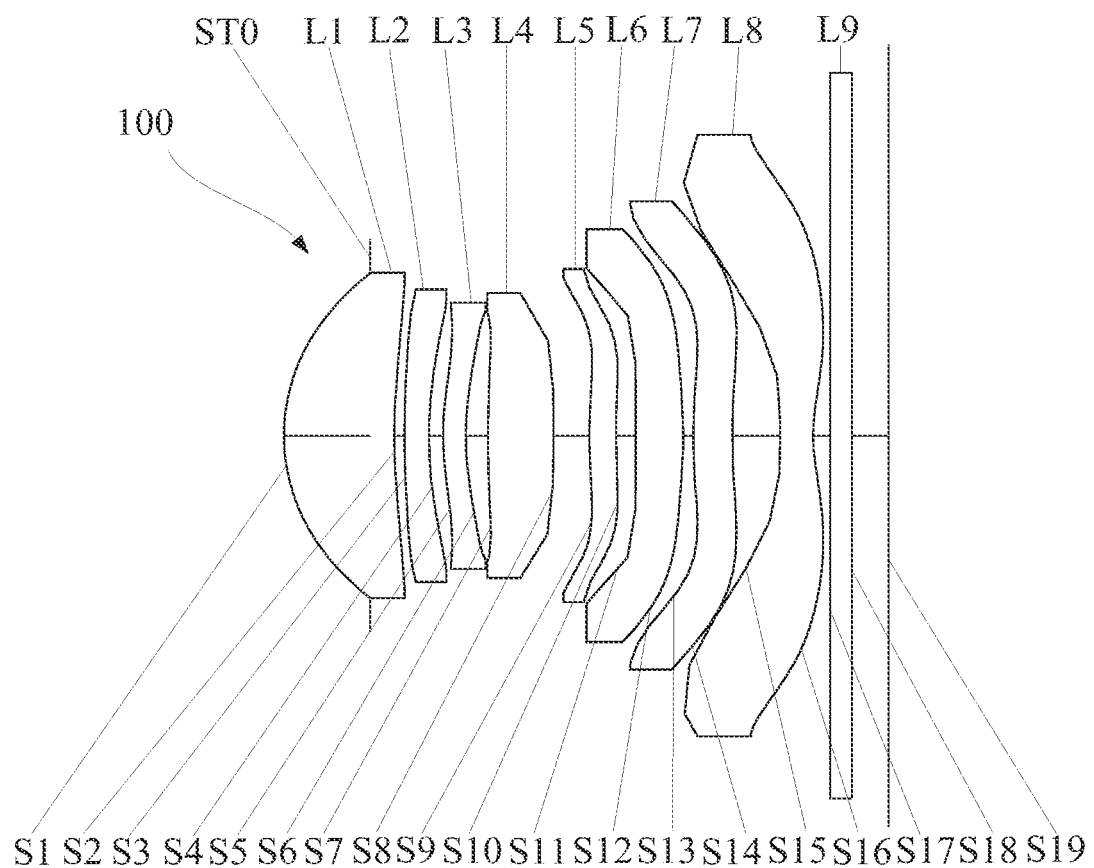
FIG. 13 is a schematic view of an optical system according to a seventh embodiment of the present disclosure.
Figure 14:
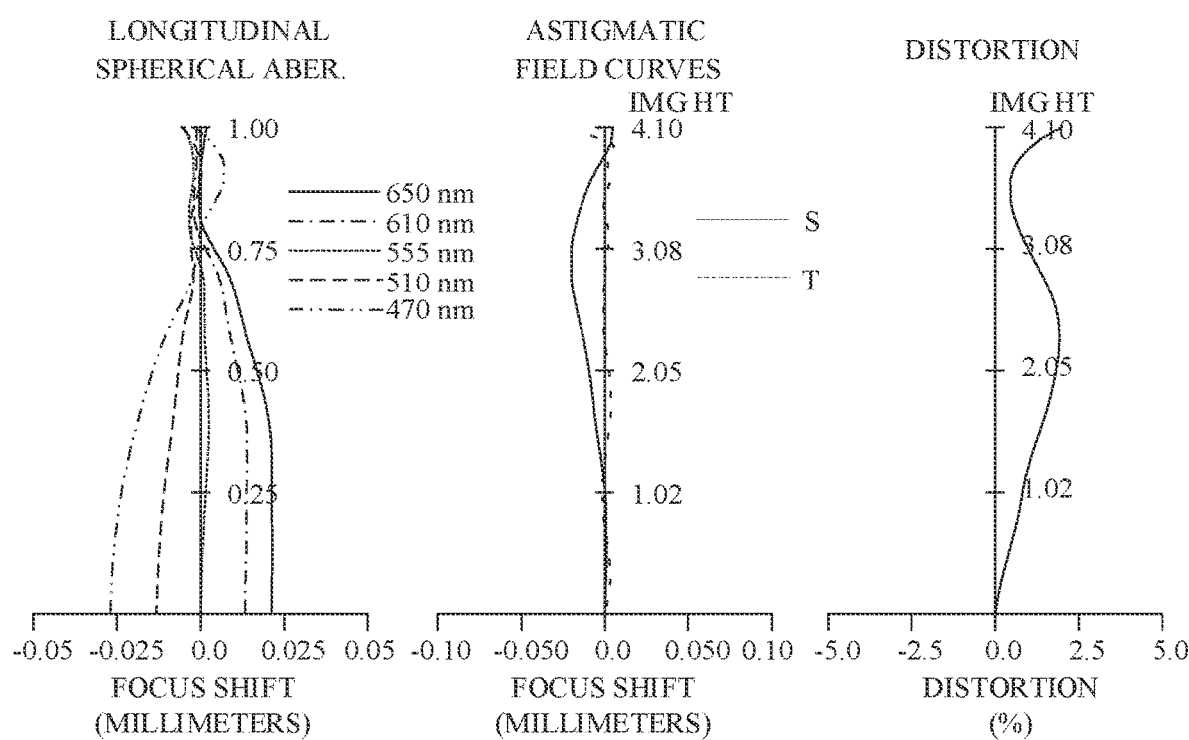
FIG. 14 is a graph showing longitudinal spherical aberration (mm), astigmatism (mm), and distortion (%) of the optical system according to the seventh embodiment.

Referring to FIG. 13, in the seventh embodiment, the optical system 100 includes a stop STO, a first lens L1 having a positive refractive power, a second lens L2 having a negative refractive power, a third lens L3 having a negative refractive power, a fourth lens L4 having a positive refractive power, a fifth lens L5 having a positive refractive power, a sixth lens L6 having a positive refractive power, a seventh lens L7 having a positive refractive power, and an eighth lens L8 having a negative refractive power, successively in order from an object side to an image side. FIG. 14 is a graph showing longitudinal spherical aberration (mm), astigmatism (mm), and distortion (%) of the optical system 100 according to the seventh embodiment. The astigmatism diagram and the distortion diagram are data diagrams at a reference wavelength. The reference wavelength in each embodiment is 555 nm.

An object side surface S1 of the first lens L1 is convex at the paraxial position, and an image side surface S2 of the first lens L1 is concave at the paraxial position. The object side surface S1 of the first lens L1 is convex at its circumference, and the image side surface S2 of the first lens L1 is concave at its circumference.

An object side surface S3 of the second lens L2 is convex at the paraxial position, and an image side surface S4 of the second lens L2 is concave at the paraxial position. The object side surface S3 of the second lens L2 is convex at its circumference, and the image side surface S4 of the second lens L2 is concave at its circumference.

An object side surface S5 of the third lens L3 is convex at the paraxial position, and an image side surface S6 of the third lens L3 is concave at the paraxial position. The object side surface S5 of the third lens L3 is concave at its circumference, and the image side surface S6 of the third lens L3 is concave at its circumference.

An object side surface S7 of the fourth lens L4 is convex at the paraxial position, and an image side surface S8 of the fourth lens L4 is convex at the paraxial position. The object side surface S7 of the fourth lens L4 is concave at its circumference, and the image side surface S8 of the fourth lens L4 is convex at its circumference.

An object side surface S9 of the fifth lens L5 is convex at the paraxial position, and an image side surface S10 of the fifth lens L5 is concave at the paraxial position. The object side surface S9 of the fifth lens L5 is concave at its circumference, and the image side surface S10 of the fifth lens L5 is convex at its circumference.

An object side surface S11 of the sixth lens L6 is concave at the paraxial position, and an image side surface S12 of the sixth lens L6 is convex at the paraxial position. The object side surface S11 of the sixth lens L6 is concave at its circumference, and the image side surface S12 of the sixth lens L6 is convex at its circumference.

An object side surface S13 of the seventh lens L7 is convex at the paraxial position, and an image side surface S14 of the seventh lens L7 is concave at the paraxial position. The object side surface S13 of the seventh lens L7 is concave at its circumference, and the image side surface S14 of the seventh lens L7 is convex at its circumference.

An object side surface S15 of the eighth lens L8 is concave at the paraxial position, and an image side surface S16 of the eighth lens L8 is concave at the paraxial position. The object side surface S15 of the eighth lens L8 is convex at its circumference, and the image side surface S16 of the eighth lens L8 is convex at its circumference.

In the third embodiment, the effective focal length of the optical system 100 is indicated by f, and f=4.79 mm. The f-number is indicated by FNO, and FNO=1.397. The maximum angle of field of view (diagonal angle of view) is indicated by FOV, and FOV=80 degrees (deg.). The distance from the object side surface S1 of the first lens L1 to the imaging surface S19 on the optical axis is indicated by TTL, and TTL=5.9 mm.

Various parameters of the optical system 100 are given in Table 13 and Table 14. Definitions of the various parameters can be obtained from the first embodiment, and which will not be repeated herein.

TABLE 13

Seventh Embodiment
f = 4.79 mm, FNO = 1.397, FOV = 80°, TTL = 5.9 mm

| Surface Number | Surface Name | Surface Shape | Y radius (mm) | Thickness (mm) | Material | Refractive index | Abbe number | Focal Length (mm) |
|---|---|---|---|---|---|---|---|---|
| 0 | Object Surface | Spherical | Infinite | Infinite |  |  |  |  |
| 1 | Spherical Surface | Spherical | Infinite | 0.000 |  |  |  |  |
| 2 | Stop | Spherical | Infinite | −0.842 |  |  |  |  |
| 3 | First Lens | Aspherical | 2.096 | 1.077 | Plastic | 1.55 | 56.14 | 5.12 |
| 4 |  | Aspherical | 6.879 | 0.100 |  |  |  |  |
| 5 | Second Lens | Aspherical | 10.952 | 0.240 | Plastic | 1.68 | 19.25 | −14.31 |
| 6 |  | Aspherical | 5.097 | 0.138 |  |  |  |  |
| 7 | Third Lens | Aspherical | 3.366 | 0.220 | Plastic | 1.68 | 19.25 | −307.53 |
| 8 |  | Aspherical | 3.225 | 0.216 |  |  |  |  |
| 9 | Fourth Lens | Aspherical | 9.704 | 0.643 | Plastic | 1.55 | 56.14 | 13.73 |
| 10 |  | Aspherical | −32.194 | 0.350 |  |  |  |  |

TABLE 13-continued

Seventh Embodiment
f = 4.79 mm, FNO = 1.397, FOV = 80°, TTL = 5.9 mm

| Surface Number | Surface Name | Surface Shape | Y radius (mm) | Thickness (mm) | Material | Refractive index | Abbe number | Focal Length (mm) |
|---|---|---|---|---|---|---|---|---|
| 11 | Fifth Lens | Aspherical | 6.306 | 0.260 | Plastic | 1.57 | 37.35 | 38.80 |
| 12 | | Aspherical | 8.687 | 0.193 | | | | |
| 13 | Sixth Lens | Aspherical | −25.715 | 0.460 | Plastic | 1.57 | 37.35 | 10.76 |
| 14 | | Aspherical | −4.987 | 0.100 | | | | |
| 15 | Seventh Lens | Aspherical | 8.402 | 0.381 | Plastic | 1.64 | 23.80 | 1246.75 |
| 16 | | Aspherical | 8.341 | 0.469 | | | | |
| 17 | Eighth Lens | Aspherical | −37.488 | 0.320 | Plastic | 1.55 | 56.14 | −3.56 |
| 18 | | Aspherical | 2.054 | 0.165 | | | | |
| 19 | Infrared Cut- | Spherical | Infinite | 0.210 | Glass | | | |
| 20 | off Filter | Spherical | Infinite | 0.360 | | | | |
| 21 | Image Surface | Spherical | Infinite | 0.000 | | | | |

Note:
the reference wavelength is 555 nm

TABLE 14

Seventh Embodiment

| Surface Number | 3 | 4 | 5 | 6 | 7 | 8 | 9 | 10 |
|---|---|---|---|---|---|---|---|---|
| K | −0.4839 | −14.1398 | 0.6621 | −1.7114 | 0.0000 | −3.4143 | 5.8492 | 99.0000 |
| A4 | 0.0068 | −0.0011 | 0.0055 | 0.0058 | −0.0768 | −0.0542 | −0.0247 | −0.0446 |
| A6 | −0.0042 | −0.0196 | −0.0171 | −0.0113 | 0.0416 | 0.0393 | 0.0017 | 0.0561 |
| A8 | 0.0106 | −0.0041 | −0.0393 | 0.0216 | −0.0597 | −0.0192 | 0.0478 | −0.1657 |
| A10 | −0.0116 | 0.0325 | 0.1023 | −0.0898 | 0.0353 | −0.0532 | −0.1780 | 0.2851 |
| A12 | 0.0074 | −0.0320 | −0.0943 | 0.1831 | −0.0002 | 0.1340 | 0.3081 | −0.3127 |
| A14 | −0.0027 | 0.0161 | 0.0456 | −0.1912 | −0.0142 | −0.1453 | −0.3071 | 0.2150 |
| A16 | 0.0005 | −0.0046 | −0.0118 | 0.1089 | 0.0123 | 0.0912 | 0.1773 | −0.0902 |
| A18 | 0.0000 | 0.0007 | 0.0014 | −0.0325 | −0.0051 | −0.0314 | −0.0550 | 0.0211 |
| A20 | 0.0000 | −0.0001 | 0.0000 | 0.0040 | 0.0008 | 0.0046 | 0.0071 | −0.0021 |

| Surface Number | 11 | 12 | 13 | 14 | 15 | 16 | 17 | 18 |
|---|---|---|---|---|---|---|---|---|
| K | −9.7391 | −0.8419 | 99.0000 | −18.7645 | 2.9090 | 0.7548 | −99.0000 | −0.9128 |
| A4 | −0.0771 | −0.0724 | 0.0169 | 0.0837 | 0.0579 | 0.0220 | −0.2188 | −0.2505 |
| A6 | 0.1036 | 0.1511 | 0.1333 | −0.0591 | −0.1679 | −0.0970 | 0.1191 | 0.1508 |
| A8 | −0.2643 | −0.4302 | −0.3835 | −0.0310 | 0.1455 | 0.0886 | −0.0335 | −0.0640 |
| A10 | 0.3453 | 0.5185 | 0.3891 | 0.0610 | −0.0779 | −0.0474 | 0.0046 | 0.0183 |
| A12 | −0.2674 | −0.3524 | −0.2110 | −0.0366 | 0.0255 | 0.0154 | 0.0000 | −0.0035 |
| A14 | 0.1228 | 0.1445 | 0.0659 | 0.0115 | −0.0050 | −0.0031 | −0.0001 | 0.0004 |
| A16 | −0.0320 | −0.0350 | −0.0115 | −0.0020 | 0.0006 | 0.0004 | 0.0000 | 0.0000 |
| A18 | 0.0043 | 0.0046 | 0.0009 | 0.0002 | 0.0000 | 0.0000 | 0.0000 | 0.0000 |
| A20 | −0.0002 | −0.0002 | 0.0000 | 0.0000 | 0.0000 | 0.0000 | 0.0000 | 0.0000 |

According to the various parameters provided as above, the following conditions can be derived.

Seventh Embodiment

| | | | |
|---|---|---|---|
| f (mm) | 4.79 | f/f1 | 0.94 |
| FNO | 1.397 | (R9 + R10)/(R9*R10) | 0.07 |
| FOV (degree) | 80 | (R3 + R4)/f1 | 1.75 |
| TTL (mm) | 5.9 | R5/R6 | 2.15 |
| TTL/L | 1.72 | |R7 + R8|/|R7 − R8| | 46.76 |
| f14 | 5.18 | f1/f2 | −0.36 |
| f58 | −8.44 | (R17*R18)/(R17 − R18) | 1.95 |
| f14/f58 | −0.61 | ΣCT/f | 0.75 |
| Fno/TTL | 0.24 | ΣCT/TTL | 0.61 |
| | | ET1/CT1 | 0.31 |
| TTL/Imgh | 1.44 | ET8/CT8 | 2.06 |
| TTL/|f| | 1.23 | Imgh (mm) | 4.1 |

Eighth Embodiment

Figure 15:
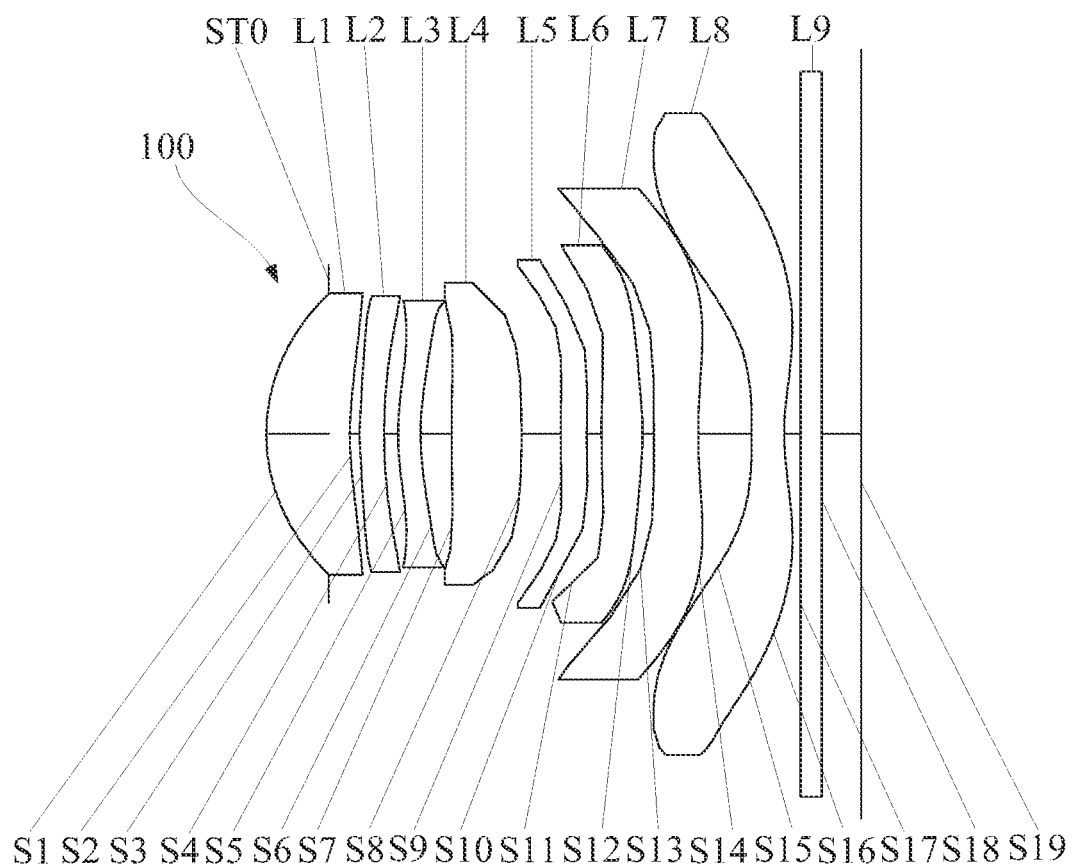
FIG. 15 is a schematic view of an optical system according to an eighth embodiment of the present disclosure.
Figure 16:
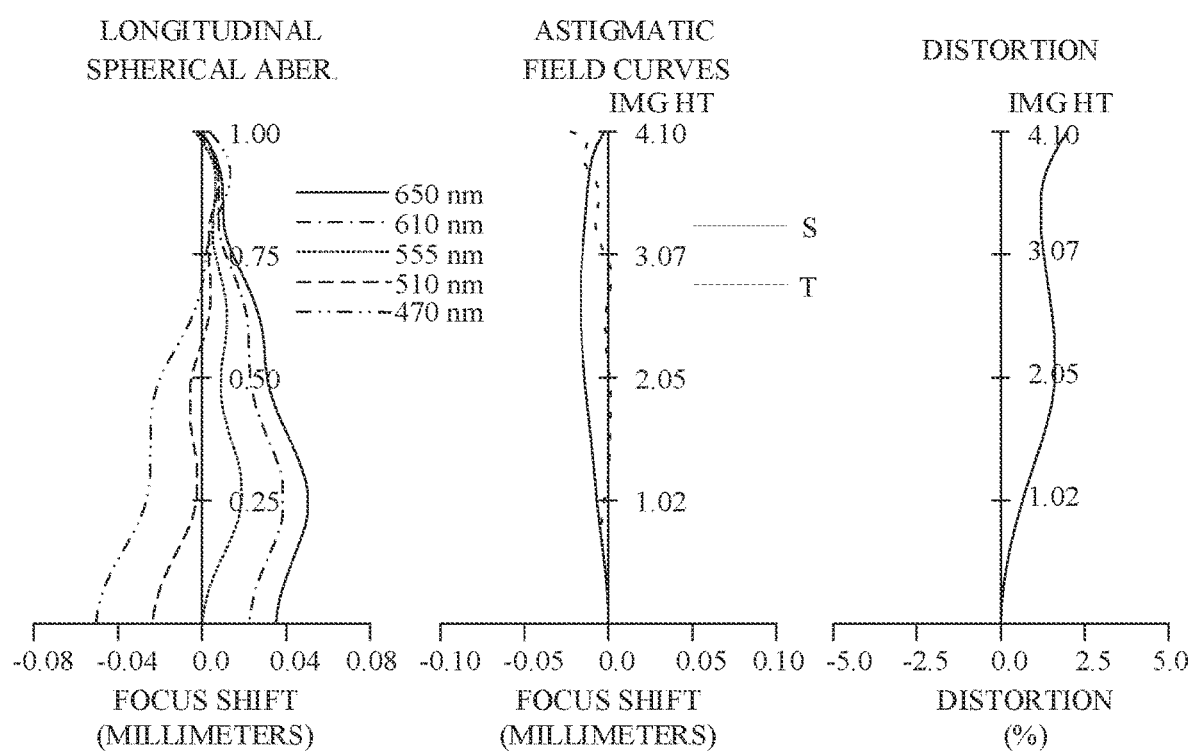
FIG. 16 is a graph showing longitudinal spherical aberration (mm), astigmatism (mm), and distortion (%) of the optical system according to the eighth embodiment.

Referring to FIG. 15, in the eighth embodiment, the optical system 100 includes a stop STO, a first lens L1 having a positive refractive power, a second lens L2 having a positive refractive power, a third lens L3 having a negative refractive power, a fourth lens L4 having a positive refractive power, a fifth lens L5 having a positive refractive power, a sixth lens L6 having a positive refractive power, a seventh lens L7 having a negative refractive power, and an eighth lens L8 having a negative refractive power, successively in order from an object side to an image side. FIG. 16 is a graph showing longitudinal spherical aberration (mm), astigmatism (mm), and distortion (%) of the optical system 100 according to the eighth embodiment. The astigmatism diagram and the distortion diagram are data diagrams at a reference wavelength. The reference wavelength in each embodiment is 555 nm.

An object side surface S1 of the first lens L1 is convex at the paraxial position, and an image side surface S2 of the first lens L1 is concave at the paraxial position. The object side surface S1 of the first lens L1 is convex at its circumference, and the image side surface S2 of the first lens L1 is concave at its circumference.

An object side surface S3 of the second lens L2 is convex at the paraxial position, and an image side surface S4 of the second lens L2 is concave at the paraxial position. The object side surface S3 of the second lens L2 is convex at its circumference, and the image side surface S4 of the second lens L2 is concave at its circumference.

An object side surface S5 of the third lens L3 is convex at the paraxial position, and an image side surface S6 of the third lens L3 is concave at the paraxial position. The object side surface S5 of the third lens L3 is concave at its circumference, and the image side surface S6 of the third lens L3 is concave at its circumference.

An object side surface S7 of the fourth lens L4 is convex at the paraxial position, and an image side surface S8 of the fourth lens L4 is convex at the paraxial position. The object side surface S7 of the fourth lens L4 is concave at its circumference, and the image side surface S8 of the fourth lens L4 is convex at its circumference.

An object side surface S9 of the fifth lens L5 is convex at the paraxial position, and an image side surface S10 of the fifth lens L5 is concave at the paraxial position. The object side surface S9 of the fifth lens L5 is concave at its circumference, and the image side surface S10 of the fifth lens L5 is convex at its circumference.

An object side surface S11 of the sixth lens L6 is convex at the paraxial position, and an image side surface S12 of the sixth lens L6 is convex at the paraxial position. The object side surface S11 of the sixth lens L6 is concave at its circumference, and the image side surface S12 of the sixth lens L6 is convex at its circumference.

An object side surface S13 of the seventh lens L7 is convex at the paraxial position, and an image side surface S14 of the seventh lens L7 is concave at the paraxial position. The object side surface S13 of the seventh lens L7 is concave at its circumference, and the image side surface S14 of the seventh lens L7 is convex at its circumference.

An object side surface S15 of the eighth lens L8 is concave at the paraxial position, and an image side surface S16 of the eighth lens L8 is concave at the paraxial position. The object side surface S15 of the eighth lens L8 is concave at its circumference, and the image side surface S16 of the eighth lens L8 is convex at its circumference.

In the eighth embodiment, the effective focal length of the optical system 100 is indicated by f, and f=4.81 mm. The f-number is indicated by FNO, and FNO=1.6. The maximum angle of field of view (diagonal angle of view) is indicated by FOV, and FOV=80 degrees (deg.). The distance from the object side surface S1 of the first lens L1 to the imaging surface S19 on the optical axis is indicated by TTL, and TTL=5.92 mm.

Various parameters of the optical system 100 are given in Table 15 and Table 16. Definitions of the various parameters can be obtained from the first embodiment, and which will not be repeated herein.

TABLE 15

Eighth Embodiment
f = 4.81 mm, FNO = 1.6, FOV = 80.00°, TTL = 5.92 mm

| Surface Number | Surface Name | Surface Shape | Y radius (mm) | Thickness (mm) | Material | Refractive index | Abbe number | Focal Length (mm) |
|---|---|---|---|---|---|---|---|---|
| 0 | Object Surface | Spherical | Infinite | Infinite | | | | |
| 1 | Spherical Surface | Spherical | Infinite | 0.000 | | | | |
| 2 | Stop | Spherical | Infinite | −0.625 | | | | |
| 3 | First Lens | Aspherical | 2.097 | 0.833 | Plastic | 1.55 | 56.14 | 7.02 |
| 4 | | Aspherical | 3.983 | 0.100 | | | | |
| 5 | Second Lens | Aspherical | 5.750 | 0.241 | Plastic | 1.68 | 19.25 | 207.98 |
| 6 | | Aspherical | 5.894 | 0.142 | | | | |
| 7 | Third Lens | Aspherical | 3.643 | 0.223 | Plastic | 1.68 | 19.25 | −300.12 |
| 8 | | Aspherical | 3.491 | 0.307 | | | | |
| 9 | Fourth Lens | Aspherical | 17.323 | 0.697 | Plastic | 1.55 | 56.14 | 15.02 |
| 10 | | Aspherical | −15.341 | 0.388 | | | | |
| 11 | Fifth Lens | Aspherical | 14.627 | 0.262 | Plastic | 1.57 | 37.35 | 78.70 |
| 12 | | Aspherical | 21.556 | 0.145 | | | | |
| 13 | Sixth Lens | Aspherical | 21.416 | 0.410 | Plastic | 1.57 | 37.35 | 6.14 |
| 14 | | Aspherical | −4.157 | 0.110 | | | | |
| 15 | Seventh Lens | Aspherical | 467.887 | 0.444 | Plastic | 1.64 | 23.80 | −11.75 |
| 16 | | Aspherical | 7.400 | 0.534 | | | | |
| 17 | Eighth Lens | Aspherical | −8.720 | 0.321 | Plastic | 1.55 | 56.14 | −4.00 |
| 18 | | Aspherical | 2.947 | 0.163 | | | | |
| 19 | Infrared Cut-off Filter | Spherical | Infinite | 0.211 | Glass | | | |
| 20 | | Spherical | Infinite | 0.389 | | | | |
| 21 | Image Surface | Spherical | Infinite | 0.000 | | | | |

Note:
the reference wavelength is 555 nm

TABLE 16

Eighth Embodiment

| Surface Number | 3 | 4 | 5 | 6 | 7 | 8 | 9 | 10 |
|---|---|---|---|---|---|---|---|---|
| K | −0.4823 | −19.5503 | −26.5473 | −3.0338 | 0.0000 | −3.4411 | −99.0000 | 86.2803 |
| A4 | 0.0110 | −0.0097 | −0.0359 | −0.0140 | −0.0642 | −0.0295 | −0.0208 | −0.0255 |
| A6 | −0.0209 | −0.0277 | 0.0115 | −0.0045 | 0.0648 | −0.0303 | 0.0171 | −0.0322 |
| A8 | 0.0452 | 0.0230 | −0.0406 | 0.0552 | −0.1533 | 0.1433 | −0.0619 | 0.0641 |
| A10 | −0.0551 | −0.0218 | 0.0989 | −0.0879 | 0.1864 | −0.3342 | 0.1204 | −0.0826 |
| A12 | 0.0426 | 0.0402 | −0.0961 | 0.0899 | −0.1245 | 0.4472 | −0.1435 | 0.0632 |
| A14 | −0.0209 | −0.0408 | 0.0481 | −0.0673 | 0.0252 | −0.3630 | 0.1040 | −0.0290 |
| A16 | 0.0063 | 0.0209 | −0.0128 | 0.0321 | 0.0184 | 0.1783 | −0.0449 | 0.0076 |
| A18 | −0.0011 | −0.0053 | 0.0016 | −0.0084 | −0.0115 | −0.0482 | 0.0106 | −0.0010 |
| A20 | 0.0001 | 0.0005 | −0.0001 | 0.0009 | 0.0019 | 0.0055 | −0.0011 | 0.0000 |

| Surface Number | 11 | 12 | 13 | 14 | 15 | 16 | 17 | 18 |
|---|---|---|---|---|---|---|---|---|
| K | −24.6317 | −70.6755 | −58.7349 | −24.9109 | −64.3461 | −1.3703 | −99.0000 | −0.7475 |
| A4 | −0.0236 | 0.0283 | 0.1003 | 0.0733 | 0.0088 | −0.0150 | −0.1084 | −0.1249 |
| A6 | −0.0662 | −0.2595 | −0.2549 | −0.0911 | −0.0643 | −0.0228 | 0.0224 | 0.0447 |
| A8 | 0.0801 | 0.3451 | 0.2890 | 0.0719 | 0.0501 | 0.0143 | 0.0026 | −0.0120 |
| A10 | −0.0557 | −0.2880 | −0.2300 | −0.0426 | −0.0243 | −0.0046 | −0.0020 | 0.0022 |
| A12 | 0.0138 | 0.1573 | 0.1281 | 0.0179 | 0.0075 | 0.0008 | 0.0004 | −0.0003 |
| A14 | 0.0039 | −0.0564 | −0.0486 | −0.0051 | −0.0014 | −0.0001 | 0.0000 | 0.0000 |
| A16 | −0.0031 | 0.0130 | 0.0119 | 0.0009 | 0.0002 | 0.0000 | 0.0000 | 0.0000 |
| A18 | 0.0007 | −0.0017 | −0.0017 | −0.0001 | 0.0000 | 0.0000 | 0.0000 | 0.0000 |
| A20 | −0.0001 | 0.0001 | 0.0001 | 0.0000 | 0.0000 | 0.0000 | 0.0000 | 0.0000 |

According to the various parameters provided as above, the following conditions can be derived.

| Eighth Embodiment | | | |
|---|---|---|---|
| f (mm) | 4.81 | f/f1 | 0.69 |
| FNO | 1.6 | (R9 + R10)/(R9*R10) | −0.01 |
| FOV (degree) | 80 | (R3 + R4)/f1 | 0.87 |
| TTL (mm) | 5.92 | R5/R6 | 0.98 |
| TTL/L | 1.96 | |R7 + R8|/|R7 − R8| | 46.76 |
| f14 | 5.14 | f1/f2 | 0.03 |
| f58 | −8.59 | (R17*R18)/(R17 − R18) | 2.20 |
| f14/f58 | −0.60 | ΣCT/f | 0.71 |
| Fno/TTL | 0.27 | ΣCT/TTL | 0.58 |
| | | ET1/CT1 | 0.40 |
| TTL/Imgh | 1.44 | ET8/CT8 | 1.77 |
| TTL/|f| | 1.23 | Imgh (mm) | 4.1 |

Ninth Embodiment

Figure 17:
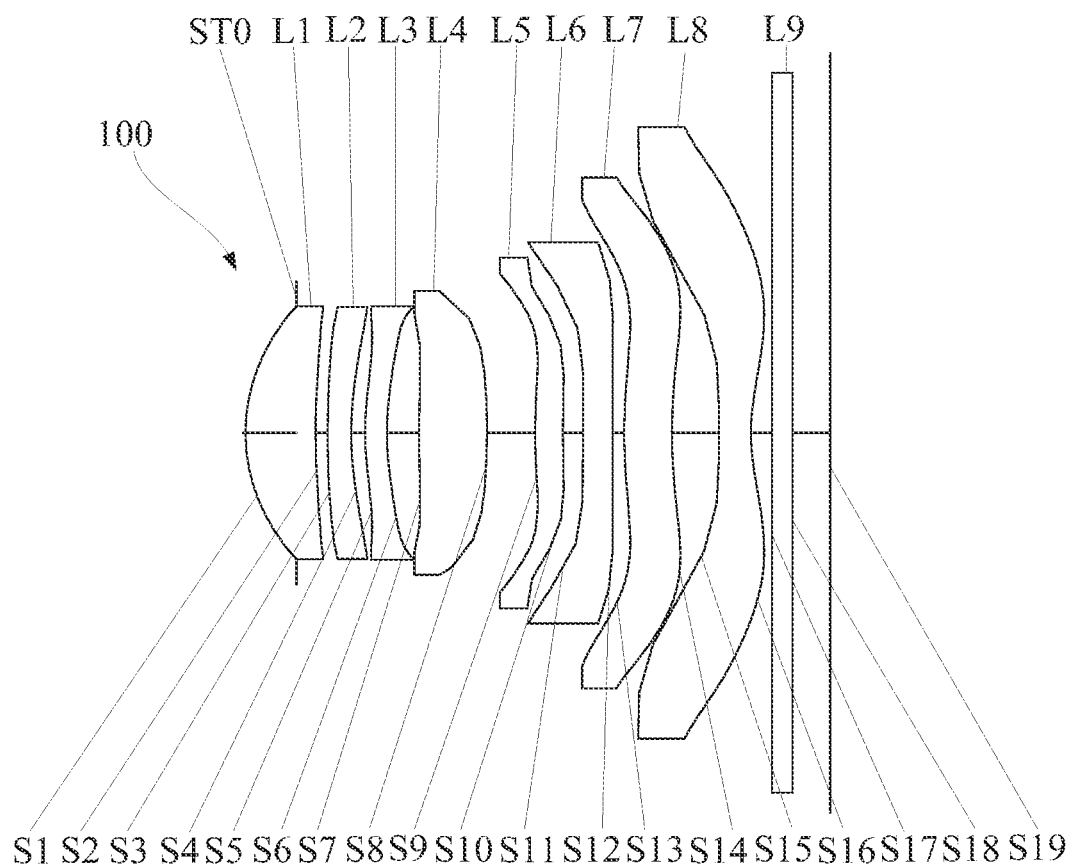
FIG. 17 is a schematic view of an optical system according to a ninth embodiment of the present disclosure.
Figure 18:
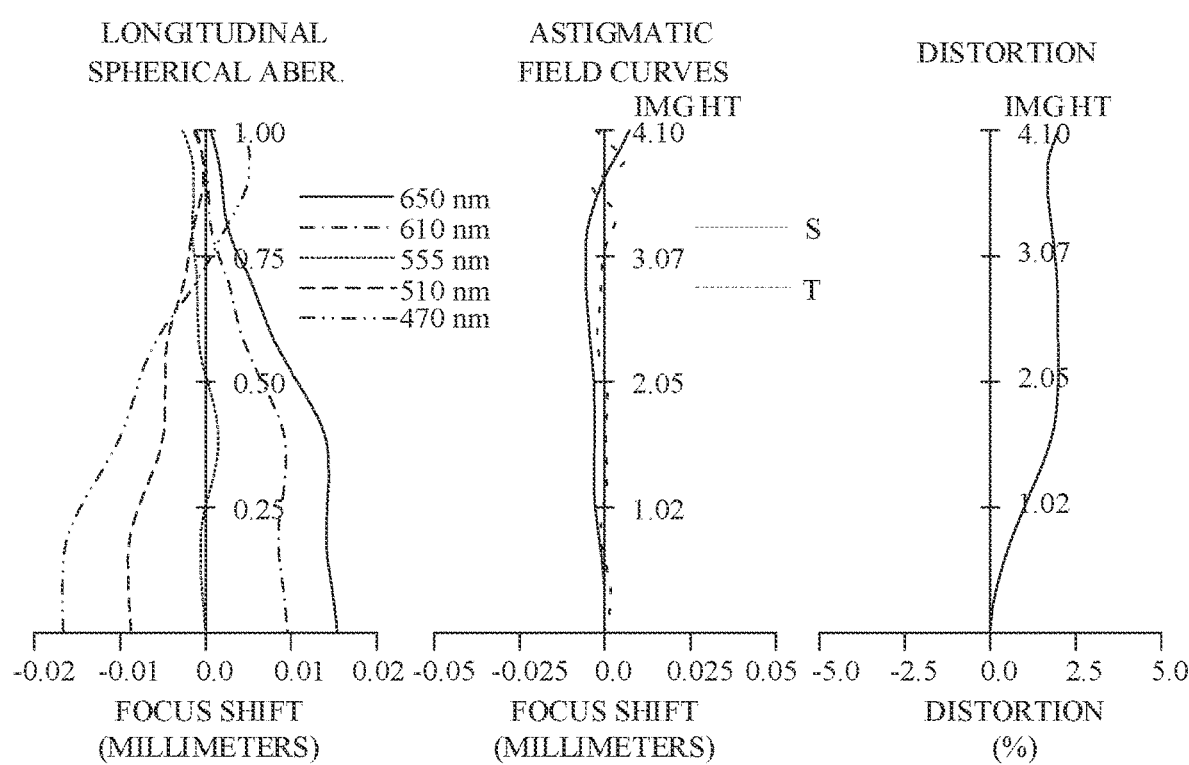
FIG. 18 is a graph showing longitudinal spherical aberration (mm), astigmatism (mm), and distortion (%) of the optical system according to the ninth embodiment.

Referring to FIG. 17, in the ninth embodiment, the optical system 100 includes a stop STO, a first lens L1 having a positive refractive power, a second lens L2 having a negative refractive power, a third lens L3 having a negative refractive power, a fourth lens L4 having a positive refractive power, a fifth lens L5 having a positive refractive power, a sixth lens L6 having a positive refractive power, a seventh lens L7 having a positive refractive power, and an eighth lens L8 having a negative refractive power, successively in order from an object side to an image side. FIG. 18 is a graph showing longitudinal spherical aberration (mm), astigmatism (mm), and distortion (%) of the optical system 100 according to the ninth embodiment. The astigmatism diagram and the distortion diagram are data diagrams at a reference wavelength. The reference wavelength in each embodiment is 555 nm.

An object side surface S1 of the first lens L1 is convex at the paraxial position, and an image side surface S2 of the first lens L1 is concave at the paraxial position. The object side surface S1 of the first lens L1 is convex at its circumference, and the image side surface S2 of the first lens L1 is concave at its circumference.

An object side surface S3 of the second lens L2 is convex at the paraxial position, and an image side surface S4 of the second lens L2 is concave at the paraxial position. The object side surface S3 of the second lens L2 is convex at its circumference, and the image side surface S4 of the second lens L2 is concave at its circumference.

An object side surface S5 of the third lens L3 is convex at the paraxial position, and an image side surface S6 of the third lens L3 is concave at the paraxial position. The object side surface S5 of the third lens L3 is concave at its circumference, and the image side surface S6 of the third lens L3 is concave at its circumference.

An object side surface S7 of the fourth lens L4 is convex at the paraxial position, and an image side surface S8 of the fourth lens L4 is convex at the paraxial position. The object side surface S7 of the fourth lens L4 is concave at its circumference, and the image side surface S8 of the fourth lens L4 is convex at its circumference.

An object side surface S9 of the fifth lens L5 is convex at the paraxial position, and an image side surface S10 of the fifth lens L5 is concave at the paraxial position. The object side surface S9 of the fifth lens L5 is concave at its circumference, and the image side surface S10 of the fifth lens L5 is concave at its circumference.

An object side surface S11 of the sixth lens L6 is concave at the paraxial position, and an image side surface S12 of the sixth lens L6 is convex at the paraxial position. The object side surface S11 of the sixth lens L6 is concave at its circumference, and the image side surface S12 of the sixth lens L6 is convex at its circumference.

An object side surface S13 of the seventh lens L7 is convex at the paraxial position, and an image side surface S14 of the seventh lens L7 is concave at the paraxial position. The object side surface S13 of the seventh lens L7 is concave at its circumference, and the image side surface S14 of the seventh lens L7 is convex at its circumference.

An object side surface S15 of the eighth lens L8 is concave at the paraxial position, and an image side surface S16 of the eighth lens L8 is concave at the paraxial position. The object side surface S15 of the eighth lens L8 is concave at its circumference, and the image side surface S16 of the eighth lens L8 is convex at its circumference.

In the ninth embodiment, the effective focal length of the optical system 100 is indicated by f, and f=4.9 mm. The f-number is indicated by FNO, and FNO=1.8. The maximum angle of field of view (diagonal angle of view) is indicated by FOV, and FOV=78.66 degrees (deg.). The distance from the object side surface S1 of the first lens L1 to the imaging surface S19 on the optical axis is indicated by TTL, and TTL=5.9 mm.

Various parameters of the optical system 100 are given in Table 17 and Table 18. Definitions of the various parameters can be obtained from the first embodiment, and which will not be repeated herein.

TABLE 17

Ninth Embodiment
f = 4.9 mm, FNO = 1.8, FOV = 78.66°, TTL = 5.9 mm

| Surface Number | Surface Name | Surface Shape | Y radius (mm) | Thickness (mm) | Material | Refractive index | Abbe number | Focal Length (mm) |
|---|---|---|---|---|---|---|---|---|
| 0 | Object Surface | Spherical | Infinite | Infinite | | | | |
| 1 | Spherical Surface | Spherical | Infinite | 0.000 | | | | |
| 2 | Stop | Spherical | Infinite | −0.514 | | | | |
| 3 | First Lens | Aspherical | 2.041 | 0.709 | Plastic | 1.55 | 56.14 | 4.67 |
| 4 | | Aspherical | 8.992 | 0.120 | | | | |
| 5 | Second Lens | Aspherical | 11.552 | 0.240 | Plastic | 1.68 | 19.25 | −10.74 |
| 6 | | Aspherical | 4.428 | 0.140 | | | | |
| 7 | Third Lens | Aspherical | 3.502 | 0.220 | Plastic | 1.68 | 19.25 | −300.08 |
| 8 | | Aspherical | 3.355 | 0.324 | | | | |
| 9 | Fourth Lens | Aspherical | 14.761 | 0.684 | Plastic | 1.55 | 56.14 | 12.98 |
| 10 | | Aspherical | −13.410 | 0.488 | | | | |
| 11 | Fifth Lens | Aspherical | 6.621 | 0.279 | Plastic | 1.57 | 37.35 | 21.54 |
| 12 | | Aspherical | 14.139 | 0.204 | | | | |
| 13 | Sixth Lens | Aspherical | −20.900 | 0.300 | Plastic | 1.57 | 37.35 | 300.00 |
| 14 | | Aspherical | −18.722 | 0.114 | | | | |
| 15 | Seventh Lens | Aspherical | 5.268 | 0.485 | Plastic | 1.64 | 23.80 | 27.32 |
| 16 | | Aspherical | 7.268 | 0.476 | | | | |
| 17 | Eighth Lens | Aspherical | −120.500 | 0.320 | Plastic | 1.55 | 56.14 | −4.13 |
| 18 | | Aspherical | 2.301 | 0.213 | | | | |
| 19 | Infrared Cut-off Filter | Spherical | Infinite | 0.210 | Glass | | | |
| 20 | | Spherical | Infinite | 0.374 | | | | |
| 21 | Image Surface | Spherical | Infinite | 0.000 | | | | |

Note:
the reference wavelength is 555 nm

TABLE 18

Ninth Embodiment

| Surface Number | 3 | 4 | 5 | 6 | 7 | 8 | 9 | 10 |
|---|---|---|---|---|---|---|---|---|
| K | −0.4873 | −7.4080 | 36.8204 | −4.1740 | 0.0000 | −1.9640 | −76.7852 | 73.6129 |
| A4 | 0.0064 | −0.0124 | −0.0046 | −0.0046 | −0.0859 | −0.0597 | −0.0262 | −0.0392 |
| A6 | 0.0015 | 0.0017 | 0.0000 | 0.0291 | 0.0300 | 0.0330 | −0.0047 | −0.0054 |
| A8 | −0.0006 | −0.0165 | −0.0252 | −0.1121 | −0.0255 | −0.0329 | 0.0352 | 0.0106 |
| A10 | −0.0001 | 0.0432 | 0.0774 | 0.2554 | −0.0292 | 0.0442 | −0.1136 | −0.0214 |
| A12 | 0.0012 | −0.0481 | −0.0970 | −0.3751 | 0.1012 | −0.0464 | 0.1927 | 0.0223 |
| A14 | −0.0014 | 0.0293 | 0.0673 | 0.3492 | −0.1146 | 0.0447 | −0.1967 | −0.0141 |
| A16 | 0.0007 | −0.0100 | −0.0268 | −0.2036 | 0.0628 | −0.0308 | 0.1194 | 0.0053 |
| A18 | −0.0002 | 0.0018 | 0.0057 | 0.0676 | −0.0150 | 0.0130 | −0.0401 | −0.0011 |
| A20 | 0.0000 | −0.0001 | −0.0005 | −0.0096 | 0.0010 | −0.0024 | 0.0057 | 0.0001 |

| Surface Number | 11 | 12 | 13 | 14 | 15 | 16 | 17 | 18 |
|---|---|---|---|---|---|---|---|---|
| K | −19.3687 | 16.3263 | −23.0954 | −95.6966 | 0.1769 | 1.7265 | −99.0000 | −0.8710 |
| A4 | −0.0290 | 0.0133 | 0.1200 | 0.0480 | −0.0656 | 0.0127 | −0.0920 | −0.1475 |
| A6 | −0.0553 | −0.2003 | −0.2439 | −0.0225 | 0.0570 | −0.0225 | 0.0420 | 0.0687 |
| A8 | 0.0344 | 0.1837 | 0.1784 | −0.0081 | −0.0455 | 0.0051 | −0.0206 | −0.0283 |
| A10 | 0.0184 | −0.0835 | −0.0838 | 0.0121 | 0.0196 | 0.0001 | 0.0074 | 0.0081 |
| A12 | −0.0572 | 0.0087 | 0.0328 | −0.0059 | −0.0050 | −0.0004 | −0.0016 | −0.0015 |
| A14 | 0.0447 | 0.0097 | −0.0112 | 0.0015 | 0.0008 | 0.0001 | 0.0002 | 0.0002 |
| A16 | −0.0167 | −0.0046 | 0.0026 | −0.0002 | −0.0001 | 0.0000 | 0.0000 | 0.0000 |
| A18 | 0.0031 | 0.0008 | −0.0003 | 0.0000 | 0.0000 | 0.0000 | 0.0000 | 0.0000 |
| A20 | −0.0002 | −0.0001 | 0.0000 | 0.0000 | 0.0000 | 0.0000 | 0.0000 | 0.0000 |

According to the various parameters provided as above, the following conditions can be derived.

| Ninth Embodiment | | | |
|---|---|---|---|
| f (mm) | 4.9 | f/f1 | 1.05 |
| FNO | 1.8 | (R9 + R10)/(R9*R10) | −0.01 |
| FOV (degree) | 78.66 | (R3 + R4)/f1 | 2.37 |
| TTL (mm) | 5.9 | R5/R6 | 2.61 |
| TTL/L | 2.16 | |R7 + R8|/|R7 − R8| | 46.65 |
| f14 | 5.19 | f1/f2 | −0.43 |
| f58 | −8.23 | (R17*R18)/(R17 − R18) | 2.26 |
| f14/f58 | −0.63 | ΣCT/f | 0.66 |
| Fno/TTL | 0.31 | ΣCT/TTL | 0.55 |
| | | ET1/CT1 | 0.38 |
| TTL/Imgh | 1.44 | ET8/CT8 | 1.46 |
| TTL/|f| | 1.20 | Imgh (mm) | 4.1 |

Tenth Embodiment

Figure 19:
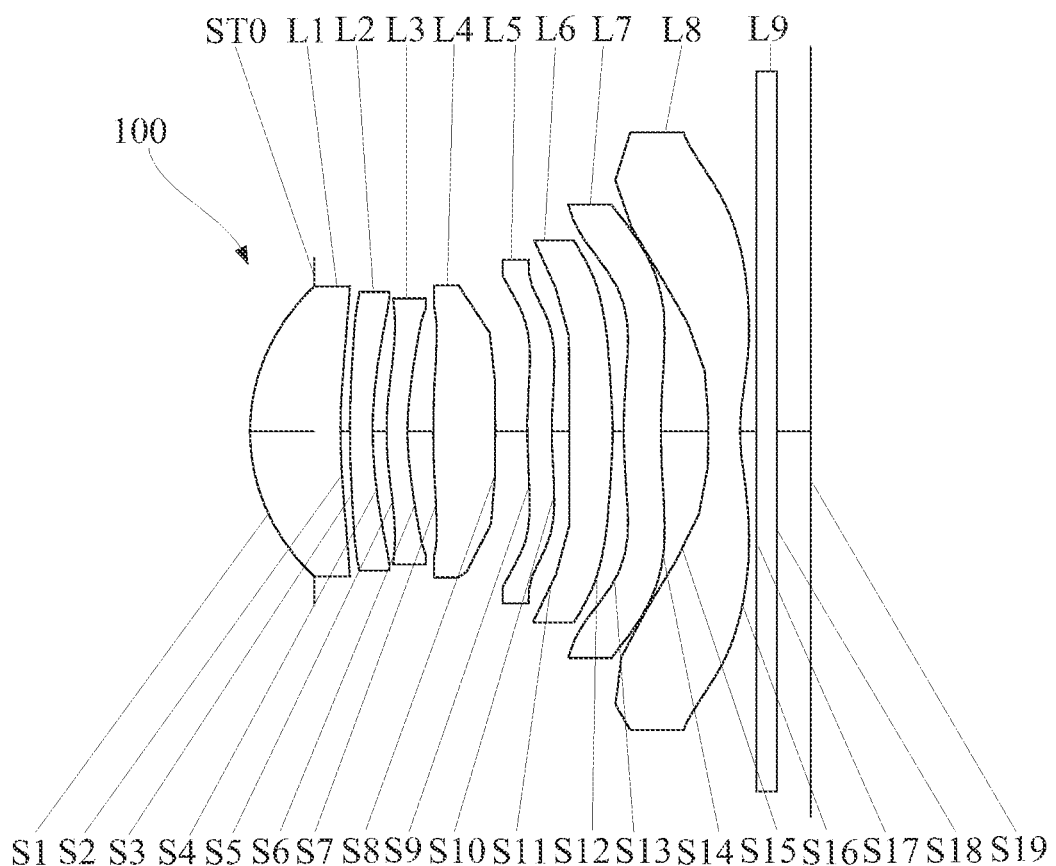
FIG. 19 is a schematic view of an optical system according to a tenth embodiment of the present disclosure.
Figure 20:
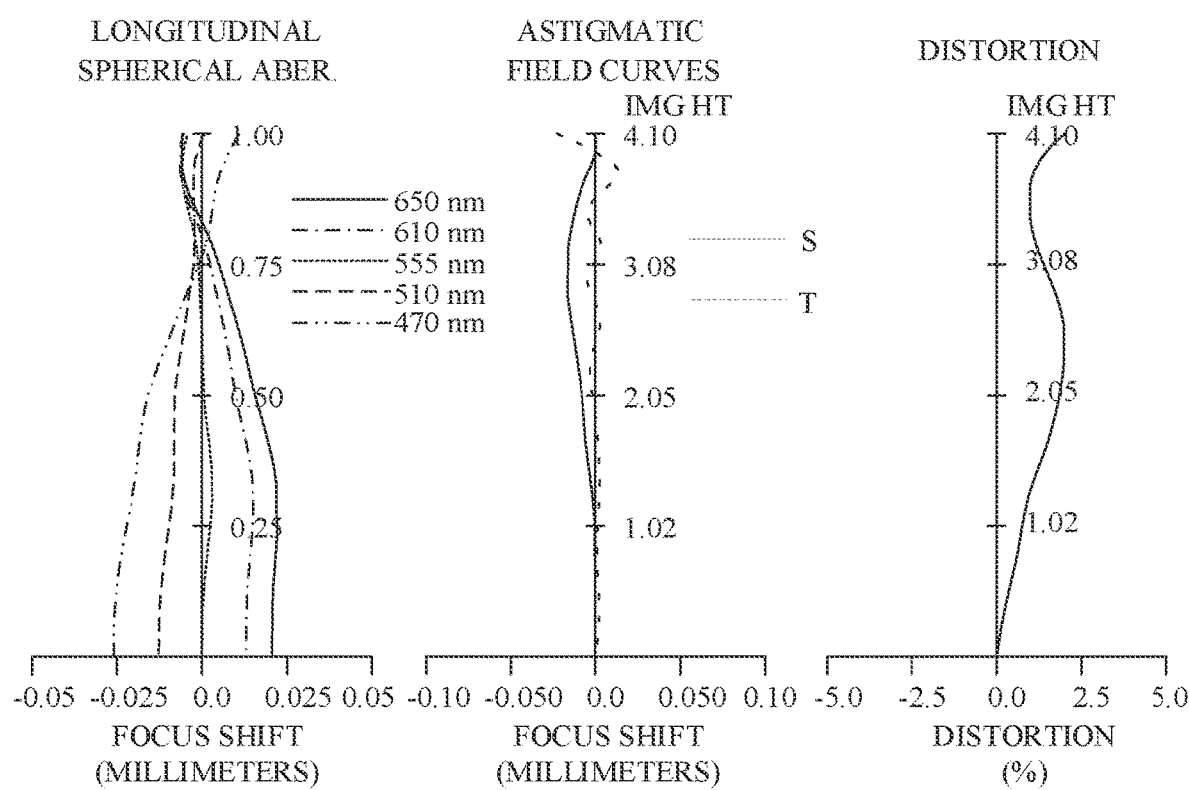
FIG. 20 is a graph showing longitudinal spherical aberration (mm), astigmatism (mm), and distortion (%) of the optical system according to the tenth embodiment.

Referring to FIG. 19, in the tenth embodiment, the optical system 100 includes a stop STO, a first lens L1 having a positive refractive power, a second lens L2 having a negative refractive power, a third lens L3 having a negative refractive power, a fourth lens L4 having a positive refractive power, a fifth lens L5 having a positive refractive power, a sixth lens L6 having a positive refractive power, a seventh lens L7 having a positive refractive power, and an eighth lens L8 having a negative refractive power, successively in order from an object side to an image side. FIG. 20 is a graph showing longitudinal spherical aberration (mm), astigmatism (mm), and distortion (%) of the optical system 100 according to the tenth embodiment. The astigmatism diagram and the distortion diagram are data diagrams at a reference wavelength. The reference wavelength in each embodiment is 555 nm.

An object side surface S1 of the first lens L1 is convex at the paraxial position, and an image side surface S2 of the first lens L1 is concave at the paraxial position. The object side surface S1 of the first lens L1 is convex at its circumference, and the image side surface S2 of the first lens L1 is concave at its circumference.

An object side surface S3 of the second lens L2 is convex at the paraxial position, and an image side surface S4 of the second lens L2 is concave at the paraxial position. The object side surface S3 of the second lens L2 is convex at its circumference, and the image side surface S4 of the second lens L2 is concave at its circumference.

An object side surface S5 of the third lens L3 is convex at the paraxial position, and an image side surface S6 of the third lens L3 is concave at the paraxial position. The object side surface S5 of the third lens L3 is concave at its circumference, and the image side surface S6 of the third lens L3 is concave at its circumference.

An object side surface S7 of the fourth lens L4 is convex at the paraxial position, and an image side surface S8 of the fourth lens L4 is convex at the paraxial position. The object side surface S7 of the fourth lens L4 is concave at its circumference, and the image side surface S8 of the fourth lens L4 is convex at its circumference.

An object side surface S9 of the fifth lens L5 is convex at the paraxial position, and an image side surface S10 of the fifth lens L5 is concave at the paraxial position. The object side surface S9 of the fifth lens L5 is concave at its circumference, and the image side surface S10 of the fifth lens L5 is concave at its circumference.

An object side surface S11 of the sixth lens L6 is concave at the paraxial position, and an image side surface S12 of the sixth lens L6 is convex at the paraxial position. The object side surface S11 of the sixth lens L6 is concave at its circumference, and the image side surface S12 of the sixth lens L6 is convex at its circumference.

An object side surface S13 of the seventh lens L7 is convex at the paraxial position, and an image side surface S14 of the seventh lens L7 is concave at the paraxial position. The object side surface S13 of the seventh lens L7 is concave at its circumference, and the image side surface S14 of the seventh lens L7 is convex at its circumference.

An object side surface S15 of the eighth lens L8 is concave at the paraxial position, and an image side surface S16 of the eighth lens L8 is concave at the paraxial position. The object side surface S15 of the eighth lens L8 is convex at its circumference, and the image side surface S16 of the eighth lens L8 is convex at its circumference.

In the tenth embodiment, the effective focal length of the optical system 100 is indicated by f, and f=4.79 mm. The f-number is indicated by FNO, and FNO=1.55. The maximum angle of field of view (diagonal angle of view) is indicated by FOV, and FOV=80 degrees (deg.). The distance from the object side surface S1 of the first lens L1 to the imaging surface S19 on the optical axis is indicated by TTL, and TTL=5.9 mm.

Various parameters of the optical system 100 are given in Table 19 and Table 20. Definitions of the various parameters can be obtained from the first embodiment, and which will not be repeated herein.

TABLE 19

Tenth Embodiment
f = 4.79 mm, FNO = 1.55, FOV = 80.00°, TTL = 5.9 mm

| Surface Number | Surface Name | Surface Shape | Y radius (mm) | Thickness (mm) | Material | Refractive index | Abbe number | Focal Length (mm) |
|---|---|---|---|---|---|---|---|---|
| 0 | Object Surface | Spherical | Infinite | Infinite | | | | |
| 1 | Spherical Surface | Spherical | Infinite | 0.000 | | | | |
| 2 | Stop | Spherical | Infinite | −0.677 | | | | |
| 3 | First Lens | Aspherical | 2.080 | 0.953 | Plastic | 1.55 | 56.14 | 5.15 |
| 4 | | Aspherical | 6.717 | 0.100 | | | | |
| 5 | Second Lens | Aspherical | 10.581 | 0.240 | Plastic | 1.68 | 19.25 | −14.12 |
| 6 | | Aspherical | 4.978 | 0.145 | | | | |
| 7 | Third Lens | Aspherical | 3.366 | 0.220 | Plastic | 1.68 | 19.25 | −307.53 |
| 8 | | Aspherical | 3.225 | 0.271 | | | | |
| 9 | Fourth Lens | Aspherical | 8.730 | 0.652 | Plastic | 1.55 | 56.14 | 13.95 |
| 10 | | Aspherical | −58.178 | 0.337 | | | | |

TABLE 19-continued

Tenth Embodiment
f = 4.79 mm, FNO = 1.55, FOV = 80.00°, TTL = 5.9 mm

| Surface Number | Surface Name | Surface Shape | Y radius (mm) | Thickness (mm) | Material | Refractive index | Abbe number | Focal Length (mm) |
|---|---|---|---|---|---|---|---|---|
| 11 | Fifth Lens | Aspherical | 6.056 | 0.260 | Plastic | 1.57 | 37.35 | 109.36 |
| 12 |  | Aspherical | 6.603 | 0.182 |  |  |  |  |
| 13 | Sixth Lens | Aspherical | −360.623 | 0.454 | Plastic | 1.57 | 37.35 | 9.09 |
| 14 |  | Aspherical | −5.112 | 0.119 |  |  |  |  |
| 15 | Seventh Lens | Aspherical | 7.995 | 0.391 | Plastic | 1.64 | 23.80 | 251.38 |
| 16 |  | Aspherical | 8.253 | 0.500 |  |  |  |  |
| 17 | Eighth Lens | Aspherical | −23.668 | 0.331 | Plastic | 1.55 | 56.14 | −3.58 |
| 18 |  | Aspherical | 2.143 | 0.175 |  |  |  |  |
| 19 | Infrared Cut- | Spherical | Infinite | 0.210 | Glass |  |  |  |
| 20 | off Filter | Spherical | Infinite | 0.360 |  |  |  |  |
| 21 | Image Surface | Spherical | Infinite | 0.000 |  |  |  |  |

Note:
the reference wavelength is 555 nm

TABLE 20

Tenth Embodiment

| Surface Number | 3 | 4 | 5 | 6 | 7 | 8 | 9 | 10 |
|---|---|---|---|---|---|---|---|---|
| K | −0.4685 | −13.9436 | −0.8604 | −1.6432 | 0.0000 | −3.4242 | 7.4285 | 99.0000 |
| A4 | 0.0070 | 0.0006 | 0.0102 | 0.0074 | −0.0773 | −0.0552 | −0.0281 | −0.0340 |
| A6 | −0.0042 | −0.0217 | −0.0322 | 0.0022 | 0.0561 | 0.0603 | 0.0394 | −0.0011 |
| A8 | 0.0151 | −0.0176 | −0.0381 | −0.0971 | −0.1511 | −0.1262 | −0.1170 | −0.0086 |
| A10 | −0.0244 | 0.0739 | 0.1589 | 0.2589 | 0.2677 | 0.2089 | 0.2200 | 0.0202 |
| A12 | 0.0240 | −0.0847 | −0.2020 | −0.3471 | −0.3208 | −0.2397 | −0.2703 | −0.0323 |
| A14 | −0.0144 | 0.0524 | 0.1411 | 0.2716 | 0.2463 | 0.1835 | 0.2099 | 0.0283 |
| A16 | 0.0052 | −0.0187 | −0.0574 | −0.1246 | −0.1127 | −0.0858 | −0.1000 | −0.0142 |
| A18 | −0.0010 | 0.0036 | 0.0127 | 0.0307 | 0.0277 | 0.0221 | 0.0266 | 0.0038 |
| A20 | 0.0001 | −0.0003 | −0.0012 | −0.0031 | −0.0028 | −0.0024 | −0.0030 | −0.0004 |

| Surface Number | 11 | 12 | 13 | 14 | 15 | 16 | 17 | 18 |
|---|---|---|---|---|---|---|---|---|
| K | −11.3392 | 0.5896 | 99.0000 | −17.2856 | 2.6869 | 1.0255 | −89.4889 | −0.9113 |
| A4 | −0.0551 | −0.0657 | 0.0024 | 0.0634 | 0.0525 | 0.0204 | −0.2172 | −0.2383 |
| A6 | 0.0147 | 0.0918 | 0.1415 | −0.0093 | −0.1448 | −0.0958 | 0.1158 | 0.1418 |
| A8 | −0.0876 | −0.2878 | −0.3529 | −0.0847 | 0.1153 | 0.0864 | −0.0312 | −0.0580 |
| A10 | 0.1457 | 0.3526 | 0.3450 | 0.0957 | −0.0575 | −0.0450 | 0.0038 | 0.0158 |
| A12 | −0.1328 | −0.2443 | −0.1886 | −0.0506 | 0.0177 | 0.0142 | 0.0002 | −0.0029 |
| A14 | 0.0687 | 0.1034 | 0.0629 | 0.0151 | −0.0033 | −0.0028 | −0.0001 | 0.0003 |
| A16 | −0.0197 | −0.0260 | −0.0129 | −0.0026 | 0.0004 | 0.0003 | 0.0000 | 0.0000 |
| A18 | 0.0029 | 0.0036 | 0.0015 | 0.0002 | 0.0000 | 0.0000 | 0.0000 | 0.0000 |
| A20 | −0.0002 | −0.0002 | −0.0001 | 0.0000 | 0.0000 | 0.0000 | 0.0000 | 0.0000 |

According to the various parameters provided as above, the following conditions can be derived.

Tenth Embodiment

| | | | |
|---|---|---|---|
| f (mm) | 4.79 | f/f1 | 0.93 |
| FNO | 1.55 | (R9 + R10)/(R9*R10) | 0.10 |
| FOV (degree) | 80 | (R3 + R4)/f1 | 1.71 |
| TTL (mm) | 5.9 | R5/R6 | 2.13 |
| TTL/L | 1.91 | |R7 + R8|/|R7 − R8| | 46.76 |
| f14 | 5.26 | f1/f2 | −0.36 |
| f58 | −9.10 | (R17*R18)/(R17 − R18) | 1.97 |
| f14/f58 | −0.58 | ΣCT/f | 0.73 |
| Fno/TTL | 0.26 | ΣCT/TTL | 0.59 |
|  |  | ET1/CT1 | 0.39 |
| TTL/Imgh | 1.44 | ET8/CT8 | 2.18 |
| TTL/|f| | 1.23 | Imgh (mm) | 4.1 |

Eleventh Embodiment

Figure 21:
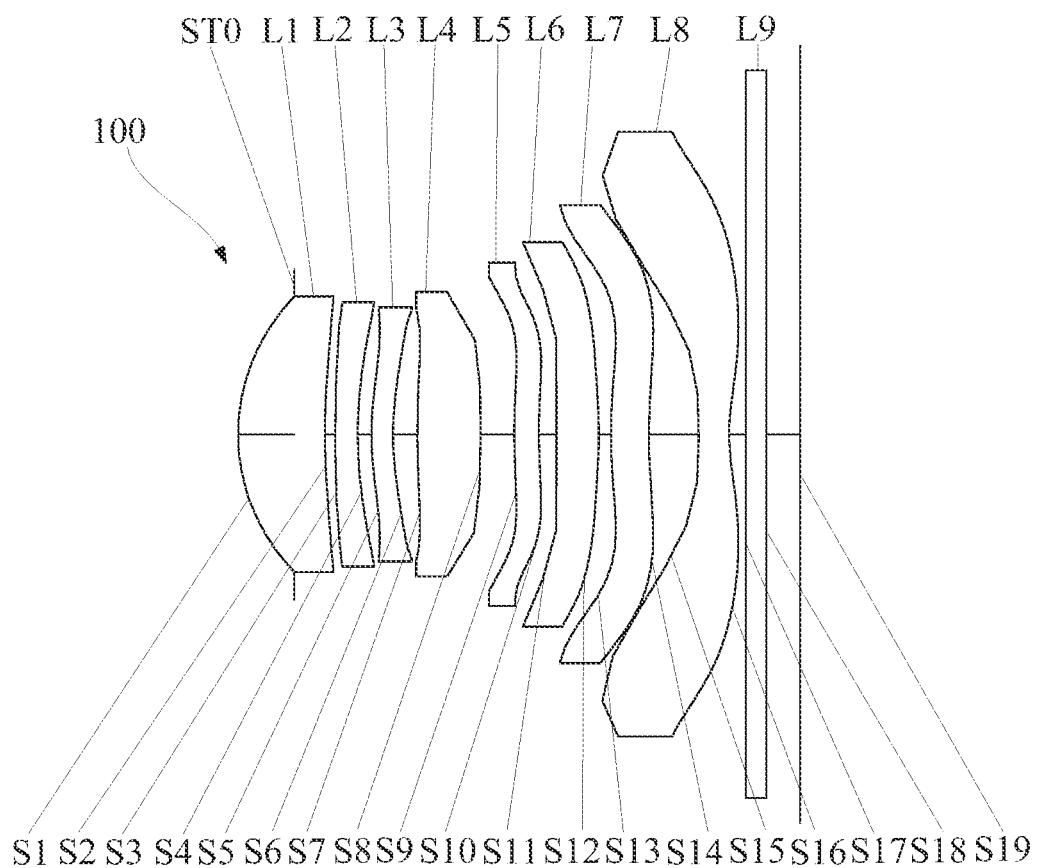
FIG. 21 is a schematic view of an optical system according to an eleventh embodiment of the present disclosure.
Figure 22:
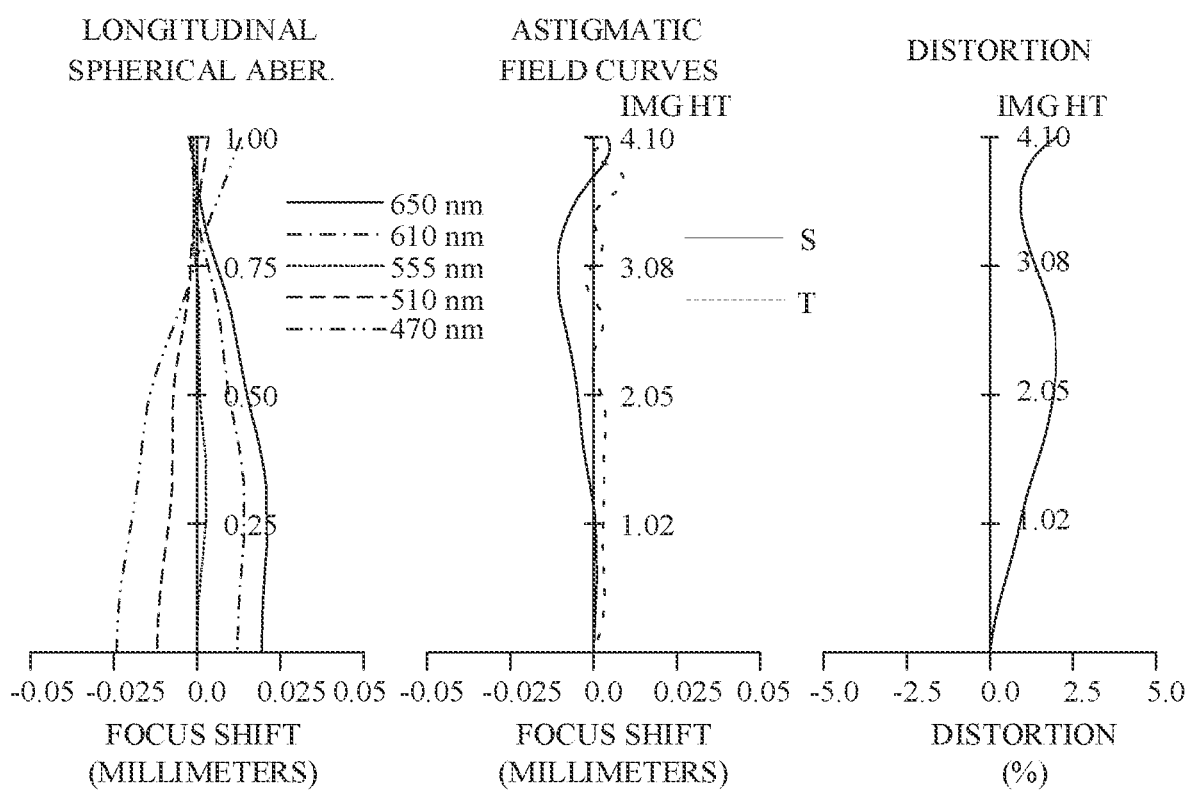
FIG. 22 is a graph showing longitudinal spherical aberration (mm), astigmatism (mm), and distortion (%) of the optical system according to the eleventh embodiment.

Referring to FIG. 21, in the eleventh embodiment, the optical system 100 includes a stop STO, a first lens L1 having a positive refractive power, a second lens L2 having a negative refractive power, a third lens L3 having a negative refractive power, a fourth lens L4 having a positive refractive power, a fifth lens L5 having a positive refractive power, a sixth lens L6 having a positive refractive power, a seventh lens L7 having a positive refractive power, and an eighth lens L8 having a negative refractive power, successively in order from an object side to an image side. FIG. 22 is a graph showing longitudinal spherical aberration (mm), astigmatism (mm), and distortion (%) of the optical system 100 according to the eleventh embodiment. The astigmatism diagram and the distortion diagram are data diagrams at a reference wavelength. The reference wavelength in each embodiment is 555 nm.

An object side surface S1 of the first lens L1 is convex at the paraxial position, and an image side surface S2 of the first lens L1 is concave at the paraxial position. The object side surface S1 of the first lens L1 is convex at its circumference, and the image side surface S2 of the first lens L1 is concave at its circumference.

An object side surface S3 of the second lens L2 is convex at the paraxial position, and an image side surface S4 of the second lens L2 is concave at the paraxial position. The object side surface S3 of the second lens L2 is convex at its circumference, and the image side surface S4 of the second lens L2 is concave at its circumference.

An object side surface S5 of the third lens L3 is convex at the paraxial position, and an image side surface S6 of the third lens L3 is concave at the paraxial position. The object side surface S5 of the third lens L3 is concave at its circumference, and the image side surface S6 of the third lens L3 is concave at its circumference.

An object side surface S7 of the fourth lens L4 is convex at the paraxial position, and an image side surface S8 of the fourth lens L4 is convex at the paraxial position. The object side surface S7 of the fourth lens L4 is concave at its circumference, and the image side surface S8 of the fourth lens L4 is convex at its circumference.

An object side surface S9 of the fifth lens L5 is convex at the paraxial position, and an image side surface S10 of the fifth lens L5 is concave at the paraxial position. The object side surface S9 of the fifth lens L5 is concave at its circumference, and the image side surface S10 of the fifth lens L5 is convex at its circumference.

An object side surface S11 of the sixth lens L6 is concave at the paraxial position, and an image side surface S12 of the sixth lens L6 is convex at the paraxial position. The object side surface S11 of the sixth lens L6 is concave at its circumference, and the image side surface S12 of the sixth lens L6 is convex at its circumference.

An object side surface S13 of the seventh lens L7 is convex at the paraxial position, and an image side surface S14 of the seventh lens L7 is concave at the paraxial position. The object side surface S13 of the seventh lens L7 is concave at its circumference, and the image side surface S14 of the seventh lens L7 is convex at its circumference.

An object side surface S15 of the eighth lens L8 is concave at the paraxial position, and an image side surface S16 of the eighth lens L8 is concave at the paraxial position. The object side surface S15 of the eighth lens L8 is concave at its circumference, and the image side surface S16 of the eighth lens L8 is convex at its circumference.

In the ninth embodiment, the effective focal length of the optical system 100 is indicated by f, and f=4.79 mm. The f-number is indicated by FNO, and FNO=1.65. The maximum angle of field of view (diagonal angle of view) is indicated by FOV, and FOV=80 degrees (deg.). The distance from the object side surface S1 of the first lens L1 to the imaging surface S19 on the optical axis is indicated by TTL, and TTL=5.9 mm.

Various parameters of the optical system 100 are given in Table 21 and Table 22. Definitions of the various parameters can be obtained from the first embodiment, and which will not be repeated herein.

TABLE 21

Eleventh Embodiment
f = 4.79 mm, FNO = 1.65, FOV = 80°, TTL = 5.9 mm

| Surface Number | Surface Name | Surface Shape | Y radius (mm) | Thickness (mm) | Material | Refractive index | Abbe number | Focal Length (mm) |
|---|---|---|---|---|---|---|---|---|
| 0 | Object Surface | Spherical | Infinite | Infinite | | | | |
| 1 | Spherical Surface | Spherical | Infinite | 0.000 | | | | |
| 2 | Stop | Spherical | Infinite | −0.588 | | | | |
| 3 | First Lens | Aspherical | 2.072 | 0.910 | Plastic | 1.55 | 56.14 | 5.06 |
| 4 | | Aspherical | 6.992 | 0.106 | | | | |
| 5 | Second Lens | Aspherical | 11.246 | 0.240 | Plastic | 1.68 | 19.25 | −13.19 |
| 6 | | Aspherical | 4.937 | 0.145 | | | | |
| 7 | Third Lens | Aspherical | 3.366 | 0.225 | Plastic | 1.68 | 19.25 | −320.98 |
| 8 | | Aspherical | 3.225 | 0.257 | | | | |
| 9 | Fourth Lens | Aspherical | 10.295 | 0.662 | Plastic | 1.55 | 56.14 | 13.52 |
| 10 | | Aspherical | −25.495 | 0.352 | | | | |
| 11 | Fifth Lens | Aspherical | 6.264 | 0.260 | Plastic | 1.57 | 37.35 | 144.45 |
| 12 | | Aspherical | 6.678 | 0.183 | | | | |
| 13 | Sixth Lens | Aspherical | −397.219 | 0.445 | Plastic | 1.57 | 37.35 | 9.14 |
| 14 | | Aspherical | −5.146 | 0.131 | | | | |
| 15 | Seventh Lens | Aspherical | 7.743 | 0.397 | Plastic | 1.64 | 23.80 | 355.99 |
| 16 | | Aspherical | 7.855 | 0.521 | | | | |
| 17 | Eighth Lens | Aspherical | −20.776 | 0.320 | Plastic | 1.55 | 56.14 | −3.65 |
| 18 | | Aspherical | 2.214 | 0.176 | | | | |
| 19 | Infrared Cut-off Filter | Spherical | Infinite | 0.210 | Glass | | | |
| 20 | | Spherical | Infinite | 0.360 | | | | |
| 21 | Image Surface | Spherical | ∞ | 0.000 | | | | |

Note:
the reference wavelength is 555 nm

TABLE 22

Eleventh Embodiment

| Surface Number | 3 | 4 | 5 | 6 | 7 | 8 | 9 | 10 |
|---|---|---|---|---|---|---|---|---|
| K | −0.4678 | −13.6789 | 2.2191 | −1.9109 | 0.0000 | −3.2969 | 3.2613 | 99.0000 |
| A4 | 0.0067 | −0.0057 | 0.0025 | 0.0035 | −0.0756 | −0.0509 | −0.0256 | −0.0339 |
| A6 | −0.0022 | −0.0150 | −0.0271 | −0.0033 | 0.0352 | 0.0347 | 0.0270 | −0.0066 |
| A8 | 0.0109 | −0.0112 | −0.0034 | −0.0303 | −0.0693 | −0.0417 | −0.0918 | 0.0066 |
| A10 | −0.0193 | 0.0523 | 0.0631 | 0.0777 | 0.0792 | 0.0324 | 0.1962 | −0.0116 |
| A12 | 0.0206 | −0.0604 | −0.0779 | −0.0863 | −0.0563 | −0.0062 | −0.2726 | 0.0073 |
| A14 | −0.0134 | 0.0374 | 0.0485 | 0.0516 | 0.0189 | −0.0101 | 0.2364 | −0.0007 |
| A16 | 0.0052 | −0.0134 | −0.0172 | −0.0168 | 0.0037 | 0.0112 | −0.1245 | −0.0019 |
| A18 | −0.0011 | 0.0026 | 0.0033 | 0.0025 | −0.0047 | −0.0046 | 0.0363 | 0.0010 |
| A20 | 0.0001 | −0.0002 | −0.0003 | −0.0001 | 0.0010 | 0.0007 | −0.0045 | −0.0002 |

| Surface Number | 11 | 12 | 13 | 14 | 15 | 16 | 17 | 18 |
|---|---|---|---|---|---|---|---|---|
| K | −10.7906 | 0.4421 | 99.0000 | −18.6320 | 2.7822 | 0.8222 | −71.0357 | −0.9091 |
| A4 | −0.0545 | −0.0538 | 0.0229 | 0.0775 | 0.0547 | 0.0216 | −0.1993 | −0.2201 |
| A6 | 0.0075 | 0.0314 | 0.0534 | −0.0564 | −0.1491 | −0.0930 | 0.0972 | 0.1254 |
| A8 | −0.0658 | −0.1581 | −0.2006 | −0.0191 | 0.1200 | 0.0805 | −0.0216 | −0.0498 |
| A10 | 0.1150 | 0.2082 | 0.2035 | 0.0468 | −0.0592 | −0.0404 | 0.0006 | 0.0133 |
| A12 | −0.1108 | −0.1501 | −0.1099 | −0.0292 | 0.0181 | 0.0124 | 0.0009 | −0.0024 |
| A14 | 0.0604 | 0.0658 | 0.0357 | 0.0094 | −0.0034 | −0.0023 | −0.0002 | 0.0003 |
| A16 | −0.0181 | −0.0170 | −0.0071 | −0.0017 | 0.0004 | 0.0003 | 0.0000 | 0.0000 |
| A18 | 0.0028 | 0.0024 | 0.0008 | 0.0002 | 0.0000 | 0.0000 | 0.0000 | 0.0000 |
| A20 | −0.0002 | −0.0001 | 0.0000 | 0.0000 | 0.0000 | 0.0000 | 0.0000 | 0.0000 |

According to the various parameters provided as above, the following conditions can be derived.

| Eleventh Embodiment | | | |
|---|---|---|---|
| f (mm) | 4.79 | f/f1 | 0.95 |
| FNO | 1.65 | (R9 + R10)/(R9*R10) | 0.06 |
| FOV (cc) | 80 | (R3 + R4)/f1 | 1.79 |
| TTL (mm) | 5.9 | R5/R6 | 2.28 |
| TTL/L | 2.03 | |R7 + R8|/|R7 − R8| | 46.76 |
| f14 | 5.25 | f1/f2 | −0.38 |
| f58 | −9.10 | (R17*R18)/(R17 − R18) | 2.00 |
| f14/f58 | −0.58 | ΣCT/f | 0.72 |
| Fno/TTL | 0.28 | ΣCT/TTL | 0.59 |
| | | ET1/CT1 | 0.45 |
| TTL/Imgh | 1.44 | ET8/CT8 | 2.28 |
| TTL/|f| | 1.23 | Imgh (mm) | 4.1 |

Twelfth Embodiment

Figure 23:
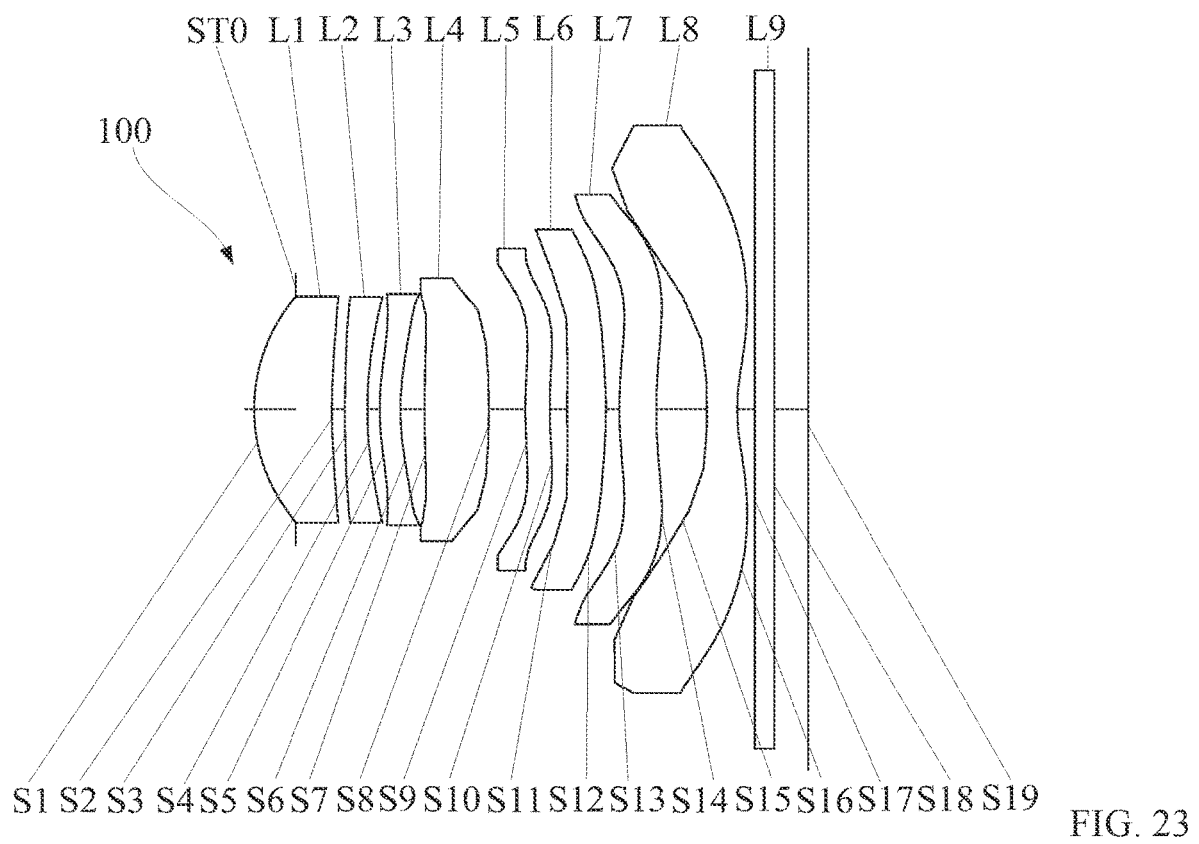
FIG. 23 is a schematic view of an optical system according to a twelfth embodiment of the present disclosure.
Figure 24:
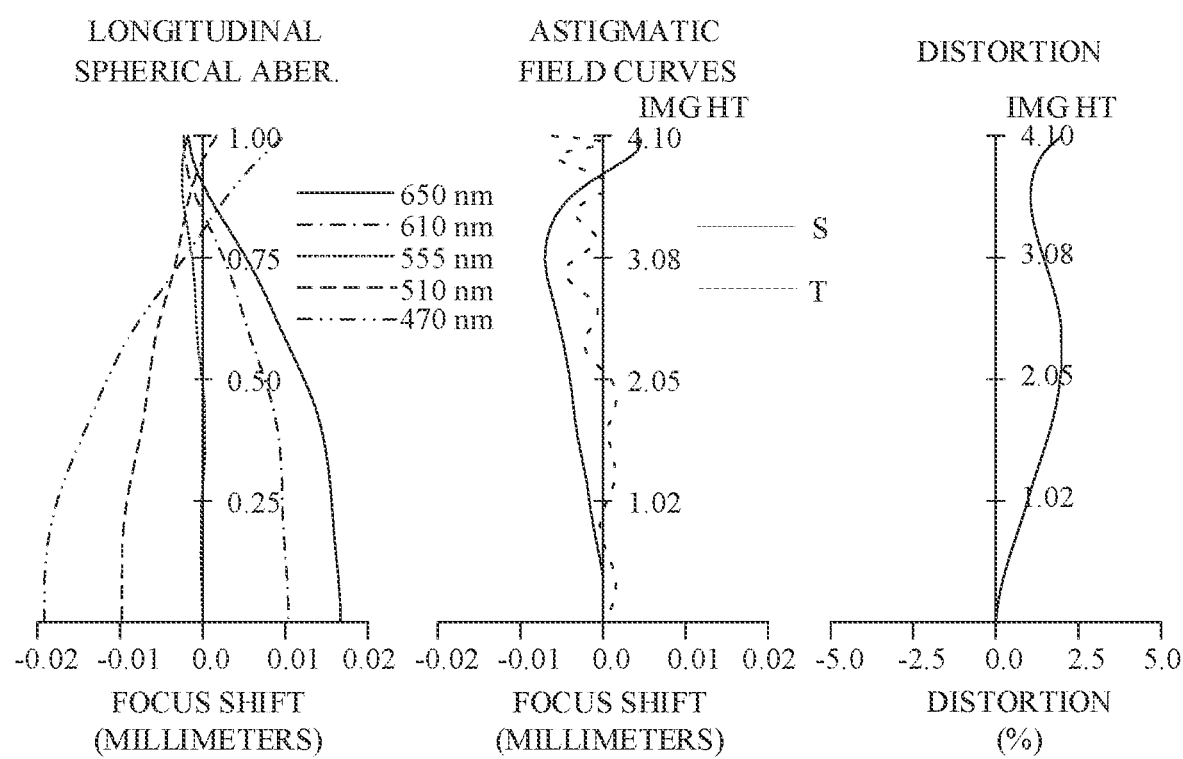
FIG. 24 is a graph showing longitudinal spherical aberration (mm), astigmatism (mm), and distortion (%) of the optical system according to the twelfth embodiment.

Referring to FIG. 23, in the twelfth embodiment, the optical system 100 includes a stop STO, a first lens L1 having a positive refractive power, a second lens L2 having a negative refractive power, a third lens L3 having a negative refractive power, a fourth lens L4 having a positive refractive power, a fifth lens L5 having a positive refractive power, a sixth lens L6 having a positive refractive power, a seventh lens L7 having a negative refractive power, and an eighth lens L8 having a negative refractive power, successively in order from an object side to an image side. FIG. 24 is a graph showing longitudinal spherical aberration (mm), astigmatism (mm), and distortion (%) of the optical system 100 according to the twelfth embodiment. The astigmatism diagram and the distortion diagram are data diagrams at a reference wavelength. The reference wavelength in each embodiment is 555 nm.

An object side surface S1 of the first lens L1 is convex at the paraxial position, and an image side surface S2 of the first lens L1 is concave at the paraxial position. The object side surface S1 of the first lens L1 is convex at its circumference, and the image side surface S2 of the first lens L1 is concave at its circumference.

An object side surface S3 of the second lens L2 is convex at the paraxial position, and an image side surface S4 of the second lens L2 is concave at the paraxial position. The object side surface S3 of the second lens L2 is convex at its circumference, and the image side surface S4 of the second lens L2 is concave at its circumference.

An object side surface S5 of the third lens L3 is convex at the paraxial position, and an image side surface S6 of the third lens L3 is concave at the paraxial position. The object side surface S5 of the third lens L3 is concave at its circumference, and the image side surface S6 of the third lens L3 is concave at its circumference.

An object side surface S7 of the fourth lens L4 is convex at the paraxial position, and an image side surface S8 of the fourth lens L4 is convex at the paraxial position. The object side surface S7 of the fourth lens L4 is concave at its circumference, and the image side surface S8 of the fourth lens L4 is convex at its circumference.

An object side surface S9 of the fifth lens L5 is convex at the paraxial position, and an image side surface S10 of the fifth lens L5 is concave at the paraxial position. The object side surface S9 of the fifth lens L5 is concave at its circumference, and the image side surface S10 of the fifth lens L5 is concave at its circumference.

An object side surface S11 of the sixth lens L6 is concave at the paraxial position, and an image side surface S12 of the sixth lens L6 is convex at the paraxial position. The object side surface S11 of the sixth lens L6 is concave at its circumference, and the image side surface S12 of the sixth lens L6 is convex at its circumference.

An object side surface S13 of the seventh lens L7 is convex at the paraxial position, and an image side surface S14 of the seventh lens L7 is concave at the paraxial position. The object side surface S13 of the seventh lens L7 is concave at its circumference, and the image side surface S14 of the seventh lens L7 is convex at its circumference.

An object side surface S15 of the eighth lens L8 is concave at the paraxial position, and an image side surface S16 of the eighth lens L8 is concave at the paraxial position. The object side surface S15 of the eighth lens L8 is convex at its circumference, and the image side surface S16 of the eighth lens L8 is convex at its circumference.

In the tenth embodiment, the effective focal length of the optical system 100 is indicated by f, and f=4.83 mm. The f-number is indicated by FNO, and FNO=1.88. The maximum angle of field of view (diagonal angle of view) is indicated by FOV, and FOV=79.5 degrees (deg.). The distance from the object side surface S1 of the first lens L1 to the imaging surface S19 on the optical axis is indicated by TTL, and TTL=5.9 mm.

Various parameters of the optical system 100 are given in Table 23 and Table 24. Definitions of the various parameters can be obtained from the first embodiment, and which will not be repeated herein.

TABLE 23

Twelfth Embodiment
f = 4.83 mm, FNO = 1.88, FOV = 79.5°, TTL = 5.9 mm

| Surface Number | Surface Name | Surface Shape | Y radius (mm) | Thickness (mm) | Material | Refractive index | Abbe number | Focal Length (mm) |
|---|---|---|---|---|---|---|---|---|
| 0 | Object Surface | Spherical | Infinite | Infinite | | | | |
| 1 | Spherical Surface | Spherical | Infinite | 0.000 | | | | |
| 2 | Stop | Spherical | Infinite | −0.451 | | | | |
| 3 | First Lens | Aspherical | 2.052 | 0.834 | Plastic | 1.55 | 56.14 | 4.86 |
| 4 | | Aspherical | 7.774 | 0.138 | | | | |
| 5 | Second Lens | Aspherical | 12.665 | 0.240 | Plastic | 1.68 | 19.25 | −11.27 |
| 6 | | Aspherical | 4.728 | 0.132 | | | | |
| 7 | Third Lens | Aspherical | 3.366 | 0.220 | Plastic | 1.68 | 19.25 | −307.53 |
| 8 | | Aspherical | 3.225 | 0.255 | | | | |
| 9 | Fourth Lens | Aspherical | 11.698 | 0.681 | Plastic | 1.55 | 56.14 | 12.77 |
| 10 | | Aspherical | −16.908 | 0.389 | | | | |
| 11 | Fifth Lens | Aspherical | 6.633 | 0.260 | Plastic | 1.57 | 37.35 | 186.68 |
| 12 | | Aspherical | 6.972 | 0.185 | | | | |
| 13 | Sixth Lens | Aspherical | −159.068 | 0.418 | Plastic | 1.57 | 37.35 | 9.38 |
| 14 | | Aspherical | −5.181 | 0.145 | | | | |
| 15 | Seventh Lens | Aspherical | 7.490 | 0.389 | Plastic | 1.64 | 23.80 | −471.35 |
| 16 | | Aspherical | 7.160 | 0.539 | | | | |
| 17 | Eighth Lens | Aspherical | −21.926 | 0.320 | Plastic | 1.55 | 56.14 | −3.76 |
| 18 | | Aspherical | 2.277 | 0.186 | | | | |
| 19 | Infrared Cut-off Filter | Spherical | Infinite | 0.210 | Glass | | | |
| 20 | | Spherical | Infinite | 0.360 | | | | |
| 21 | Image Surface | Spherical | Infinite | 0.000 | | | | |

Note:
the reference wavelength is 555 nm

TABLE 24

Twelfth Embodiment

| Surface Number | 3 | 4 | 5 | 6 | 7 | 8 | 9 | 10 |
|---|---|---|---|---|---|---|---|---|
| K | −0.4634 | −12.1103 | 13.7122 | −2.2472 | 0.0000 | −3.1258 | −17.7537 | 98.9588 |
| A4 | 0.0066 | −0.0134 | −0.0101 | −0.0052 | −0.0767 | −0.0522 | −0.0260 | −0.0379 |
| A6 | 0.0002 | −0.0060 | −0.0115 | 0.0099 | 0.0312 | 0.0374 | 0.0116 | −0.0005 |
| A8 | 0.0028 | 0.0012 | 0.0105 | −0.0384 | −0.0561 | −0.0585 | −0.0249 | −0.0073 |
| A10 | −0.0040 | 0.0212 | 0.0216 | 0.0917 | 0.0565 | 0.0843 | 0.0379 | 0.0108 |
| A12 | 0.0037 | −0.0340 | −0.0366 | −0.1196 | −0.0384 | −0.0953 | −0.0488 | −0.0159 |
| A14 | −0.0021 | 0.0266 | 0.0236 | 0.0938 | 0.0196 | 0.0825 | 0.0415 | 0.0147 |
| A16 | 0.0008 | −0.0116 | −0.0072 | −0.0459 | −0.0065 | −0.0457 | −0.0223 | −0.0082 |
| A18 | −0.0002 | 0.0027 | 0.0008 | 0.0129 | 0.0012 | 0.0145 | 0.0066 | 0.0025 |
| A20 | 0.0000 | −0.0002 | 0.0000 | −0.0016 | −0.0001 | −0.0020 | −0.0008 | −0.0003 |

| Surface Number | 11 | 12 | 13 | 14 | 15 | 16 | 17 | 18 |
|---|---|---|---|---|---|---|---|---|
| K | −15.8265 | 0.4507 | 99.0000 | −19.4094 | 3.0103 | 0.4323 | −70.7439 | −0.9165 |
| A4 | −0.0531 | −0.0386 | 0.0467 | 0.0867 | 0.0548 | 0.0312 | −0.1565 | −0.1881 |
| A6 | −0.0103 | −0.0386 | −0.0400 | −0.0982 | −0.1462 | −0.0940 | 0.0581 | 0.0960 |
| A8 | −0.0240 | −0.0249 | −0.0518 | 0.0420 | 0.1149 | 0.0727 | −0.0043 | −0.0357 |
| A10 | 0.0634 | 0.0733 | 0.0769 | 0.0028 | −0.0537 | −0.0334 | −0.0044 | 0.0091 |
| A12 | −0.0756 | −0.0689 | −0.0454 | −0.0109 | 0.0154 | 0.0094 | 0.0019 | −0.0015 |
| A14 | 0.0472 | 0.0357 | 0.0150 | 0.0048 | −0.0027 | −0.0017 | −0.0004 | 0.0002 |
| A16 | −0.0156 | −0.0103 | −0.0030 | −0.0010 | 0.0003 | 0.0002 | 0.0000 | 0.0000 |
| A18 | 0.0026 | 0.0015 | 0.0003 | 0.0001 | 0.0000 | 0.0000 | 0.0000 | 0.0000 |
| A20 | −0.0002 | −0.0001 | 0.0000 | 0.0000 | 0.0000 | 0.0000 | 0.0000 | 0.0000 |

According to the various parameters provided as above, the following conditions can be derived.

| Twelfth Embodiment | | | |
|---|---|---|---|
| f (mm) | 4.83 | f/f1 | 0.99 |
| FNO | 1.88 | (R9 + R10)/(R9*R10) | 0.03 |
| FOV (degree) | 79.5 | (R3 + R4)/f1 | 2.02 |
| TTL (mm) | 5.9 | R5/R6 | 2.68 |
| TTL/L | 2.29 | |R7 + R8|/|R7 − R8| | 46.76 |
| f14 | 5.24 | f1/f2 | −0.43 |
| f58 | −8.81 | (R17*R18)/(R17 − R18) | 2.06 |
| f14/f58 | −0.59 | ΣCT/f | 0.70 |
| Fno/TTL | 0.32 | ΣCT/TTL | 0.57 |
|  |  | ET1/CT1 | 0.54 |
| TTL/Imgh | 1.44 | ET8/CT8 | 2.27 |
| TTL/|f| | 1.22 | Imgh (mm) | 4.1 |

Thirteenth Embodiment

Figure 25:
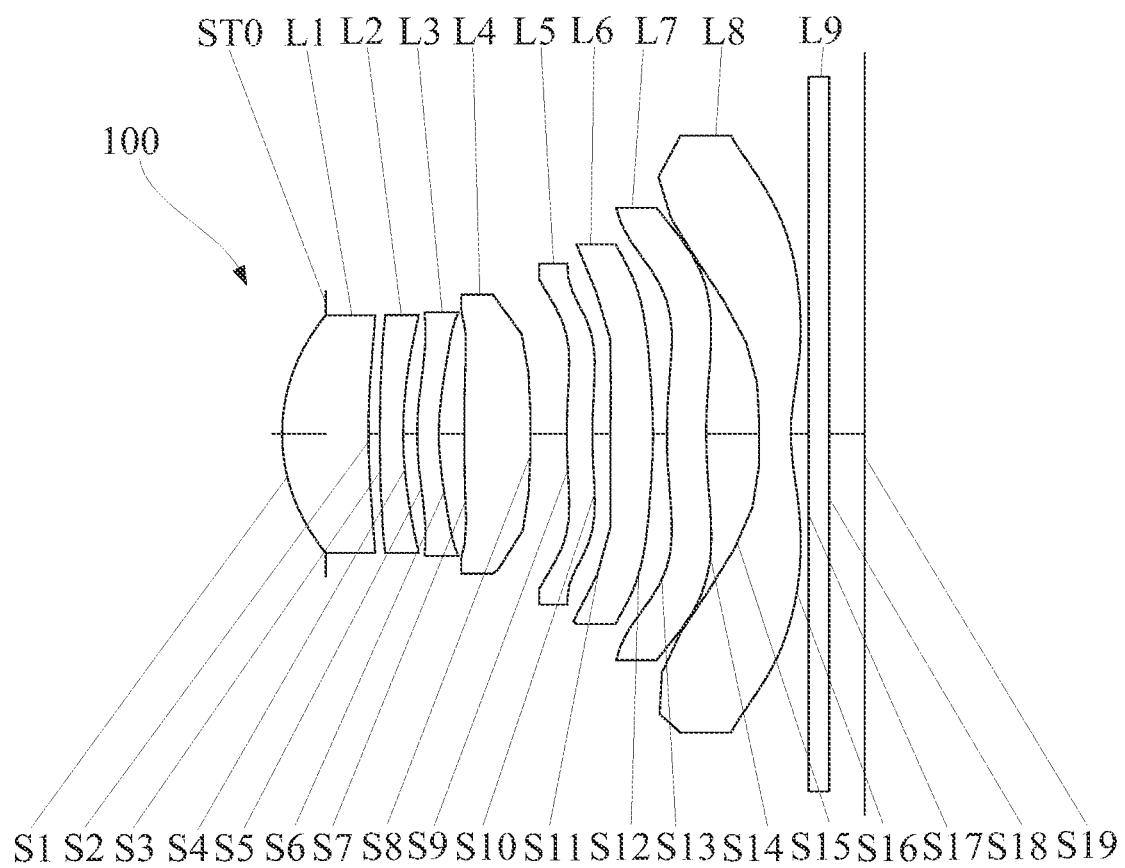
FIG. 25 is a schematic view of an optical system according to a thirteenth embodiment of the present disclosure.
Figure 26:
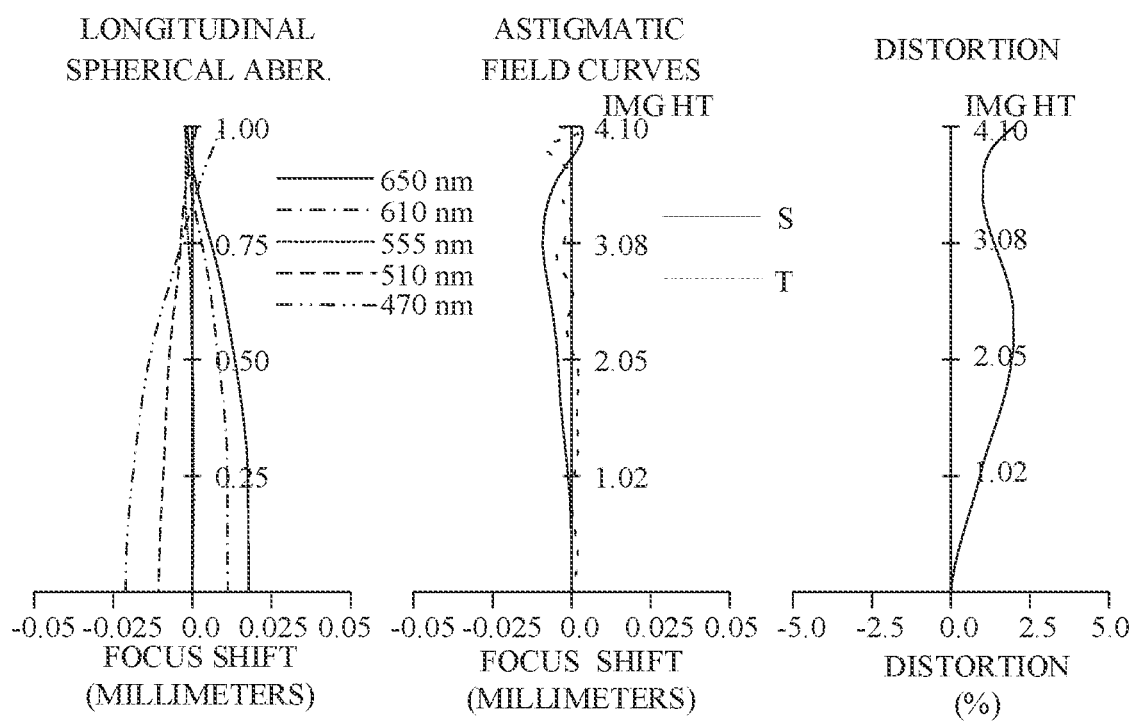
FIG. 26 is a graph showing longitudinal spherical aberration (mm), astigmatism (mm), and distortion (%) of the optical system according to the thirteenth embodiment.

Referring to FIG. 25, in the thirteenth embodiment, the optical system 100 includes a stop STO, a first lens L1 having a positive refractive power, a second lens L2 having a negative refractive power, a third lens L3 having a negative refractive power, a fourth lens L4 having a positive refractive power, a fifth lens L5 having a positive refractive power, a sixth lens L6 having a positive refractive power, a seventh lens L7 having a positive refractive power, and an eighth lens L8 having a negative refractive power, successively in order from an object side to an image side. FIG. 26 is a graph showing longitudinal spherical aberration (mm), astigmatism (mm), and distortion (%) of the optical system 100 according to the thirteenth embodiment. The astigmatism diagram and the distortion diagram are data diagrams at a reference wavelength. The reference wavelength in each embodiment is 555 nm.

An object side surface S1 of the first lens L1 is convex at the paraxial position, and an image side surface S2 of the first lens L1 is concave at the paraxial position. The object side surface S1 of the first lens L1 is convex at its circumference, and the image side surface S2 of the first lens L1 is concave at its circumference.

An object side surface S3 of the second lens L2 is convex at the paraxial position, and an image side surface S4 of the second lens L2 is concave at the paraxial position. The object side surface S3 of the second lens L2 is convex at its circumference, and the image side surface S4 of the second lens L2 is concave at its circumference.

An object side surface S5 of the third lens L3 is convex at the paraxial position, and an image side surface S6 of the third lens L3 is concave at the paraxial position. The object side surface S5 of the third lens L3 is concave at its circumference, and the image side surface S6 of the third lens L3 is concave at its circumference.

An object side surface S7 of the fourth lens L4 is convex at the paraxial position, and an image side surface S8 of the fourth lens L4 is convex at the paraxial position. The object side surface S7 of the fourth lens L4 is concave at its circumference, and the image side surface S8 of the fourth lens L4 is convex at its circumference.

An object side surface S9 of the fifth lens L5 is convex at the paraxial position, and an image side surface S10 of the fifth lens L5 is concave at the paraxial position. The object side surface S9 of the fifth lens L5 is concave at its circumference, and the image side surface S10 of the fifth lens L5 is concave at its circumference.

An object side surface S11 of the sixth lens L6 is concave at the paraxial position, and an image side surface S12 of the sixth lens L6 is convex at the paraxial position. The object side surface S11 of the sixth lens L6 is concave at its circumference, and the image side surface S12 of the sixth lens L6 is convex at its circumference.

An object side surface S13 of the seventh lens L7 is convex at the paraxial position, and an image side surface S14 of the seventh lens L7 is concave at the paraxial position. The object side surface S13 of the seventh lens L7 is concave at its circumference, and the image side surface S14 of the seventh lens L7 is convex at its circumference.

An object side surface S15 of the eighth lens L8 is concave at the paraxial position, and an image side surface S16 of the eighth lens L8 is concave at the paraxial position. The object side surface S15 of the eighth lens L8 is concave at its circumference, and the image side surface S16 of the eighth lens L8 is convex at its circumference.

In the ninth embodiment, the effective focal length of the optical system 100 is indicated by f, and f=4.8 mm. The f-number is indicated by FNO, and FNO=1.88. The maximum angle of field of view (diagonal angle of view) is indicated by FOV, and FOV=79.8 degrees (deg.). The distance from the object side surface S1 of the first lens L1 to the imaging surface S19 on the optical axis is indicated by TTL, and TTL=5.9 mm.

Various parameters of the optical system 100 are given in Table 25 and Table 26. Definitions of the various parameters can be obtained from the first embodiment, and which will not be repeated herein.

TABLE 25

Thirteenth Embodiment
f = 4.8 mm, FNO = 1.88, FOV = 79.8°, TTL = 5.9 mm

| Surface Number | Surface Name | Surface Shape | Y radius (mm) | Thickness (mm) | Material | Refractive index | Abbe number | Focal Length (mm) |
|---|---|---|---|---|---|---|---|---|
| 0 | Object Surface | Spherical | Infinite | Infinite | | | | |
| 1 | Spherical Surface | Spherical | Infinite | 0.000 | | | | |
| 2 | Stop | Spherical | Infinite | −0.442 | | | | |
| 3 | First Lens | Aspherical | 2.064 | 0.874 | Plastic | 1.55 | 56.14 | 4.94 |
| 4 | | Aspherical | 7.473 | 0.113 | | | | |
| 5 | Second Lens | Aspherical | 12.203 | 0.240 | Plastic | 1.68 | 19.25 | −12.01 |
| 6 | | Aspherical | 4.843 | 0.141 | | | | |
| 7 | Third Lens | Aspherical | 3.366 | 0.220 | Plastic | 1.68 | 19.25 | −307.53 |
| 8 | | Aspherical | 3.225 | 0.254 | | | | |
| 9 | Fourth Lens | Aspherical | 11.259 | 0.674 | Plastic | 1.55 | 56.14 | 13.06 |
| 10 | | Aspherical | −19.044 | 0.367 | | | | |

TABLE 25-continued

Thirteenth Embodiment
f = 4.8 mm, FNO = 1.88, FOV = 79.8°, TTL = 5.9 mm

| Surface Number | Surface Name | Surface Shape | Y radius (mm) | Thickness (mm) | Material | Refractive index | Abbe number | Focal Length (mm) |
|---|---|---|---|---|---|---|---|---|
| 11 | Fifth Lens | Aspherical | 6.467 | 0.260 | Plastic | 1.57 | 37.35 | 186.43 |
| 12 | | Aspherical | 6.785 | 0.184 | | | | |
| 13 | Sixth Lens | Aspherical | −237.200 | 0.429 | Plastic | 1.57 | 37.35 | 9.23 |
| 14 | | Aspherical | −5.154 | 0.141 | | | | |
| 15 | Seventh Lens | Aspherical | 7.582 | 0.398 | Plastic | 1.64 | 23.80 | 928.03 |
| 16 | | Aspherical | 7.522 | 0.535 | | | | |
| 17 | Eighth Lens | Aspherical | −20.032 | 0.320 | Plastic | 1.55 | 56.14 | −3.68 |
| 18 | | Aspherical | 2.248 | 0.180 | | | | |
| 19 | Infrared Cut- | Spherical | Infinite | 0.210 | Glass | | | |
| 20 | off Filter | Spherical | Infinite | 0.360 | | | | |
| 21 | Image Surface | Spherical | Infinite | 0.000 | | | | |

Note:
the reference wavelength is 555 nm

TABLE 26

Thirteenth Embodiment

| Surface Number | 3 | 4 | 5 | 6 | 7 | 8 | 9 | 10 |
|---|---|---|---|---|---|---|---|---|
| K | −0.4609 | −13.5463 | 5.1855 | −1.9402 | 0.0000 | −3.2224 | −3.0245 | 99.0000 |
| A4 | 0.0066 | −0.0097 | −0.0040 | 0.0008 | −0.0733 | −0.0495 | −0.0242 | −0.0371 |
| A6 | −0.0005 | −0.0195 | −0.0234 | −0.0087 | 0.0135 | 0.0258 | 0.0114 | 0.0041 |
| A8 | 0.0060 | 0.0226 | 0.0080 | 0.0069 | 0.0030 | −0.0237 | −0.0292 | −0.0233 |
| A10 | −0.0112 | −0.0052 | 0.0568 | 0.0017 | −0.0706 | 0.0127 | 0.0528 | 0.0398 |
| A12 | 0.0124 | −0.0083 | −0.0942 | 0.0090 | 0.1417 | 0.0045 | −0.0745 | −0.0483 |
| A14 | −0.0082 | 0.0094 | 0.0719 | −0.0272 | −0.1444 | −0.0092 | 0.0677 | 0.0371 |
| A16 | 0.0032 | −0.0046 | −0.0301 | 0.0232 | 0.0841 | 0.0066 | −0.0382 | −0.0176 |
| A18 | −0.0007 | 0.0011 | 0.0066 | −0.0085 | −0.0263 | −0.0022 | 0.0120 | 0.0046 |
| A20 | 0.0001 | −0.0001 | −0.0006 | 0.0012 | 0.0034 | 0.0003 | −0.0016 | −0.0005 |

| Surface Number | 11 | 12 | 13 | 14 | 15 | 16 | 17 | 18 |
|---|---|---|---|---|---|---|---|---|
| K | −12.8508 | 0.4523 | −99.0000 | −18.9075 | 2.8633 | 0.6431 | −67.1725 | −0.9129 |
| A4 | −0.0551 | −0.0487 | 0.0329 | 0.0839 | 0.0565 | 0.0256 | −0.1822 | −0.2067 |
| A6 | 0.0045 | 0.0077 | 0.0150 | −0.0813 | −0.1530 | −0.0945 | 0.0808 | 0.1136 |
| A8 | −0.0543 | −0.1119 | −0.1419 | 0.0152 | 0.1243 | 0.0790 | −0.0135 | −0.0442 |
| A10 | 0.0967 | 0.1612 | 0.1566 | 0.0231 | −0.0611 | −0.0385 | −0.0020 | 0.0116 |
| A12 | −0.0957 | −0.1221 | −0.0880 | −0.0197 | 0.0185 | 0.0115 | 0.0014 | −0.0020 |
| A14 | 0.0536 | 0.0556 | 0.0294 | 0.0071 | −0.0034 | −0.0021 | −0.0003 | 0.0002 |
| A16 | −0.0164 | −0.0148 | −0.0060 | −0.0013 | 0.0004 | 0.0002 | 0.0000 | 0.0000 |
| A18 | 0.0026 | 0.0021 | 0.0007 | 0.0001 | 0.0000 | 0.0000 | 0.0000 | 0.0000 |
| A20 | −0.0002 | −0.0001 | 0.0000 | 0.0000 | 0.0000 | 0.0000 | 0.0000 | 0.0000 |

According to the various parameters provided as above, the following conditions can be derived.

Thirteenth Embodiment

| f (mm) | 4.8 | f/f1 | 0.97 |
|---|---|---|---|
| FNO | 1.88 | (R9 + R10)/(R9*R10) | 0.04 |
| FOV (degree) | 79.8 | (R3 + R4)/f1 | 1.93 |
| TTL (mm) | 5.9 | R5/R6 | 2.52 |
| TTL/L | 2.31 | |R7 + R8|/|R7 − R8| | 46.76 |
| f14 | 5.25 | f1/f2 | −0.41 |
| f58 | −8.91 | (R17*R18)/(R17 − R18) | 2.02 |
| f14/f58 | −0.59 | ΣCT/f | 0.71 |
| Fno/TTL | 0.32 | ΣCT/TTL | 0.58 |
| | | ET1/CT1 | 0.57 |
| TTL/Imgh | 1.44 | ET8/CT8 | 2.30 |
| TTL/|f| | 1.23 | Imgh (mm) | 4.1 |

Fourteenth Embodiment

Figure 27:
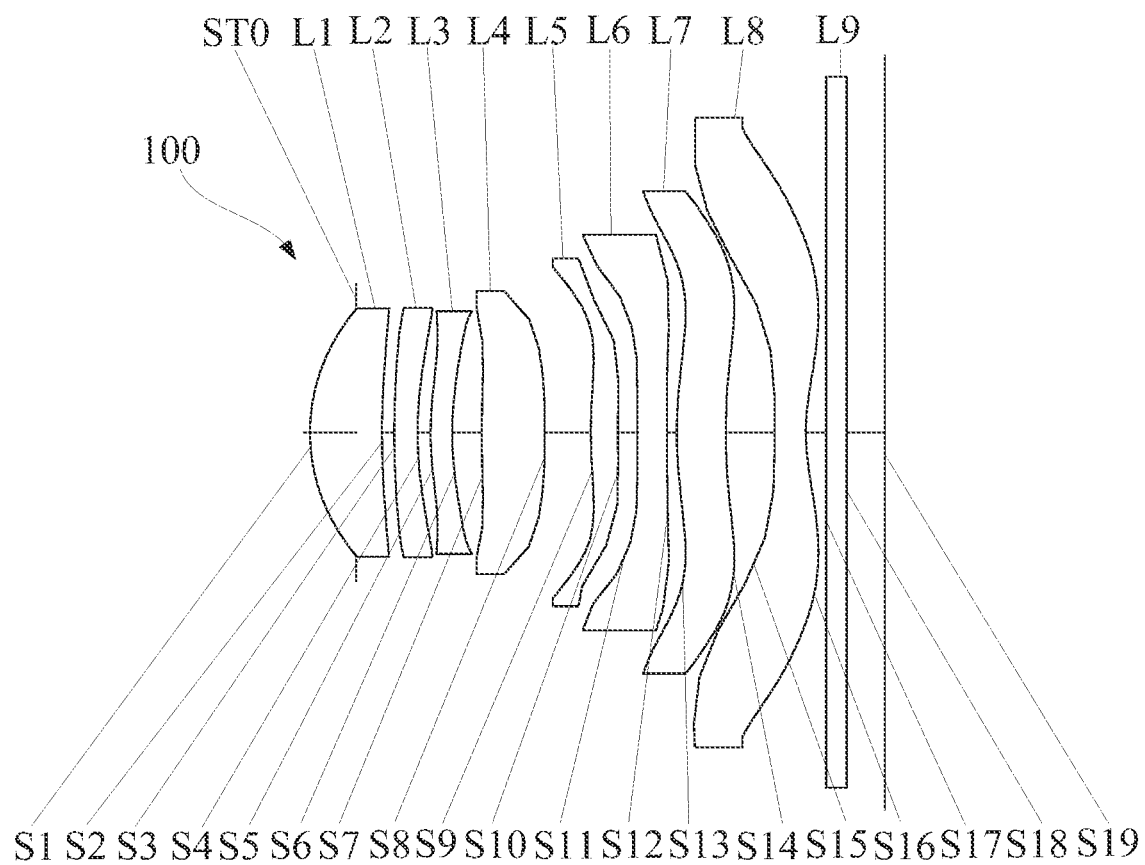
FIG. 27 is a schematic view of an optical system according to a fourteenth embodiment of the present disclosure.
Figure 28:
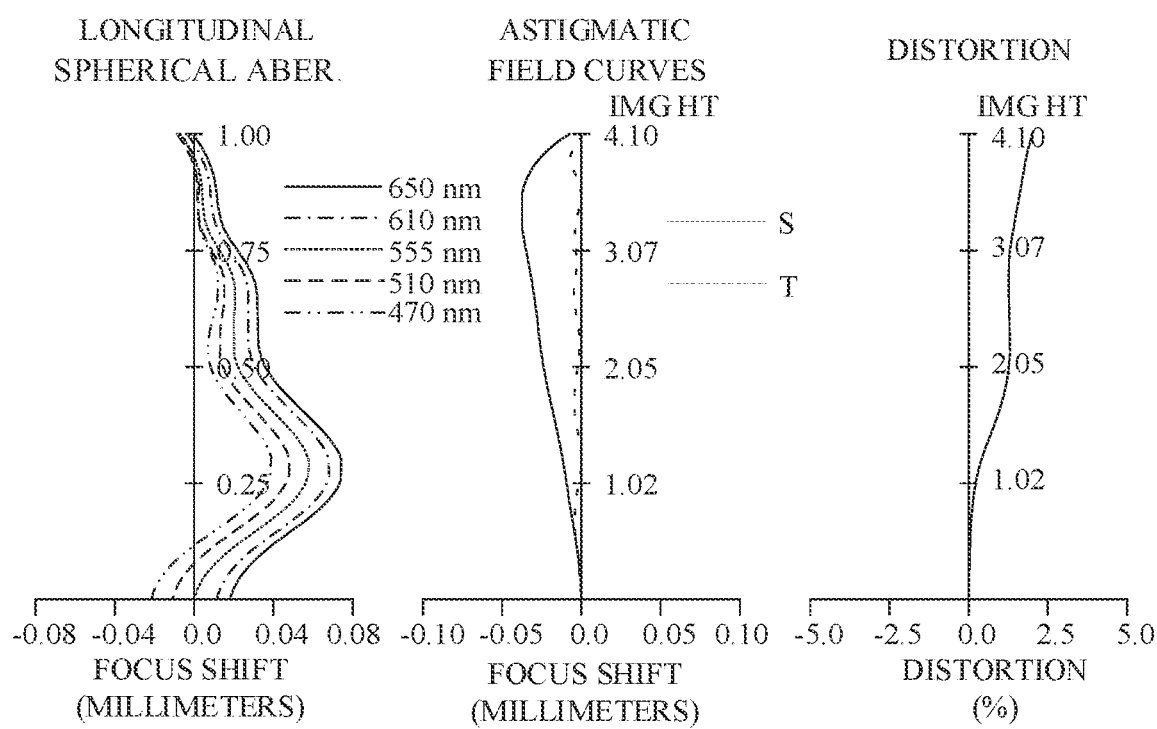
FIG. 28 is a graph showing longitudinal spherical aberration (mm), astigmatism (mm), and distortion (%) of the optical system according to the fourteenth embodiment.

Referring to FIG. 27, in the fourteenth embodiment, the optical system 100 includes a stop STO, a first lens L1 having a positive refractive power, a second lens L2 having a negative refractive power, a third lens L3 having a negative refractive power, a fourth lens L4 having a positive refractive power, a fifth lens L5 having a positive refractive power, a sixth lens L6 having a negative refractive power, a seventh lens L7 having a positive refractive power, and an eighth lens L8 having a negative refractive power, successively in order from an object side to an image side. FIG. 28 is a graph showing longitudinal spherical aberration (mm), astigmatism (mm), and distortion (%) of the optical system 100 according to the fourteenth embodiment. The astigmatism diagram and the distortion diagram are data diagrams at a reference wavelength. The reference wavelength in each embodiment is 555 nm.

An object side surface S1 of the first lens L1 is convex at the paraxial position, and an image side surface S2 of the first lens L1 is concave at the paraxial position. The object side surface S1 of the first lens L1 is convex at its circumference, and the image side surface S2 of the first lens L1 is concave at its circumference.

An object side surface S3 of the second lens L2 is convex at the paraxial position, and an image side surface S4 of the second lens L2 is concave at the paraxial position. The object side surface S3 of the second lens L2 is convex at its circumference, and the image side surface S4 of the second lens L2 is concave at its circumference.

An object side surface S5 of the third lens L3 is convex at the paraxial position, and an image side surface S6 of the third lens L3 is concave at the paraxial position. The object side surface S5 of the third lens L3 is convex at its circumference, and the image side surface S6 of the third lens L3 is concave at its circumference.

An object side surface S7 of the fourth lens L4 is convex at the paraxial position, and an image side surface S8 of the fourth lens L4 is convex at the paraxial position. The object side surface S7 of the fourth lens L4 is concave at its circumference, and the image side surface S8 of the fourth lens L4 is convex at its circumference.

An object side surface S9 of the fifth lens L5 is convex at the paraxial position, and an image side surface S10 of the fifth lens L5 is concave at the paraxial position. The object side surface S9 of the fifth lens L5 is concave at its circumference, and the image side surface S10 of the fifth lens L5 is concave at its circumference.

An object side surface S11 of the sixth lens L6 is concave at the paraxial position, and an image side surface S12 of the sixth lens L6 is convex at the paraxial position. The object side surface S11 of the sixth lens L6 is concave at its circumference, and the image side surface S12 of the sixth lens L6 is convex at its circumference.

An object side surface S13 of the seventh lens L7 is convex at the paraxial position, and an image side surface S14 of the seventh lens L7 is concave at the paraxial position. The object side surface S13 of the seventh lens L7 is concave at its circumference, and the image side surface S14 of the seventh lens L7 is convex at its circumference.

An object side surface S15 of the eighth lens L8 is concave at the paraxial position, and an image side surface S16 of the eighth lens L8 is concave at the paraxial position. The object side surface S15 of the eighth lens L8 is concave at its circumference, and the image side surface S16 of the eighth lens L8 is convex at its circumference.

In the ninth embodiment, the effective focal length of the optical system 100 is indicated by f, and f=4.85 mm. The f-number is indicated by FNO, and FNO=1.8. The maximum angle of field of view (diagonal angle of view) is indicated by FOV, and FOV=79.2 degrees (deg.). The distance from the object side surface S1 of the first lens L1 to the imaging surface S19 on the optical axis is indicated by TTL, and TTL=5.9 mm.

Various parameters of the optical system 100 are given in Table 27 and Table 28. Definitions of the various parameters can be obtained from the first embodiment, and which will not be repeated herein.

TABLE 27

Fourteenth Embodiment
f = 4.85 mm, FNO = 1.8, FOV = 79.2°, TTL = 5.9 mm

| Surface Number | Surface Name | Surface Shape | Y radius (mm) | Thickness (mm) | Material | Refractive index | Abbe number | Focal Length (mm) |
|---|---|---|---|---|---|---|---|---|
| 0 | Object Surface | Spherical | Infinite | Infinite | | | | |
| 1 | Spherical Surface | Spherical | Infinite | 0.000 | | | | |
| 2 | Stop | Spherical | Infinite | −0.479 | | | | |
| 3 | First Lens | Aspherical | 2.114 | 0.740 | Plastic | 1.55 | 56.14 | 4.86 |
| 4 | | Aspherical | 9.093 | 0.126 | | | | |
| 5 | Second Lens | Aspherical | 11.546 | 0.240 | Plastic | 1.68 | 19.25 | −12.19 |
| 6 | | Aspherical | 4.774 | 0.133 | | | | |
| 7 | Third Lens | Aspherical | 3.643 | 0.220 | Plastic | 1.68 | 19.25 | −294.61 |
| 8 | | Aspherical | 3.491 | 0.306 | | | | |
| 9 | Fourth Lens | Aspherical | 15.360 | 0.645 | Plastic | 1.55 | 56.14 | 13.48 |
| 10 | | Aspherical | −13.922 | 0.475 | | | | |
| 11 | Fifth Lens | Aspherical | 6.654 | 0.275 | Plastic | 1.57 | 37.35 | 17.33 |
| 12 | | Aspherical | 20.070 | 0.205 | | | | |
| 13 | Sixth Lens | Aspherical | −15.083 | 0.300 | Plastic | 1.57 | 37.35 | −41.10 |
| 14 | | Aspherical | −42.611 | 0.100 | | | | |
| 15 | Seventh Lens | Aspherical | 4.652 | 0.504 | Plastic | 1.64 | 23.80 | 17.77 |
| 16 | | Aspherical | 7.536 | 0.501 | | | | |
| 17 | Eighth Lens | Aspherical | −3527.26 | 0.320 | Plastic | 1.55 | 56.14 | −4.36 |
| 18 | | Aspherical | 2.384 | 0.209 | | | | |
| 19 | Infrared Cut-off Filter | Spherical | Infinite | 0.210 | Glass | | | |
| 20 | | Spherical | Infinite | 0.389 | | | | |
| 21 | Image Surface | Spherical | Infinite | 0.000 | | | | |

Note:
the reference wavelength is 555 nm

TABLE 28

Fourteenth Embodiment

| Surface Number | 3 | 4 | 5 | 6 | 7 | 8 | 9 | 10 |
|---|---|---|---|---|---|---|---|---|
| K   | −0.4929 | −5.8571 | 36.6482 | −4.2039 | 0.0000  | −1.9814 | −78.7674 | 73.5954 |
| A4  | 0.0054  | −0.0071 | −0.0048 | 0.0056  | −0.0877 | −0.0476 | −0.0350  | −0.0287 |
| A6  | 0.0050  | −0.0128 | 0.0025  | −0.0460 | 0.0910  | −0.0218 | 0.0867   | −0.0509 |
| A8  | −0.0112 | 0.0179  | −0.0268 | 0.1547  | −0.2000 | 0.1932  | −0.2852  | 0.1367  |
| A10 | 0.0139  | −0.0064 | 0.0690  | −0.2920 | 0.2575  | −0.4876 | 0.5235   | −0.2062 |
| A12 | −0.0090 | −0.0047 | −0.0786 | 0.3188  | −0.1961 | 0.6839  | −0.5845  | 0.1836  |
| A14 | 0.0029  | 0.0059  | 0.0495  | −0.2029 | 0.0867  | −0.5642 | 0.4015   | −0.1000 |
| A16 | −0.0004 | −0.0025 | −0.0178 | 0.0685  | −0.0225 | 0.2737  | −0.1653  | 0.0326  |
| A18 | 0.0000  | 0.0005  | 0.0034  | −0.0092 | 0.0044  | −0.0717 | 0.0370   | −0.0059 |
| A20 | 0.0000  | 0.0000  | −0.0003 | −0.0001 | −0.0007 | 0.0078  | −0.0034  | 0.0004  |

| Surface Number | 11 | 12 | 13 | 14 | 15 | 16 | 17 | 18 |
|---|---|---|---|---|---|---|---|---|
| K   | −20.7145 | 34.2215 | −48.4093 | −98.9699 | −0.0102 | 1.9367  | −99.0000 | −0.8627 |
| A4  | −0.0289  | 0.0074  | 0.1141   | 0.0376   | −0.0521 | 0.0177  | −0.0913  | −0.1416 |
| A6  | −0.0149  | −0.1480 | −0.2268  | −0.0087  | 0.0336  | −0.0288 | 0.0429   | 0.0618  |
| A8  | −0.0505  | 0.1044  | 0.1779   | −0.0139  | −0.0238 | 0.0107  | −0.0191  | −0.0221 |
| A10 | 0.1089   | −0.0177 | −0.0976  | 0.0117   | 0.0090  | −0.0024 | 0.0060   | 0.0055  |
| A12 | −0.1074  | −0.0228 | 0.0434   | −0.0045  | −0.0020 | 0.0002  | −0.0012  | −0.0009 |
| A14 | 0.0582   | 0.0179  | −0.0148  | 0.0010   | 0.0003  | 0.0000  | 0.0001   | 0.0001  |
| A16 | −0.0177  | −0.0056 | 0.0033   | −0.0001  | 0.0000  | 0.0000  | 0.0000   | 0.0000  |
| A18 | 0.0029   | 0.0008  | −0.0004  | 0.0000   | 0.0000  | 0.0000  | 0.0000   | 0.0000  |
| A20 | −0.0002  | 0.0000  | 0.0000   | 0.0000   | 0.0000  | 0.0000  | 0.0000   | 0.0000  |

According to the various parameters provided as above, the following conditions can be derived.

| Fourteenth Embodiment | | | |
|---|---|---|---|
| f (mm)      | 4.85  | f/f1                | 1.00  |
| FNO         | 1.8   | (R9 + R10)/(R9*R10) | −0.01 |
| FOV (degree)| 79.2  | (R3 + R4)/f1        | 2.30  |
| TTL (mm)    | 5.9   | R5/R6               | 2.42  |
| TTL/L       | 2.19  | |R7 + R8|/|R7 − R8| | 46.93 |
| f14         | 5.22  | f1/f2               | −0.40 |
| f58         | −9.44 | (R17*R18)/(R17 − R18) | 2.38 |
| f14/f58     | −0.55 | ΣCT/f               | 0.67  |
| Fno/TTL     | 0.31  | ΣCT/TTL             | 0.55  |
|             |       | ET1/CT1             | 0.45  |
| TTL/Imgh    | 1.44  | ET8/CT8             | 1.55  |
| TTL/|f|     | 1.22  | Imgh (mm)           | 4.1   |

Figure 29:
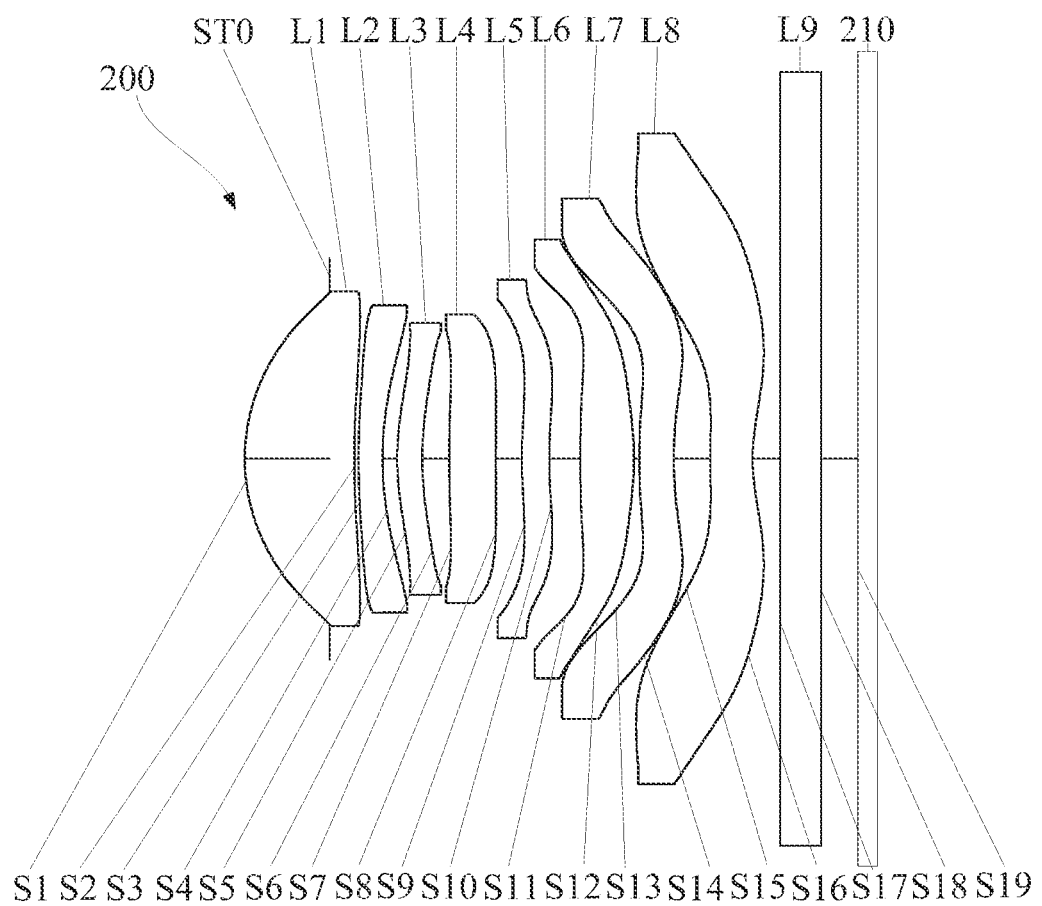
FIG. 29 is a schematic view of an image capturing module according to an embodiment of the present disclosure.

Referring to FIG. 29, in some embodiments, the image side of the optical system is equipped with a photosensitive element 210 to form an image capturing module 200. The photosensitive element may be a Charge Coupled Device (CCD) or a Complementary Metal Oxide Semiconductor (CMOS). It should be noted that the imaging surface S19 in the above embodiments can be understood as a photosensitive surface of the photosensitive element 210.

In some embodiments, the photosensitive element 210 is relatively fixedly provided on the image side of the optical system. As such, the image capturing module 200 is a fixed focus module. In other embodiments, a voice coil motor is provided to enable the photosensitive element 210 to move relative to each lens in the optical system 100, thereby achieving the focusing.

Figure 30:
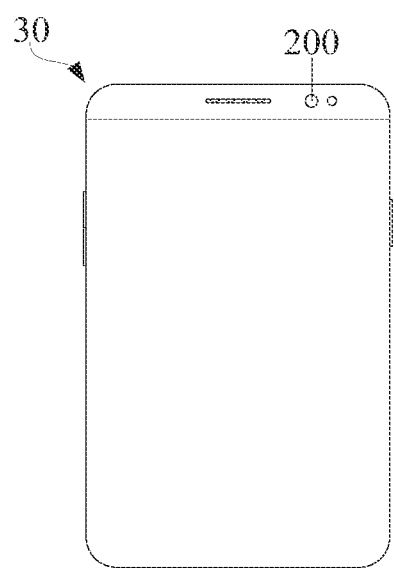
FIG. 30 is a schematic view of an electronic device according to an embodiment of the present disclosure.

Referring to FIG. 30, in some embodiments, the image capturing module 200 can be applied to, but not limited to, electronic devices 30 such as smart phones, tablet computers, Personal Digital Assistants (PDAs), drones, computers, so as to enable users to obtain high-quality capturing images in dark environments. The electronic device 30 includes any mobile terminal with camera capability, especially a smart phone. When the image capturing module 200 is the fixed focus module, the image capturing module 200 can be used as a front camera module of the smart phone. When the image capturing module 200 has a focusing function, the image capturing module 200 can also be used as a rear camera module of the smart phone. By using the image capturing module 200 with the above-mentioned optical system, the electronic device 30 will have the ability to obtain high-quality images in dark environments such as night scenes and starry sky.

In the description of the present disclosure, it should be understood that orientation or positional relationships indicated by terms "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", "circumferential" etc. are based on orientation or positional relationship shown in the drawings, which are merely to facilitate the description of the present disclosure and simplify the description, not to indicate or imply that the device or elements must have a particular orientation, be constructed and operated in a particular orientation, and therefore cannot be construed as a limitation on the present disclosure.

In addition, the terms "first" and "second" are used for description only, and cannot be understood as indicating or implying relative importance or implicitly indicating the number of technical features indicated. Thus, the features defined with "first" and "second" may include at least one of the features explicitly or implicitly. In the description of the present disclosure, the meaning of "plurality" is two or more, such as two or three, unless explicitly and specifically defined otherwise.

In the description of the present disclosure, unless explicitly specified and defined otherwise, terms "mounting", "connecting", and "connected" should be understood in a broad sense. For example, it may be a fixed connection or a detachable connection, or an integration; may be a mechanical connection or electrical connection; may be a direct connection, or may be a connection through an intermediate medium, may be the communication between two elements or the interaction relationship between two elements. The specific meanings of the above terms in the present disclosure can be understood by one of those ordinary skills in the art according to specific circumstances.

In the present disclosure, unless expressly stipulated and defined otherwise, a first feature being "on" or "below" a second feature may mean that the first feature is in direct contact with the second feature, or may mean that the first feature is indirectly contact with the second feature through an intermediate medium. Moreover, the first feature being "above", "top" and "upside" on the second feature may mean that the first feature is directly above or obliquely above the second feature, or simply mean that the level of the first feature is higher than that of the second feature. The first feature being "below", "under" and "beneath" the second feature may mean that the first feature is directly below or obliquely below the second feature, or simply mean that the level of the first feature is smaller than that of the second feature.

In the description of this specification, descriptions referring to terms "one embodiment", "some embodiments", "examples", "specific examples", or "some examples" and the like mean that specific features, structures, materials, or characteristics described in conjunction with the embodiment or example are included in at least one embodiment or example of the present disclosure. In this specification, schematic representations of the above terms do not necessarily refer to the same embodiment or example. Moreover, the described specific features, structures, materials, or characteristics can be combined in any one or more embodiments or examples in a suitable manner. In addition, if there is no contradiction, the different embodiments or examples and the features of the different embodiments or examples described in this specification can be combined and incorporated by those skilled in the art.

The technical features of the above-mentioned embodiments can be combined arbitrarily. In order to simply the description, all possible combinations of the technical features in the above-mentioned embodiments are not described. However, as long as there is no contradiction in the combinations of these technical features, they should be considered to be fallen into the range described in the present specification.

Only several embodiments of the present disclosure are illustrated in the above-mentioned embodiments, and the description thereof is relatively specific and detailed, but it should not be understood as a limitation on the scope of the present disclosure. It should be noted that for those of ordinary skill in the art, without departing from the concept of the present disclosure, several modifications and improvements can be made, which all fall within the protection scope of the present disclosure. Therefore, the protection scope of the present disclosure shall be subject to the appended claims.

What is claimed is:

1. An optical system, successively in order from an object side to an image side, comprising:
    a first lens having a positive refractive power, an object side surface of the first lens being convex at a circumference thereof;
    a second lens having a refractive power;
    a third lens having a refractive power;
    a fourth lens having a refractive power;
    a fifth lens having a refractive power;
    a sixth lens having a positive refractive power;
    a seventh lens having a negative refractive power, an image side surface of the seventh lens being concave at an optical axis; and
    an eighth lens having a negative refractive power, wherein the optical system satisfies the following conditions:

$1 < TTL/L < 2.5$;

wherein TTL is a distance from the object side surface of the first lens to an imaging surface of the optical system on the optical axis, and the optical system further comprises a stop, L is an effective aperture diameter of the stop;

$TTL/\text{Imgh} < 1.5$;

wherein TTL is the distance from the object side surface of the first lens to the imaging surface of the optical system on the optical axis, and Imgh is half of a length of a diagonal of an effective pixel area on the imaging surface;

$1.0 < TTL/f < 1.5$;

wherein TTL is the distance from the object side surface of the first lens to the imaging surface of the optical system on the optical axis, and f is an effective focal length of the optical system;

$f/f1 \leq 1.2$;

wherein f is an effective focal length of the optical system, and f1 is an effective focal length of the first lens; and $-0.6 < f1/f2 < 0.1$;

wherein f1 is an effective focal length of the first lens, and f2 is an effective focal length of the second lens.

2. The optical system according to claim 1, further satisfying the following conditions:

$f14 > 0$;

$f58 < 0$;

wherein f14 is a combined focal length of the first lens, the second lens, the third lens, and the fourth lens; and f58 is a combined focal length of the fifth lens, the sixth lens, the seventh lens, and the eighth lens.

3. The optical system according to claim 2, further satisfying the following condition:

$-0.7 < f14/f58 < -0.1$.

4. The optical system according to claim 1, further satisfying the following condition:

$0.20 < Fno/TTL < 0.35$;

wherein Fno is a f-number of the optical system; TTL is the distance from the object side surface of the first lens to the imaging surface of the optical system on the optical axis; and a unit of TTL is mm.

5. The optical system according to claim 4, further satisfying the following condition:

$Fno < 2.0$.

6. The optical system according to claim 1, further satisfying the following condition:

$-0.10 < (R9+R10)/(R9*R10) < 0.25$;

wherein R9 is a radius of curvature of an object side surface of the fourth lens at the optical axis, R10 is a radius of curvature of an image side surface of the fourth lens at the optical axis, units of R9 and R10 are mm.

7. The optical system according to claim 1, further satisfying the following condition:

$0.5 < (R3+R4)/f1 < 3.5$;

wherein R3 is a radius of curvature of the object side surface of the first lens at the optical axis, R4 is a radius of curvature of an image side surface of the first lens at the optical axis, and f1 is an effective focal length of the first lens.

8. The optical system according to claim 1, further satisfying the following condition:

$$0.8 < R5/R6 < 3.5;$$

wherein R5 is a radius of curvature of an object side surface of the second lens at the optical axis, and R6 is a radius of curvature of an image side surface of the second lens at the optical axis.

9. An optical system, successively in order from an object side to an image side, comprising:
- a first lens having a positive refractive power, an object side surface of the first lens being convex at a circumference thereof;
- a second lens having a refractive power;
- a third lens having a refractive power;
- a fourth lens having a refractive power;
- a fifth lens having a refractive power;
- a sixth lens having a positive refractive power;
- a seventh lens having a negative refractive power, an image side surface of the seventh lens being concave at an optical axis; and
- an eighth lens having a negative refractive power,
- wherein the optical system satisfies the following conditions:

$$1 < TTL/L < 2.5;$$

wherein TTL is a distance from the object side surface of the first lens to an imaging surface of the optical system on the optical axis, and the optical system further comprises a stop, L is an effective aperture diameter of the stop; and $$8 < |R7+R8|/|R7-R8| < 48;$$

wherein R7 is a radius of curvature of an object side surface of the third lens at the optical axis, and R8 is a radius of curvature of an image side surface of the third lens at the optical axis.

10. The optical system according to claim 1, further satisfying the following condition:

$$1.8 < (R17*R18)/(R17-R18) < 3;$$

wherein R17 is a radius of curvature of an object side surface of the eighth lens at the optical axis, and R18 is a radius of curvature of an image side surface of the eighth lens at the optical axis, and units of R17 and R18 are mm.

11. The optical system according to claim 1, further satisfying the following condition:

$$0.5 < \Sigma CT/f < 0.8;$$

wherein $\Sigma CT$ is a sum of center thicknesses of all lenses in the optical system, and f is an effective focal length of the optical system.

12. The optical system according to claim 1, further satisfying the following condition:

$$0.40 < \Sigma CT/TTL < 0.62;$$

wherein $\Sigma CT$ is a sum of center thicknesses of all lenses in the optical system, and TTL is the distance from the object side surface of the first lens to the imaging surface of the optical system on the optical axis.

13. The optical system according to claim 1, further satisfying the following condition:

$$0.20 < ET1/CT1 < 0.60;$$

wherein ET1 is an edge thickness of the first lens, and CT1 is a center thickness of the first lens.

14. The optical system according to claim 1, further satisfying the following condition:

$$0.80 < ET8/CT8 < 3.00;$$

wherein ET8 is an edge thickness of the eighth lens, and CT8 is a center thickness of the eighth lens.

15. An image capturing module, comprising:
- a photosensitive element; and
- the optical system according to claim 1, wherein the photosensitive element is arranged at the image side of the optical system.

16. An electronic device, comprising the image capturing module according to claim 15.

\* \* \* \* \*